(12) United States Patent
Roark et al.

(10) Patent No.: US 7,001,446 B2
(45) Date of Patent: Feb. 21, 2006

(54) DENSE, LAYERED MEMBRANES FOR HYDROGEN SEPARATION

(75) Inventors: Shane E. Roark, Boulder, CO (US); Richard MacKay, Lafayette, CO (US); Michael V. Mundschau, Longmont, CO (US)

(73) Assignee: Eltron Research, Inc., Boulder, CO (US)

( * ) Notice: Subject to any disclaimer, the term of this patent is extended or adjusted under 35 U.S.C. 154(b) by 0 days.

(21) Appl. No.: 10/717,218

(22) Filed: Nov. 19, 2003

(65) Prior Publication Data
US 2004/0129135 A1 Jul. 8, 2004

Related U.S. Application Data

(63) Continuation-in-part of application No. 10/382,354, filed on Mar. 5, 2003, now Pat. No. 6,899,744.

(60) Provisional application No. 60/502,158, filed on Sep. 10, 2003, provisional application No. 60/362,167, filed on Mar. 5, 2002.

(51) Int. Cl.
*B01D 53/22* (2006.01)
*B01D 71/02* (2006.01)

(52) U.S. Cl. .................. 95/56; 96/4; 96/11; 55/524

(58) Field of Classification Search ............ 95/55, 95/56; 96/4, 7, 8, 11; 55/523, 524
See application file for complete search history.

(56) References Cited

U.S. PATENT DOCUMENTS

| | | | | |
|---|---|---|---|---|
| 2,824,620 A | 2/1958 | De Rosset | | 183/2 |
| 2,958,391 A | 11/1960 | De Rosset | | 183/2 |
| 3,246,450 A | 4/1966 | Stern et al. | | |
| 3,350,846 A | 11/1967 | Makrides et al. | | 55/16 |
| 3,393,098 A | 7/1968 | Hartner et al. | | 136/86 |
| 4,313,013 A | 1/1982 | Harris | | 585/818 |
| 4,468,235 A | 8/1984 | Hill | | 55/16 |
| 4,496,373 A | 1/1985 | Behr et al. | | 55/16 |
| 4,536,196 A | 8/1985 | Harris | | 55/16 |
| 4,589,891 A | 5/1986 | Iniotakis et al. | | 55/158 |
| 4,689,150 A | 8/1987 | Abe et al. | | 210/490 |
| 4,699,637 A | 10/1987 | Iniotakis | | 55/158 |
| 4,804,475 A | 2/1989 | Sirinyan et al. | | |
| 4,810,485 A | 3/1989 | Marianowski | | 423/648.1 |
| 4,857,080 A | 8/1989 | Baker et al. | | 55/16 |
| 5,139,541 A | 8/1992 | Edlund | | 55/16 |
| 5,149,420 A | 9/1992 | Buxbaum | | 205/219 |
| 5,171,822 A | 12/1992 | Pater | | 528/188 |

(Continued)

OTHER PUBLICATIONS

Amandusson, H. Dissertation No.651, "Hydrogen Extraction with Palladium Based Membranes," Institute of Technology, Linkopings Universitet, Department of Physics and Measurement Technology, Linkoping, Sweden, (Forum Scientum, Linkoping, Sweden, 2000).

(Continued)

*Primary Examiner*—Robert H. Spitzer
(74) *Attorney, Agent, or Firm*—Greenlee, Winner And Sullivan, P.C.

(57) ABSTRACT

This invention provides hydrogen-permeable membranes for separation of hydrogen from hydrogen-containing gases. The membranes are multi-layer having a central hydrogen-permeable layer with one or more catalyst layers, barrier layers, and/or protective layers. The invention also relates to membrane reactors employing the hydrogen-permeable membranes of the invention and to methods for separation of hydrogen from a hydrogen-containing gas using the membranes and reactors. The reactors of this invention can be combined with additional reactor systems for direct use of the separated hydrogen.

45 Claims, 16 Drawing Sheets

| 1 |
|---|
| 2 |
| 3 |
| 4 |
| 5 |
| 6 |
| 7 |
| 8 |
| 9 |

U.S. PATENT DOCUMENTS

| | | | |
|---|---|---|---|
| 5,215,729 A | 6/1993 | Buxbaum | 423/248 |
| 5,217,506 A | 6/1993 | Edlund | 55/16 |
| 5,259,870 A | 11/1993 | Edlund | 95/56 |
| 5,332,597 A | 7/1994 | Carolan et al. | 427/243 |
| 5,366,712 A | 11/1994 | Violante et al. | 423/248 |
| 5,393,325 A | 2/1995 | Edlund | 95/56 |
| 5,498,278 A | 3/1996 | Edlund | 96/11 |
| 5,518,530 A | 5/1996 | Sakai et al. | 96/11 |
| 5,534,471 A * | 7/1996 | Carolan et al. | 502/4 |
| 5,614,001 A | 3/1997 | Kosake et al. | 96/10 |
| 5,645,626 A | 7/1997 | Edlund et al. | 95/56 |
| 5,652,020 A | 7/1997 | Collins et al. | 427/230 |
| 5,674,301 A | 10/1997 | Sakai et al. | 48/61 |
| 5,674,302 A * | 10/1997 | Nakayama et al. | 55/385.3 |
| 5,738,708 A | 4/1998 | Peachey et al. | 95/56 |
| 5,821,185 A | 10/1998 | White et al. | 502/4 |
| 5,931,987 A | 8/1999 | Buxbaum | 95/55 |
| 5,980,989 A | 11/1999 | Takahashi et al. | 427/294 |
| 6,037,514 A | 3/2000 | White et al. | 585/520 |
| 6,066,592 A | 5/2000 | Kawae et al. | 502/439 |
| 6,152,987 A | 11/2000 | Ma et al. | |
| 6,183,543 B1 | 2/2001 | Buxbuam | 96/11 |
| 6,187,157 B1 | 2/2001 | Chen et al. | |
| 6,214,090 B1 | 4/2001 | Dye | 95/56 |
| 6,235,417 B1 | 5/2001 | Wachsman et al. | 429/17 |
| 6,267,801 B1 * | 7/2001 | Baake et al. | 95/56 |
| 6,281,403 B1 | 8/2001 | White et al. | 585/658 |
| 6,296,687 B1 | 10/2001 | Wachsman | 95/55 |
| 6,319,306 B1 * | 11/2001 | Edlund et al. | 96/7 |
| 6,350,297 B1 | 2/2002 | Doyle | 95/55 |
| 6,379,514 B1 | 4/2002 | Schulte et al. | |
| 6,461,408 B1 | 10/2002 | Buxbaum | 95/55 |
| 6,475,268 B1 | 11/2002 | Thornton | 96/11 |
| 6,478,853 B1 | 11/2002 | Hara et al. | 95/56 |
| 6,547,858 B1 | 4/2003 | Edlund et al. | 96/4 |
| 6,569,226 B1 | 5/2003 | Dorris et al. | 95/56 |
| 6,572,683 B1 | 6/2003 | Yoshida et al. | |
| 6,576,350 B1 | 6/2003 | Buxbaum | 428/670 |
| 6,641,647 B1 | 11/2003 | Uemura et al. | |
| 6,649,559 B1 | 11/2003 | Drost et al. | |
| 2002/0020298 A1 | 2/2002 | Drost et al. | 96/11 |
| 2002/0062738 A1 | 5/2002 | Yoshida | 96/11 |
| 2003/0000387 A1 | 1/2003 | Uemura | 96/11 |
| 2003/0183080 A1 * | 10/2003 | Mundschau | 95/55 |

OTHER PUBLICATIONS

Balachandran, U.; Lee, T. H.; Dorris, S. E., "Development of Mixed-Conducting Ceramic Membrane for Hydrogen Separation," In *Sixth International Pittsburgh Coal Conference*: Pittsburgh, PA, 1999.

Balachandran, U.; et al., "Development of Dense Ceramic Membranes for Hydrogen Separation," In *26th International Technical Conference on Coal Utilization and Fuel Systems*: Clearwater, FL, Mar. 5-8, 2001, pp. 751-761.

Balachandran, U.; et al., "Current Status of Dense Ceramic Membranes for Hydrogen Separation," In *27th International Technical Conference on Coal Utilization and Fuel Systems*: Clearwater, FL, Mar. 3-7, 2002, pp. 1155-1165.

Balachandran, U.; et al., M. "Development of mixed-conducting oxides for gas separation," *Solid States Ionics* 1998, 108, 363-370. 37.

Balachandran, U.; et al., "Development of Mixed-Conducting Dense Ceramic Membranes for Hydrogen Separation," In *Proceedings of the Fifth International Conference on Inorganic Membranes*: Nagoya, Japan, 1998.

Benziger, J. B. (1991) "Thermochemical Methods for Reaction Energetics on Metal Surfaces," in: Metal-Surface Reaction Energetics, Edited by E. Shustorovich, (VCH Publishers, Weinheim, Germany) pp. 53-107.

Beshers, D. N. (1973) "Diffusion of Interstitial Impurities," in: "Diffusion," (American Society for Metals, Metals Park, Ohio) pp. 209-240.

Bonanos, N. et al., "Ionic Conductivity of Gadolinium-Doped Barium Cerate Perovskites," *Solid State Ionics* 1989, 35, 179-188.

Bonanos, N. "Transport properties and conduction mechanism in high-temperature protonic conductors," *Solid State Ionics* 1992, 53-56, 967-974.

Bonanos, N. "Transport Study of the Solid Electrolyte $BaCe_{0.9}Gd_{0.1}O_{2.95}$ at High Temperatures," *J. Phys. Chem. Solids* 1993, 54, 867-870.

Bonanos, N. et al. "Perovskite solid electrolytes: Structure, transport properties and fuel cell applications," *Solid State Ionics* 1995, 79, 161-170.

Buxbaum, R. E.; Marker, T. L., "Hydrogen transport through non-porous membranes of palladium-coated niobium, tantalum and vanadium," *J. Mem. Sci.* 1993, 85, 29-38.

Chary, A. S.; Reddy, S. N. "Effect of Structural Changes on DC Ionic Conductivity of Rubidium Nitrate Single Crystals," *Phys. Stat. Sol.* 1998, 208, 349-352.

Heed, B. et al., "Proton conductivity in fuel cells with solid sulphate electrolytes," *Solid State Ionics* 1991, 46, 121-125.

Heinze, S.; et al., "Relation between grain size and hydrogen diffusion coefficient in an industrial Pd-23% Ag alloy," *Solid State Ionics* 1999, 122, 51-57.

Iwahara, H.; et al., "Proton Conduction in Sintered Oxides and its Application to Steam Electrolysis for Hydrogen Production," *Solid State Ionics* 1981, 3/4, 359-363.

Iwahara, H.; et al., "Proton Conduction in Sintered Oxides Based on $BaCeO_3$," *J. Electrochem. Soc.* 1988, 135, 529-533.

Iwahara, H.; et al., "High Temperature Solid Electrolyte Fuel Cells Using Perovskite-Type Oxide Based on $BaCoO_3$," *J. Electrochem. Soc.* 1990, 137, 462-465.

Iwahara, H.; et al., "High-temperature $C_1$-gas fuel cells using proton-conducting solid electrolytes," *J. Appl. Electrochem.* 1989, 19, 448-452.

Iwahara, H. "Oxide-ionic and protonic conductors based on perovskite-type oxides and their possible applications," *Solid State Ionics* 1992, 52, 99-104.

Iwahara, H. et al., "An electrochemical steam pump using a proton conducting ceramic," *J. Appl. Electrochem.* 1996, 26, 829-832.

Kreuer, K. D. et al., "H/D isotope effect of proton conductivity and proton conduction mechanism in oxides," *Solid State Ionics* 1995, 77, 157-162.

Kreuer, K. D. "On the development of proton conducting materials for technological applications," *Solid State Ionics* 1997, 97, 1-15.

Kroger, F. A. "Detailed Description of Crystalline Solids; Imperfections," *The Chemistry of Imperfect Crystals*; Chapter 7, North Holland Publishing Co.: Amsterdam, 1964, pp. 192-207.

Lee, W.; Nowick, A. S. "Protonic Conduction in Acceptor-Doped $KTaO_3$ Crystals", *Solid State Ionics* 1986, 18/19, 989-993.

Liang, K. C.; Nowick, A. S. "High-temperature protonic conduction in mixed perovskite ceramics," *Solid State Ionics* 1993, 61, 77-81.

Lunden, A.; Mellander, B.-E.; Zhu, B. "Mobility of Protons and Oxygen Ions in Lithium Sulfate and Other Oxyacid Salts," *Acta. Chem. Scand.* 1991, 45, 981-982.

Munch, W.; et al., "A quantum molecular dynsmics study of proton conduction phenomena in Ba $CeO_3$",*Solid State Ionics* 1996, 86-88, 647-652.

Munch, W. et al. J. "A quantum molecular dynamics study of the cubic phase of $BaTiO_3$ and $BaZrO_3$," *Solid State Ionics* 1997, 97, 39-44.

Nishimura, C. et al., "Hydrogen Permeation Characteristics of Vanadium-Nickel Alloys," M. *Mat. Trans.* 1991, 32, 501-507.

Nishimura, C. et al., "V-Ni alloy membranes for hydrogen purification," *J. Alloys and Compounds* Jan. 2002, 330-332, 902-906.

Norby, T.; Larring, Y. "Mixed hydrogen ion-electronic conductors for hydrogen permeable membranes," *Solid State Ionics* 2000, 136-137, 139-148.

Norby, T.; Larring, Y., "Concentration and Transport of Protons and Oxygen Defects in Oxides," In *Ceramic Oxygen Ion Semiconductors and Their Applications*; Steele, B. C. H., Ed.; The Institute of Materials, 1996, pp. 83-93.

Norby, T., "Proton Conduction in Oxides," *Solid State Ionics* 1990, 40/41, 857-862.

Peachey, N. M. et al., "Composite Pd/Ta metal membranes for hydrogen separation," *J. Mem. Sci.* 1996, 111, 123-133.

Shima, D.; Haile, S. M. "The influence of cation non-stoichiometry on the properties of undoped and gadolinia-doped barium cerate," *Solid State Ionics* 1997, 97, 443-445.

Siriwardane, R. V. Jr., et al., "Characterization of ceramic hydrogen separation membranes with varying nickel concentrations," *Appl. Surf. Sci.* 2000, 167, 34-50.

Stenzenberger, H.D., "Addition Polymides," in: Advances in Polymer Science—High Performance Polymers, vol. 117; Edited by P.M. Hergenrother, (Springer-Verlag Berlin Heidelberg, 1994), pp. 165-220.

Takekoshi, T., "Synthesis of Polyimides," (1996) *Polyimides Fundamentals and Applications*, Chapter 2, (Marcel Dekker, Inc., New York, New York), pp. 7-44.

Van der Merwe, J.H. (1984) "Recent Developments in the Theory of Epitaxy," in: "Chemistry and Physics of Solid Surfaces V," Edited by R. Vanselow and R. Howe, Springer-Verlag, Berlin, 1984) pp. 365-401.

Yajima, T.; Iwahara, H. "Studies on behavior and mobility of protons in doped perovskite-type oxides: (I) In situ measurement of hydrogen concentration in $SrCe_{0.95}Yb_{0.05}O_{3-a}$ at high temperature," *Solid State Ionics* 1992, 50, 281-286.

Yajima, T. et al. "Proton conduction in sintered oxides based on $CaZrO_3$," *Solid State Ionics* 1991, 47, 271-275.

Yamakawa, K. et al., "Hydrogen permeability measurement through Pd, Ni and Fe membranes," *J. Alloys and Compounds* May 2001, 321, 17-23.

Zhang, Y. et al., "Hydrogen permeation characteristics of vanadium-aluminium alloys," *Scripta Materialia* Nov. 2002, 47, 601-606.

Zhu, B.; Mellander, B.-E. "Proton conduction in salt-ceramic composite systems," *Solid State Ionics* 1995, 77, 244-249.

Zhu, B.; Mellander, B.-E. "Proton Conducting Composite Materials at Intermediate Temperatures," *Ferroelectrics* 1995, 167, 1-8.

Zhu, B. et al. "Structure and ionic conductivity of lithium sulphate-aluminum oxide ceramics," *Solid State Ionics* 1994, 70/71, 125-129.

Zhu, B. Solid State Ionics 1999, "Intermediate temperature proton conducting salt-oxide composites," 125, 397-405.

Zhu, B.; Mellander, B.-E., "Ionic Conductivities of Nitrate-Based Oxide Materials for Solid State Fuel Cells," In *High Temperature Electrochemical Behavior of Fast Ion and Mixed Conductors*; Poulsen, F. W., Bentzen, J. J., Jacobson, T., Skou, E., Ostergard, M. J. L., Eds.: Roskilde, 1993, p. 495.

Zhu, B.; Mellander, B.-E. "Proton conducting materials based on hydrofluotides," J. Mat. Sci. Lett. 2000, 19, 971-973.

Zhu, B. "Applications of hydrofluotide ceramic membranes for advanced fuel cell technology," Int. J. Energy Res. 2000, 24, 39-49.

Zhu, B. et al. "Intermediate temperature fuel cells using alkaline and alkaline earth fluoride-based electrolytes," Solid State Ionics 2000, 135, 503-512.

Buxbaum, R.E. et al. (1996), "Hydrogen transport and embrittlement for palladium coated vanadium-chromium-titanium alloys," J. Nucl. Mater. 233-237:510-512.

Buxbaum, R.E. and Kinney, A.B. (1996), "Hydrogen Transport through Tubular Membranes of Palladium-Coated Tantalum and Niobium," Ind. Eng. Chem. Res. 35:530-537.

Edlund, D.J. and Pledger, W.A. (1993), "Thermolysis of hydrogen sulfide in a metal-membrane reactor," J. Membr. Sci. 77:255-264.

Hara, S. et al. (Jul. 2002), "Hydrogen permeation through palladium-coated amorphous Zr-M-Ni (M=Ti, Hf) alloy membranes," Desalination 144:115-120.

Moss, T.S. et al. (1998), "Multilayer Metal Membranes for Hydrogen Separation," Int. J. Hydrogen Energy 23(2):99-106.

Nishimura, C. et al. (1994), "Hydrogen permeation characteristics of vanadium-molybdenum alloys," Trans. Mat. Res. Soc. Jpn. 18B:1273-1276.

Nishimura, C. et al. (1999), "Hydrogen permeation through magnesium," J. Alloys Compounds 293-295:329-333.

Ozaki, T. et al. (Mar. 2002), "Preparation of palladium-coated V and V-15Ni membranes for hydrogen purification by electroless plating technique," Int. J. Hydrogen Energy 28:297-302.

Ozaki, T. et al. (Nov. 2003), "Hydrogen permeation characteristics of V-Ni-Al alloys," Int. J. Hydrogen Energy 28:1229-1235.

\* cited by examiner

| Metal or Metal Alloy Catalyst |
|---|
| Barrier Coating |
| |
| H$_2$-Permeable Metal or Alloy |
| |
| Barrier Coating |
| Metal or Metal Alloy Catalyst |

Figure 1B

| Multi-phase Ceramic or Cermet Catalyst |
|---|
| Barrier Coating |
| |
| H$_2$-Permeable Metal or Alloy |
| |
| Barrier Coating |
| Multi-phase Ceramic or Cermet Catalyst |

Figure 1C

| Metal or Metal Alloy Catalyst |
|---|
| Barrier Coating |
| H₂-Permeable Cermet |
| Barrier Coating |
| Metal or Metal Alloy Catalyst |

Figure 1D

| Multi-phase Ceramic or Cermet Catalyst |
|---|
| Barrier Coating |
| H₂-Permeable Cermet |
| Barrier Coating |
| Multi-phase Ceramic or Cermet Catalyst |

Figure 1E

DENSE, LAYERED MEMBRANES FOR HYDROGEN SEPARATION

CROSS-REFERENCE TO RELATED APPLICATIONS

This application takes priority under 35 U.S.C. 119(e) from U.S. provisional application Ser. No. 60/502,158, filed Sep. 10, 2003. This application is a continuation-in-part of U.S. patent application Ser. No. 10/382,354, filed Mar. 5, 2003, now U.S. Pat. No. 6,899,744 which in turn takes priority from U.S. provisional application 60/362,167, filed Mar. 5, 2002. Each of these applications is incorporated by reference herein to the extent that it is not inconsistent with the disclosure herein.

STATEMENT REGARDING FEDERALLY FUNDED RESEARCH

This invention was made with United States government funding though the Department of Energy National Energy Technology Laboratory Contract No. DE-FC26-00NT40762. The United States government has certain rights in this invention.

BACKGROUND OF THE INVENTION

The present invention relates to hydrogen-permeable membranes, which separate hydrogen from mixtures of gases by allowing selective diffusion of hydrogen through the membrane while substantially blocking the diffusion of other components in the gas mixtures. The invention also relates to membrane reactors for hydrogen separation employing the membranes of this invention and to methods for separating hydrogen using these membranes.

Hydrogen can serve as a clean fuel for powering many devices ranging from large turbine engines in integrated gasification combined cycle electric power plants, to small fuel cells. Hydrogen can also power automobiles, ships and submarines and can be used as heating fuel. Large quantities of hydrogen are used in petroleum refining. In chemical industry, membranes, which are selectively permeable to hydrogen are expected to be useful in the purification of hydrogen and also to shift chemical equilibrium in hydrogenation or de-hydrogenation reactions or in the water-gas shift reaction. Membranes are also used by the semiconductor industry for production of ultra-high purity hydrogen. The nuclear industry uses membranes for separation of hydrogen isotopes from isotopes of helium and other components of plasmas.

Methods of producing hydrogen include steam reforming or partial oxidation of natural gas, petroleum, coal, biomass, and/or municipal waste. Production of hydrogen from these sources can be accompanied by production of carbon dioxide, carbon monoxide, hydrogen sulfide and other gases. It is highly desired to separate hydrogen from the unwanted side-products and gaseous contaminants. Use of hydrogen permeable membranes is one means for separating hydrogen from complex gas mixtures.

U.S. Pat. No. 2,824,620 (de Rossett) relates to hydrogen-permeable membranes formed from a layer or film of hydrogen-permeable membrane on certain porous support matrices. In related U.S. Pat. No. 2,958,391 (de Rosset) the hydrogen-permeable membrane is formed using a support matrix of sintered metal particles. U.S. Pat. No. 3,350,846 (Makrides, et al.) reports hydrogen-permeable membranes formed from Group VB metal foils coated on both sides with palladium catalysts.

U.S. Pat. No. 4,536,196 (Harris) relates to a hydrogen diffusion membrane which is palladium or a palladium alloy coated with at least one metal selected from Group IB, IVB, VB and VIB of the Periodic Table. The coating is reported to increase resistance of the palladium or palladium alloy to poisoning. U.S. Pat. No. 4,313,013 (Harris) relates to a hydrogen diffusion membrane of palladium or certain palladium alloys that has been treated with silane and/or silicon tetrafluoride. The treatment is reported to deposit a film of elemental silicon to prevent poisoning of the metal or alloy and extend its use before regeneration is required.

U.S. Pat. No. 4,468,235 (Hill) relates to separation of hydrogen from other fluids employing a hydrogen-permeable coated alloy at a temperature between about 100–500° C. The alloy reported is a titanium alloy comprising 13% by weight vanadium, 11% by weight chromium and 3% by weight aluminum stabilized in the body-centered cubic crystalline form. At least one surface of the alloy is coated with a metal or alloy "based on" palladium, nickel, cobalt, iron, vanadium, niobium, or tantalum.

U.S. Pat. No. 4,496,373 relates to a hydrogen diffusion membrane that is a non-porous hydrogen-permeable metallic membrane provided with a coating of an alloy of palladium with at least 45 atomic % Cu or at least 50 atomic % Ag or at least 7 atomic % Y. The membrane is reported to contain Cu, Ag or Y in a concentration at least equilibrated with the coating at operational temperature.

U.S. Pat. No. 4,589,891 (Iniotakis et al.) reports hydrogen-permeable membranes formed by galvanic deposition of metals with high hydrogen permeability onto fine mesh metal fabric. High permeability metals are said to include Nb, Ta, V, Pd and Zr. Palladium and its alloys are said to be preferred because they are resistant to the formation of hydrides and to surface oxidation. A thin metal layer, 1 to 20 microns thick, particularly of palladium and palladium silver alloys is formed on fine metal wire mesh. The metal of the wire mesh is not specified. The patent also reports membranes formed by thin layers of hydrogen-permeable metal sandwiched between two fine metal mesh screens which provide mechanical support. The authors reported that fine metal mesh was superior to porous metals as mechanical supports for thin films of palladium and palladium alloys. Related U.S. Pat. No. 4,699,637 (Iniotakis et al.) reports hydrogen-permeable membranes formed by sandwiching a layer or foil of a hydrogen-permeable metal between two fine metal meshes to provide mechanical support.

U.S. Pat. No. 5,738,708 (Peachey, et al.) reports a composite metal membrane for hydrogen separation in which a layer of Group IVB metals or Group VB metals is sandwiched between two layers of an oriented metal layer of palladium, platinum or alloys thereof. The oriented metal layer is referred to as the "catalyst" layer. The membrane is exemplified by one formed by metal evaporation (Pd) onto a tantalum foil. Additionally, optional buffer layers of certain oxides and sulfides are reported to reduce interdiffusion of the metals. Related U.S. Pat. No. 6,214,090 (Dye and Snow) reports that palladium, platinum, nickel, rhodium, iridium, cobalt and alloys thereof can be used as the outermost catalytic layers of the hydrogen transport membrane. They also report the use of a diffusion barrier which includes non-continuous layers of metal chalcogenides between the core metal and catalyst layers.

U.S. Pat. No. 5,149,420 (Buxbaum and Hsu) reports methods for plating Group IVB and VB metals, in particular niobium, vanadium, zirconium, titanium and tantalum, with palladium from aqueous solution to form membranes for hydrogen extraction. The metal to be plated is first roughened and electrolytically hydrided before plating. Related U.S. Pat. No. 5,215,729 (Buxbaum) reports a membrane for hydrogen extraction consisting essentially of a thick first layer of refractory metal or alloy that is permeable to hydrogen and a second layer coated over the first layer consisting essentially of palladium, alloys of palladium, or platinum. Refractory metals are said to include vanadium, tantalum, zirconium, niobium and alloys including alloys said to be non-hydrogen embrittling. Alloys specifically stated in the patent to be non-hydrogen embrittling are: "Nb 1% Zr, Nb 10 Hf 1 Ti", Vanstar(Trademark) and "V15Cr5Ti."

U.S. Pat. No. 5,931,987 (Buxbaum) reports an apparatus for extracting hydrogen from fluid streams containing hydrogen which has at least one extraction membrane. The patent also reports an extraction membrane consisting essentially of a layer of Pd—Ag or Pd—Cu alloy or combinations thereof one of the surfaces of which is coated with a layer consisting essentially of palladium, platinum, rhodium and palladium alloys. U.S. Pat. No. 6,183,543 (Buxbaum) relates to an apparatus for extracting a gas, particularly hydrogen, from a fluid stream using plate membranes. The patent reports that extraction membranes can have a substrate layer of certain specified alloys: Ta—W, V—Co, V—Pd, V—Au, V—Cu, V—Al, Nb—Ag, Nb—Au, Nb—Pt, Nb—Pd, V—Ni—Co, V—Ni—Pd, V—Nv—Pt or V—Pd—Au with an outer catalyst layer of palladium, platinum, rhodium and palladium alloy. Preferred outer catalysts were stated to include Pd—Ag alloys with compositions between Pd-20% Ag and Pd-50% Ag, alloys of Pd-40% Cu, and Pd-10% Pt.

U.S. Pat. Nos. 5,139,541; 5,217,506; 5,259,870; 5,393,325; and 5,498,278 (all of Edlund) relate to non-porous hydrogen-permeable composite metal membranes containing an intermetallic diffusion barrier separating a hydrogen-permeable base metal and a hydrogen-permeable coating metal. In U.S. Pat. Nos. 5,139,541 and 5,217,506 the intermetallic diffusion barrier is described as a thermally stable inorganic proton conductor. A proton conductor is defined therein as any material that shows complex ion motion at high temperatures and is exemplified by the oxides and sulfides of molybdenum, silicon, tungsten and vanadium. In U.S. Pat. No. 5,217,506, specific uses for the hydrogen transport membranes which include decomposition of hydrogen sulfide and extraction of hydrogen from a water-gas shift mixture of gases are discussed. U.S. Pat. No. 5,259,870 reports the use of oxides of aluminum, lanthanum and yttrium as the diffusion barriers.

U.S. Pat. No. 5,393,325 reports a composite metal membrane in which an intermediate layer is positioned between the base metal and a coating metal where the intermediate layer does not form a thermodynamically stable hydrogen impermeable layer at temperatures ranging from about 400° C. to about 1000° C. The intermediate layer is said not to be a pure metal or metal alloy. The base metal is said to be selected from the metals of Group IB, IIIB, IVB, VB, VIIB and VIIIB and hydrogen-permeable lanthanides and alloys. The intermediate layer is said to include not only various oxides and sulfides, but also carbides, nitrides, borides, fluorides, zeolites, graphite and diamond.

U.S. Pat. No. 5,498,278 (Edlund) reports the use of a flexible porous intermediate layer between a rigid support layer and a nonporous hydrogen-permeable metal coating layer or the use of a textured metal coating layer to form a composite hydrogen-permeable inorganic membrane. The support layer is said to include a wide range of materials including "dense hydrogen-permeable metals, porous, perforated and slotted metals," and "porous, perforated and slotted ceramics." It is stated that it is key to accommodating dimensional change that a flexible non-sintered intermediate layer be provided or that a textural coating layer be employed. The intermediate layer is also said to prevent intermetallic diffusion between the support matrix and the coating metal layer. In all of the Edlund patents, interdiffusion between the base metal layer and the coating layer is mentioned as a problem that is solved by introduction of the intermetallic diffusion barrier or the intermediate layer. Ceramic monoliths with honeycomb-like cross section are also reported as supports for coating layers.

U.S. Pat. No. 6,475,268 (Thornton) reports a supported membrane for hydrogen separation in a fuel cell in which the membrane is formed by deposition of a metal alloy over a foil substrate that is microetched. Exemplified metal alloys are Pd/Cu or V/Cu. Stainless steel is exemplified as the microetched foil substrate.

U.S. Pat. No. 6,478,853 (Hara et al.) reports a membrane for separation and dissociation of hydrogen which comprises an "amorphous" alloy comprising at least one of Zr, Hf and Ni. Exemplified membrane materials were described as "ribbon-shaped" and "amorphous."

U.S. Pat. No. 6,569,226 (Dorris et al.) reports membranes for hydrogen separation comprising a sintered homogeneous mixture of a ceramic composition and a metal where the metal may be Pd, Nb, Ta, V or Zr or a binary mixture of palladium with another metal such as Nb, Ag, Ta, V or Zr. Balachandran et al. reported mixed conducting ceramic and cermet membranes for hydrogen separation, although the exact compositions were not reported. (Balachandran, U.; Ma, B.; Maiya, P. S.; Mieville, R. L.; Dusek, J. T.; Picciolo, J.; Guan, J.; Dorris, S. E.; Liu, M. *Solid State Ionics* 1998, 108, 363; Balachandran, U.; Guan, J.; Dorris, S. E.; Bose, A. C.; Stiegel, G. J. In *Proceedings of the Fifth International Conference on Inorganic Membranes*: Nagoya, Japan, 1998; Balachandran, U.; Lee, T. H.; Dorris, S. E. In *Sixth International Pittsburgh Coal Conference*: Pittsburgh, Pa., 1999.) Additionally, Balachandran et al. reported cermet membranes where the metal phase has high hydrogen permeability. (Balachandran, U.; Lee, T. H.; Zhang, G.; Dorris, S. E.; Rothenberger, K. S.; Howard, B. H.; Morreale, B.; Cugini, A. V.; Siriwardane, R. V.; Jr., J. A. P.; Fisher, E. P. In *26th International Technical Conference on Coal Utilization and Fuel Systems*: Clearwater, Fla., 2001, pp 751–761; Balachandran, U.; Lee, T. H.; Wang, S.; Zhang, G.; Dorris, S. E. In *27th International Technical Conference on Coal Utilization and Fuel Systems*: Clearwater, Fla., 2002, pp 1155–1165.)

U.S. Pat. No. 4,857,080 (Baker et al.); U.S. Pat. No. 5,366,712 (Violante et al.); U.S. Pat. Nos. 5,518,530; 5,652,020 (Collins et al.); U.S. Pat. No. 5,674,302 (Sakai et al.); and U.S. Pat. No. 6,066,592 (Kawae et al.) relate to hydrogen separation membranes having a ceramic support coated with certain hydrogen permeable metals or certain palladium alloys.

U.S. Pat. No. 5,980,989 (Takahashi et al.) reports membranes for hydrogen separation in which pores of a porous substrate are filled with palladium or a palladium alloy.

Siriwardane et al. (Applied Surface Science (2000) 167: 34–50) relates to hydrogen separation membranes in the stoichiometric form $BaCe_{0.8}Y_{0.2}O_3$ doped with Ni. Membranes with 30, 35 and 40 vol. % Ni are exemplified. Balachandran et al.(In *Sixth International Pittsburgh Coal Conference*: Pittsburgh, Pa., 1999) also reported cermet membranes for hydrogen separation based on $BaCe_{0.8}Y_{0.2}O_3/Ni$. Additionally, Balachandran et al. reported cermet membranes where the metal phase has high hydrogen permeability (Balachandran, U.; Lee, T. H.; Zhang, G.; Dorris, S. E.; Rothenberger, K. S.; Howard, B. H.; Morreale, B.; Cugini, A. V.; Siriwardane, R. V.; Jr., J. A. P.; Fisher, E. P. In *26th International Technical Conference on Coal Utilization and Fuel Systems*: Clearwater, Fla., 2001, pp 751–761; Balachandran, U.; Lee, T. H.; Wang, S.; Zhang, G.; Dorris, S. E. In *27th International Technical Conference on Coal Utilization and Fuel Systems*: Clearwater, Fla., 2002, pp 1155–1165.)

Although a large volume of work has been conducted on proton-conducting ceramics (which herein are designated hydrogen ion-conducting ceramics), for example, metal oxides, oxyacid salts, and fluorides, relatively little work has related to mixed hydrogen ion/electron (or hole) conductors for hydrogen purification. U.S. Pat. Nos. 5,821,185; 6,037,514 and 6,281,403 (White et al.) report perovskite-based ceramics which exhibit mixed hydrogen ion conduction and electron conduction having the general formula:

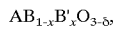

where A=Ca, Sr, or Ba; B=Ce, Tb, Pr, or Th; B'=Ti, V, Cr, Mn, Fe, Co, Ni, or Cu; and $0.2 \geq x \geq 0.5$, and $\delta$ is a value that renders the formula charge neutral.

U.S. Pat. No. 6,296,687 (Wachsman and Jiang) reported mixed hydrogen ion/electron conducting ceramics based on $ACe_{1-x}M_xO_3$, where A=Ba, Ca, Mb, Sr; M=Eu or Tb, and $0<x<1$. Additionally, U.S. Pat. No. 6,235,417 (Wachsman and Jiang) relates to a two-phase hydrogen separation membrane based on a perovskite and palladium.

Zhu et al. reported the use of hydrogen ion conducting oxyacid and fluoride salts with potential applications for fuel cells. (Zhu, B.; Mellander, B.-E. *Solid State Ionics* 1995, 77, 244–249; Zhu, B.; Mellander, B.-E. *Ferroelectrics* 1995, 167, 1–8; Zhu, B. *Solid State Ionics* 1999, 125, 397–405; 52; Zhu, B.; Mellander, B.-E. *J. Mat. Sci. Lett.* 2000, 19, 971–973: Zhu, B. *Int. J Energy Res.* 2000, 24, 39–49; Zhu, B.; Albinsson, I.; Mellander, B.-E. *Solid State Ionics* 2000, 135, 503–512.)

Norby and Larring reported theoretical aspects of mixed hydrogen ion/electron conducting ceramic-based membrane for hydrogen separation. (Norby, T.; Larring, Y. *Solid State Ionics* 2000, 136–137, 139–148.)

The scientific literature relating to hydrogen transport membranes is extensive, especially concerning membranes of palladium and it alloys, some of which are available commercially. However, there remains a significant need in the art for membranes that are selectively permeable to hydrogen which exhibit high permeation rates or permeability and which exhibit long operational lifetimes under actual operating conditions.

SUMMARY OF THE INVENTION

This invention relates to membranes, which are selectively permeable to hydrogen, useful for the separation of hydrogen from other components. The invention further relates to membrane reactors comprising membranes of the invention and to methods of separating hydrogen from other components employing the membranes and membrane reactors of the invention. The invention further relates to metal and metal alloy, cermet and ceramic compositions which can be employed in making the hydrogen permeable membranes of this invention. Membranes of this invention operate non-galvanically for hydrogen separation—it is not necessary to apply current to the membrane to transport hydrogen.

The dense or non-porous membranes of this invention are formed from a plurality of different layers which together function to achieve hydrogen separation, and in addition to provide suitable mechanical stability, provide resistance to poisoning by non-hydrogen feed-gas components or contaminants, and/or minimize membrane embrittlement by hydrogen. The multi-layered membrane is operationally positioned between a hydrogen-containing feedstream (e.g., a hydrogen-containing gas) and a hydrogen sink and as such has a surface in contact with (e.g., in fluid communication with) the hydrogen feedstream and a surface in contact with the hydrogen sink.

The membranes herein comprise a non-porous central layer that is selectively permeable to hydrogen (NPSP layer) and at least a first catalyst layer that facilitates the dissociation of hydrogen between the hydrogen feedstock and the non-porous central layer. Preferably the NPSP layer has a hydrogen permeation rate of at least about 3 mL/min/cm$^2$ or a permeability of at least about $1 \times 10^{-8}$ mol/m/m$^2$/s/Pa$^{1/2}$. More preferably the NPSP layer has a hydrogen permeation rate of at least about 8 mL/min/cm$^2$ or a permeability of at least about $5 \times 10^{-8}$ mol/m/m$^2$/s/Pa$^{1/2}$. Relative positions of layers in the membrane are defined with respect to the hydrogen feedstock, the NPSP layer and the hydrogen sink. Further, each layer of the membrane has two surfaces, one surface directed towards the hydrogen feedstock and the other directed away from the hydrogen feedstock and directed toward the hydrogen sink. Membranes herein optionally comprise a second catalyst layer, which may be the same or different from the first catalyst layer which is positioned between the central hydrogen selectively permeable layer and the hydrogen sink and which promotes or facilitates the reassociation of hydrogen. A layer in the membrane is physically or chemically distinguishable from immediately adjacent layers in the membrane, for example by composition, porosity and/or properties.

In embodiments of the invention, the multi-layered membrane of the invention comprises the non-porous hydrogen-selectively permeable (NPSP) layer, the first catalytic layer and one or more of the following additional layers:

one or more porous protective layers, which may be formed of the same or different materials, which provide protection from feedstock contaminants positioned between the hydrogen feedstock and the catalyst layer and/or between the hydrogen sink and the NPSP layer and/or between the hydrogen sink and any second catalyst layer; or one or more barrier layers, which may be formed of the same or different materials, which minimize detrimental interdiffusion between the catalyst layer and the NPSP layer, positioned between the first catalyst layer and the NPSP layer or between any second catalyst layer and the NPSP layer.

In embodiments of the invention, the multi-layered membrane of the invention comprises one or more porous protective layers, a first catalyst layer, the NPSP layer, and a second catalyst layer and one or more porous protective layers, the layers listed from in order from the hydrogen feedstock surface of the membrane to the hydrogen sink surface of the membrane. In other related embodiments of the invention, the multi-layered membrane of the invention comprises one or more porous protective layers, a first catalyst layer, the NPSP layer, a second catalyst layer and one or more porous protective layers, the layers listed in order from the hydrogen feedstock surface of the membrane to the hydrogen sink surface of the membrane.

In specific embodiments of the invention the NPSP layer is a hydrogen-permeable cermet. The cermet layer is non-porous. The ceramic of the cermet is dense or non-porous.

The ceramic may, but need not, be permeable to hydrogen. The ceramic may, but need not, be a proton-conducting ceramic or more generally a hydrogen ion-(proton or hydride) conducting ceramic. The ceramic may, but need not, be an electronic or an electron conductor. The ceramic, may, but need not, be a mixed conducting ceramic that exhibits ionic (e.g., hydrogen ion) and electronic or electron conductivity. Dependent upon the ceramic, the metal may or may not be hydrogen permeable. The metal and ceramic are selected to provide a cermet layer that is hydrogen permeable. The cermet can, in one embodiment, comprise a metal or metal alloy which is hydrogen-permeable and a ceramic which functions primarily for structural support. The cermet, can in another embodiment, comprise a hydrogen ion-conducting ceramic and a metal or metal alloy which may, but need not, be hydrogen permeable.

In specific embodiments, the hydrogen-permeable metal of the cermet is vanadium, niobium, tantalum, titanium, zirconium, or an alloy thereof, and particularly a binary, ternary or higher order alloy of vanadium, niobium, tantalum, titanium, or zirconium with one or more different metals selected from vanadium, niobium, tantalum, titanium, zirconium, aluminum, cobalt, chromium, iron, manganese, molybdenum, copper, nickel, gallium, germanium, tin, silicon, tungsten, lanthanum, beryllium and hafnium. Hydrogen-permeable metals of the cermets of the NPSP layer include, among others, vanadium, niobium, tantalum, zirconium or alloys thereof, alloys of vanadium, niobium, tantalum or zirconium with one or more of nickel, titanium, aluminum, chromium, iron or copper. Hydrogen-permeable metals of the cermets of the NPSP layer include vanadium or alloys of vanadium with one or more of nickel, aluminum, titanium or mixtures thereof. Hydrogen-permeable metals of the cermets of the NPSP layer include alloys of vanadium with titanium and optionally one or more of nickel, or aluminum. In a specific embodiment, hydrogen-permeable metals include alloys of vanadium and titanium containing from about 1 to about 20 atom % titanium (and all subranges thereof). In another specific embodiment, hydrogen-permeable metals include alloys of vanadium and nickel containing from about 1 to about 20 atom % nickel (and all subranges thereof). Preferred ceramics useful in the cermets of the NPSP layer are chemically and mechanically stable under membrane operation conditions and unreactive with the metal of the cermet. Preferably for increased mechanical stability and longer useful membrane life, the ceramic and the metal of the cermet are selected to have similar thermal expansion characteristics. Ceramics of the cermet include metal oxides, e.g., alumina, zirconia, strontium titanate or mixtures thereof.

Hydrogen ion-conducting ceramics useful in cermets for NPSP layers include hydrogen ion-conducting perovskites and particularly those having the stoichiometry:

$$A_{1-x}A'_xB_{1-y}B'_yO_{3-\delta} \quad (1)$$

where x and y are greater than or equal to zero, but less than one, preferably at least one of x or y is greater than zero, and x and y preferably range from 0 to 0.9; A and A' are different and can be selected from Ba, Sr and Ca and B and B' are different and can be selected from Ce, Ti, Zr, Sn, Tb, Pr, Th, Y, Gd, Nb, Bi, Nd, Sc, V, Cr, Mn, Fe, Co, Ni, Cu, and mixtures thereof and δ is a number that renders the composition charge neutral. In specific embodiments, one or both of x and y are between 0 and 0.5.

Hydrogen ion-conducting ceramics include those of formula 1 above where x is zero, B is Ce, Tb, Pr, Th, or mixtures thereof, B' is Ti, V, Cr, Mn, Fe, Co, Ni, Cu or mixtures thereof, and $0.2 \leq y \leq 0.5$.

Hydrogen ion-conducting ceramics include in particular those having the stoichiometry:

$$ACe_yB'_{1-y}O_{3-\delta} \quad (2)$$

Where A is Ba or Sr, y is greater than zero, but less than 1; δ is a number that renders the composition charge neutral and B' is yttrium, cobalt, manganese or mixtures thereof. These hydrogen ion-conducting materials may be substantially single phase materials or materials exhibiting two or more distinguishable metal oxide phases. In specific embodiments, the hydrogen ion-conducting ceramic has stoichiometry of the above formula 2 where y is 0.8–0.9 and B' is cobalt or manganese.

In specific embodiments of the invention, the NPSP layer is a cermet comprising a hydrogen ion-conducting ceramic and a metal that is not substantially permeable to hydrogen. The ceramic can for example be a mixed metal oxide having the stoichiometry of formula 1 above and the metal can be a transition metal. In a specific embodiment, the NPSP layer is a cermet comprising a hydrogen ion-conducting membrane and nickel.

Cermets useful for the NPSP layer include those that contain from about 30 vol. % metal to about 99 vol. % metal. Cermets of the NPSP layer can contain from about 40 vol. % metal to about 80 vol. % metal. Cermets of the NPSP layer can contain from about 40 vol. % metal to about 60 vol. % metal.

In specific embodiments of the invention, the NPSP layer is a hydrogen-permeable metal or metal alloy other than palladium or an alloy of palladium. In preferred embodiments, the NPSP layer is vanadium, niobium, tantalum, zirconium, titanium and alloys thereof, including alloys of vanadium, niobium, tantalum, titanium and zirconium with different metals, including for example, vanadium, niobium, tantalum, zirconium, titanium, aluminum, cobalt, chromium, iron, manganese, molybdenum, copper, nickel, gallium, germanium, tin, silicon, tungsten, lanthanum, beryllium, hafnium or mixtures thereof. In specific embodiments, the NPSP layer is an alloy of vanadium, niobium, tantalum, or zirconium and one or more of titanium, aluminum, cobalt, chromium, iron, manganese, molybdenum, copper, nickel, gallium, germanium, tin, silicon, tungsten, lanthanum, beryllium, hafnium or mixtures thereof. NPSP layer alloys include those having from about 1 at. % to about 50 at. % of titanium, aluminum, cobalt, chromium, iron, manganese, molybdenum, copper, nickel, gallium, germanium, tin, silicon, tungsten, lanthanum, beryllium, hafnium or mixtures thereof with one of vanadium, niobium, tantalum, or zirconium. NPSP layer alloys include those having from about 1 at. % to about 25 at. % titanium, aluminum, cobalt, chromium, molybdenum or a mixture thereof with one or more of vanadium, niobium, tantalum, or zirconium. NPSP layer alloys include those having from about 5 at. % to about 15 at. % titanium, aluminum, cobalt, chromium or molybdenum or a mixture thereof with one or more of vanadium, niobium, tantalum, or zirconium. Alloys useful for NPSP layers also include alloys of vanadium, niobium or tantalum with one or more of aluminum, titanium, cobalt, chromium, molybdenum or mixtures thereof. Additional alloys for NPSP layers are alloys of vanadium with titanium, aluminum and chromium or mixtures thereof. NPSP layers include alloys of vanadium with titanium and particularly those alloys containing from about 1 at. % to about 50 at. % titanium, those containing from 1 at. % to about 25 at. % titanium and those containing from about 5 at. % titanium to about 15 at. % titanium.

Catalyst layers can be metal (including alloys) or cermet layers and may be porous or non-porous. The catalyst may be a continuous layer or it may be composed of a plurality of catalyst islands (e.g., forming a discontinuous layer across the membrane surface). If non-porous, the catalyst layer must be hydrogen permeable. Catalyst layers include metals of the Group IB, VIIB and VIIIB and alloys thereof. Specific examples of catalysts include Pd, alloys of Pd, including Pd/Ag and Pd/Cu alloys, Ni and Pt and alloys thereof. Cermet catalyst layers have a metal phase that is a metal or alloy of a Group IB, VIIB, or VIIIB metal. The metal can be present in the cermet at a level between about 10 vol. % to 99 vol. %. The metal can be present in the cermet at a level between about 30 vol. % and about 80 vol. %. The metal can be present in the cermet at a level between about 40 vol. % and about 60 vol. %. The ceramic phase of the cermet can be porous or non-porous and may be, but need not be, hydrogen permeable. The ceramic phase of the cermet can be a mixed hydrogen ion-conducting and electron conducting ceramic.

Alternatively, the catalyst layer can be a cermet comprising a hydrogen-permeable ceramic and a metal. Metal phases can be selected from Ti, V, Nb, Ta, Zr, Cr, Mo, W, Mn, Fe, Co, Ni, Cu, Ag, Au, Pt, Ir or alloys thereof. Metal phases can be selected from alloys of vanadium and particularly titanium/vanadium, aluminum/vanadium or nickel/vanadium alloys. Metal phases can be selected from palladium and alloys of palladium including Pd/Ag alloys.

Catalyst layers can also comprise ceramics, particularly multi-phase ceramics, which exhibit both hydrogen ion conductivity and electron conductivity. In specific embodiments, the catalyst layers comprise a hydrogen ion-conducting phase in combination with an electron-conducting phase. In more specific embodiments, the catalyst layers can comprise a hydrogen ion-conducting ceramic, such as an oxyacid salt, a fluoride salt, a mixed metal oxide perovskite or a mixed metal doped perovskite, in combination with an electron-conducting ceramic phase which may be a mixed metal oxide. Indium-tin-oxide (approximately 91 mol. % $In_2O_3$ and 9 mol. % $SnO_2$) is also a useful electron-conducting material. Electron-conducting ceramics also generally include perovskites containing transition metals with mixed valency. In particular, electron-conducting ceramics include oxides of Ti, V, Cr, Mn, Fe, Co, Ni, Cu and mixtures thereof. Mixed metal oxide electron-conducting materials include those of composition:

$$La_{1-x}Sr_xBO_3 \quad (3)$$

where B is Mn, Co, Fe, Cr, Cu, or mixtures thereof; and $0 \leq x \leq 1$; and in a specific embodiment electron-conducting ceramics include $La_{1-x}Sr_xMnO_3$ ($0.1 \leq x \leq 0.4$), $La_{1-x}Sr_xCoO_3$ ($0.1 \leq x \leq 0.4$), or $Sr\, Mn_{1-y}Co_yO_3$ ($y \leq 0.2$).

Protective layers are porous metal oxide layers which if present are positioned as the outermost layers of the multilayer hydrogen-permeable membranes. The protective layers protect the catalyst and NPSP layers from the detrimental effects of feedstream and other contaminants that may enter the membrane reactor system. For example, the protective layers can minimize undesired deposition of metals from the feedstream or from metal equipment, tubing or plumbing used in the membrane reactor system onto the catalyst or NPSP layer. Exemplary protective layers include alumina, zirconia, or other metal oxides. Additionally activated carbon or zeolites can be employed. Protective layers can also provide protection from chemical contaminants in the feedstock that would detrimentally affect membrane layer function. In particular, a metal oxide that forms stable sulfides can be used to protect the membrane from sulfur-containing compounds. For example, a protectively layer of porous ZnO, $La_2O_3$, SrO, $CeO_2$, or perovskites such as $SrCeO_3$ or $La_{1-x}Sr_xCoO_{3-\delta}$ (where $0 \leq x \leq 1$ and $\delta$ is a number that renders the material charge neutral) can be used to protect the catalyst and NPSP layers from poisoning by sulfur-containing species, including hydrogen sulfide. Hydrogen sulfide dissociation is promoted by addition of copper to the metal oxide of the protective layer. In additional examples, a protective layer comprising a ceramic or other material that absorbs or decomposes water or hydrocarbons can be provided.

In a specific example, a hydrogen-permeable membrane of this invention has two outer layers of porous aluminum oxide and porous zinc oxide at the hydrogen feed side of the membrane. In another specific embodiment, a hydrogen-permeable membrane of this invention has two outer layers of porous aluminum oxide and porous zinc oxide at the hydrogen feed side of the membrane and an additional porous aluminum oxide layer, porous zinc oxide layer, or both at the hydrogen sink side of the membrane. In another specific example, an outer layer comprising aluminum oxide and zinc oxide in combination is provided at the hydrogen feed side of the membrane, or at both the hydrogen feed side and the hydrogen sink side of the membrane. The choice of protective layers on the membrane depends upon the likely detrimental contaminants that may be present in a given hydrogen feedstock.

In an alternative or additional embodiment, a hydrogen-permeable membrane of this invention is positioned in a membrane reactor which in addition comprises protective materials in a porous layer or bed separated from the membrane, but positioned with respect to the membrane such that hydrogen feed passes through the separate protective layer or bed prior to contacting the membrane. Similar separate protective layers or beds can also be provided to protect the hydrogen sink side of the membrane from contaminants that may be in or enter into the hydrogen sink. The membrane employed in such reactors may have no protective layers or may have one or more protective layers as the outermost layers of the membrane. In specific embodiments, a reactor for separating hydrogen from a hydrogen-containing gas comprises in addition to a membrane of this invention one or more protective layers or beds containing alumina, zinc oxide or both separate from the membrane, but as positioned in the reactor, in fluid communication with the membrane such that feedstock passes through the protective layers or beds prior to contacting the membrane. A reactor may also comprise an additional protective layer or bed positioned to protect the hydrogen sink side of the membrane. The protective layer or bed can be provided for example as a porous bed of particulate metal oxide, containing, for example, alumina, zinc oxide or both, in close proximity or in contact with the membrane surface.

Hydrogen-permeable barrier layers are provided to minimize detrimental interdiffusion between the catalyst layer or layers and the NPSP layer at operating temperatures of the membrane. The barrier layers are ceramic or cermet layers sufficiently thin or porous to allow hydrogen permeation without allowing contact between metals or metal phases of the adjacent layers. The barrier layers may have some porosity, as noted, but are preferably non-porous or dense to minimize interdiffusion. Preferred barrier materials exhibit significant hydrogen permeability. Barrier layers are more preferably employed when either the catalyst layer or the NPSP layer are metals (or alloys) or cermets which contain high levels of metal (e.g. cermets with about 60 vol. % or more of metal).

In a specific embodiment, the barrier layer can be a metal oxide layer, which may be a metal oxide of one or more of the metals in the adjacent catalyst or NPSP layer. The barrier layer is porous or, if dense, it is hydrogen permeable. In other specific embodiments, the barrier layer can be a hydrogen ion-conducting salt, such as an oxyacid salt, or a fluoride salt, or a ceramic that conducts both hydrogen ions and electrons. The barrier layer can be a multiphase ceramic comprising at least one hydrogen ion-conducting ceramic phase and at least one electron-conducting phase.

The invention also relates to membrane reactors and methods employing the membranes and membrane reactors herein. Membranes and membrane reactors of this invention can be employed for separating hydrogen gas from a gas mixture, more particularly for separating hydrogen from gas mixtures containing $CO_2$, CO, $H_2S$ or mixtures thereof and more specifically for separating hydrogen from gasified coal or water-gas-shift mixtures. The membrane reactor of this invention comprises a hydrogen source (a chamber in fluid communication with a gaseous source containing hydrogen) and a hydrogen sink. The hydrogen source can be any gas mixture containing hydrogen, but can also be a chemical species which on chemical reaction releases hydrogen either as molecular hydrogen or in a dissociated form (e.g., hydrogen ions or atoms). The chemical reaction that releases hydrogen can be an oxidation reaction, such as the oxidation of a hydrocarbon. The hydrogen sink provides for a low concentration of hydrogen by physically removing hydrogen, e.g., by application of a vacuum or by using a sweep gas. Alternatively a hydrogen sink is provided by consuming hydrogen in a chemical reaction, for example by employing hydrogen to reduce a chemical species, such as oxygen.

A membrane reactor of this invention can provide purified hydrogen (e.g., separated from other gases in the hydrogen source), gas mixtures enriched in hydrogen (e.g., hydrogen in an inert gas), removal of hydrogen from a gas mixture, and provide hydrogen for further reaction. Hydrogen from the reactor can, for example, be transported to another reactor for reaction to make desired products including methanol and hydrocarbon fuels. Alternatively, hydrogen can be reacted with a hydrogen-reactive gas within the reactor directly after transport. The reactive gas can be oxygen, and the products water and energy.

In specific embodiments, the membranes and membrane reactors of this invention can be employed for separation of hydrogen from various hydrogen containing gases to produce purified hydrogen or to produce a gas stream from which undesirable hydrogen has been removed. The membranes and membrane reactors herein can be used, for example, to separate hydrogen from water-gas shift mixtures, to separate hydrogen from reformed petroleum products, or to separate hydrogen from reformed methane, butane, ethanol or ammonia.

In other specific embodiments, the membranes and membrane reactors of this invention can be employed to carry out oxidation/reduction reactions, including among others, hydrocarbon dehydrogenation reactions, aromatic coupling reactions, oxidative dimerization or oligomerization reactions, and hydrogen sulfide decomposition.

BRIEF DESCRIPTION OF THE DRAWINGS

FIGS. 1A–1E schematically illustrate exemplary embodiments of the multiple layer membrane of this invention.

DETAILED DESCRIPTION OF THE INVENTION

The invention relates to multilayer membranes that are selectively permeable to hydrogen and function for hydrogen separation without application of an external current. Membranes of this invention are substantially impermeable to gases other than hydrogen. A membrane is an element having two sides or surfaces, which is used to separate two reactor chambers and mediate transport or diffusion of selected chemical species between the two chambers. Membranes can be of any convenient shape including disks, tubes, and plates. The membranes of this invention mediate transport or diffusion of hydrogen from a hydrogen source to a hydrogen sink.

Figure 1A:
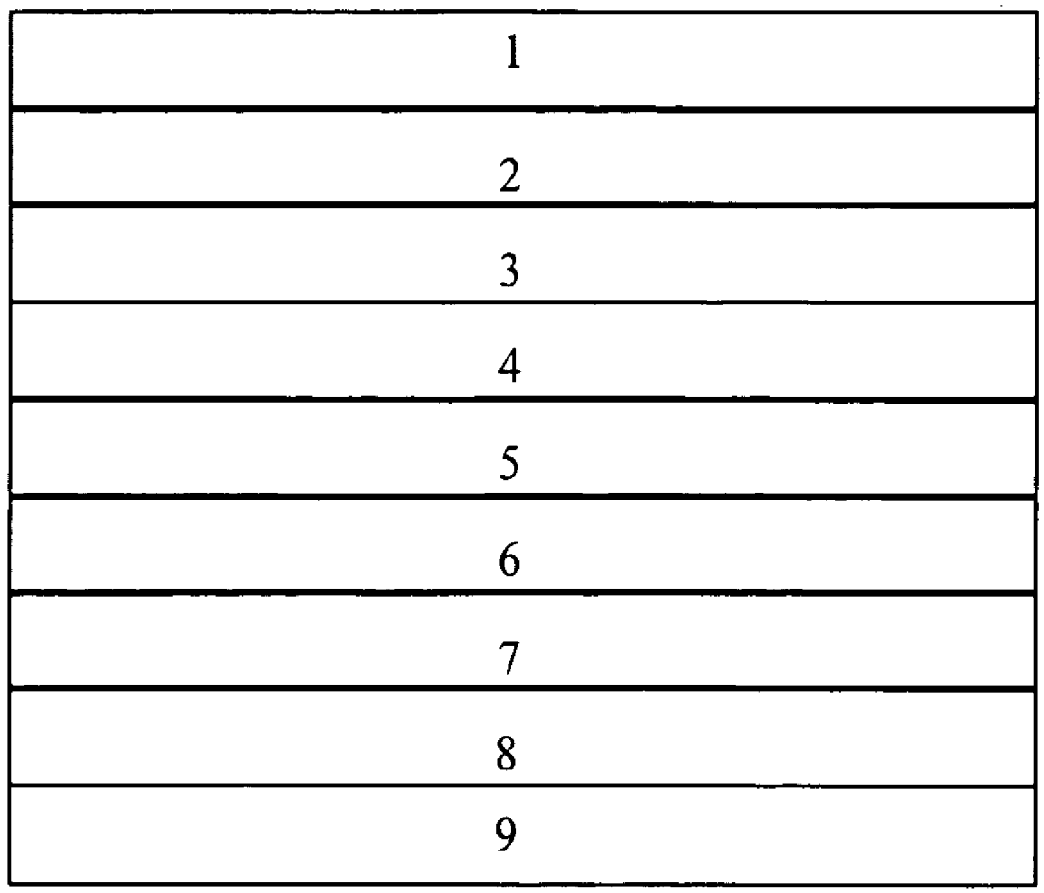

A schematic diagram of a cross-section of a dense (non-porous) multi-layer membrane of this invention is illustrated in FIG. 1A where the layers are not drawn to scale. In this diagram nine layers are illustrated with layer 1 at the hydrogen feed side of the membrane and layer 9 at the hydrogen sink side of the membrane.

A layer in the membranes of this invention is distinguishable chemically (e.g., by composition or phases present) or physically (e.g., by porosity) from any adjacent layer or layers in the membrane. A layer may be composed of one or more sub-layers of the same material and having the same porosity. The membrane of FIG. 1A illustrates all layers in direct contact with any adjacent layers. Although the layers of FIG. 1A (and other membrane representations herein) are indicated to be continuous across the membrane cross-section, any layer that can be non-porous may be provided as a discontinuous layer.

Layer 5 is the central dense NPSP layer which functions for hydrogen separation. The NPSP layer can be a hydrogen permeable metal or alloy, or a hydrogen-permeable cermet (where the ceramic is hydrogen ion conducting and/or the metal is hydrogen permeable). In general, the NPSP layer can range in thickness from about 20 microns to about 1,000 microns. The layer must be sufficiently thick to make the layer non-porous, but not too thick to unnecessarily limit hydrogen permeation. The thickness of the layer will depend upon the specific materials employed. The NPSP layer may for example be a layer of metal foil.

Layer 3 is a catalyst layer for dissociating hydrogen. The catalyst may be a metal, an alloy, a substantially single phase ceramic, a multiphase ceramic or a cermet. The layer may be porous and need not be continuous. The layer may be formed, for example, by deposition or coating, on a surface of an adjacent layer. If the layer is non-porous it should be permeable to hydrogen. The layer, if continuous, is preferably relatively thin compared to other layers and can range in thickness from about 0.05 micron to about 1 micron in thickness.

Layer 7 is an optional catalyst layer which may be composed of the same material as layer 3 or may be substantially the same in composition and thickness as layer 3. Layer 7 may, however, be different from layer 3 in composition, thickness or porosity. In general, this layer if present can be a metal, an alloy, a substantially single phase ceramic, a multiphase ceramic, or a cermet. The layer may be porous, and need not be continuous. The layer may be formed, for example, by deposition or coating, on a surface of an adjacent layer. If the layer is non-porous, it should be permeable to hydrogen. The layer, if continuous, is preferably relatively thin compared to other layers and can range in thickness from about 0.05 micron to about 1 micron.

Layers 4 and 6 are optional barrier layers which, when present, minimize or prevent detrimental interdiffusion of metals between the catalyst layer and the NPSP layer. One or both of layers 4 and 6 may be present. Barrier layers are more preferably present when the catalyst and NPSP layers are metals or alloys or when these layers contain a high amount (60 vol. % or more) of a metal or alloy. The use of cermet NPSP layers or cermet or ceramic catalyst layers may decrease the need for a barrier layer between the NPSP layer and the catalyst. The barrier layer may have some porosity, such as that accompanying the presence of minor cracks or pinholes, but the layer is preferably non-porous and dense, and as thin as fabrication methods will allow. The barrier layers, if present, are between about 0.01 microns and 10 microns thick and preferably are between about 0.01 micron and 1 micron thick.

Metal oxide layers may be formed by oxidation processes at the interface of two materials where one or both of the materials contain one or more metals. Such metal oxide layers may form spontaneously during membrane fabrication or operation of the membrane on contact with oxidizing gases. Such layers may provide some of the benefits of the barrier layers herein. However, since the formation of such metal oxide layers may not be consistent in composition or thickness, it is preferable to provide a barrier layer of selected thickness and composition, by design when needed or desirable. A barrier layer comprising a metal oxide layer comprising one or more metals of the catalyst or NPSP layer can be formed by controlled oxidation of the surface of the catalyst or NPSP layer. These layers are sufficiently porous or hydrogen permeable, such that they do not impede hydrogen permeation.

Layers 1, 2, 8 and 9 are representative protective layers. The layers are illustrated in FIG. 1A as integral with the membrane, but protective materials may be provided, alternatively or in addition, in a membrane reactor in a trap, filter or in a separated layer. One or more protective layers may be present on either side of the membrane, although there is typically more need for protective layers on the hydrogen feedstream side of the membrane.

In a specific embodiment, layers 1 and 9 are porous ceramic layers for protecting the inner layers of the membrane from detrimental feedstream contaminants, which may originate in the feedstream source, from materials in the reactor or the reactor system, including any tubing or plumbing for carrying the feedstream or removing hydrogen-enriched gas. For example, the porous protective layer can trap Fe, Cr or other metals originating from stainless steel component of the reactor system. Metal oxides suitable for use as protective layers include, among others, alumina, titania, or zirconia. In a preferred embodiment, alumina is employed as a protective layer. In addition, activated carbon and zeolites may also be used in protective layers. In a specific embodiment, layers 1 and 9 have porosity between about 30–60% with macropores (i.e., pores >200 nm in diameter). In another specific embodiment, layers 1 and 9 are porous and high surface area ceramic layers.

Layers 2 and 8 are illustrated as separated distinct layers from layers 1 and 9, but also function as protective layers. Layers 2 and 8 are porous ceramic layers which primarily protect the inner layers of the membrane from feedstream contaminants, such as sulfur-containing species, including hydrogen sulfide, carbon-containing species, or moisture. Layer materials may adsorb and or otherwise react with contaminants removing them from the feedstream or preventing diffusion back into the inner layers from the hydrogen sink. Materials useful for these protective layers, include ZnO, $La_2O_3$, SrO, $CeO_2$, or perovskites such as $SrCeO_3$ or $La_{1-x}Sr_xCoO_{3-\delta}$ (where $0 \leq x \leq 1$ and $\delta$ is a number that renders the material charge neutral). The listed metal oxides are particularly useful for protection against sulfur because the metals form stable sulfides. Metals, metal oxide or other catalysts that dissociate hydrogen sulfide, such as copper, can be added to the protective layer as well to enhance protection against hydrogen sulfide.

In a specific embodiment, layers 2 and 8, if one or both are present, are porous layers of zinc oxide, which function for removal of hydrogen sulfide. Membranes of this invention can have one, two, or more chemically or physically distinguishable porous protective layers on either side, preferably on the feedstream side of the membrane. Layers 2 and 8, if both present may be chemically and physically the same, or chemically and physically different.

Alternatively, a membrane may have a single multiple component porous protective layer which combines two or more different ceramic phases, which function, independently or together, for removal of one or more contaminants from the feed stream or from the hydrogen sink. For example improved protection from hydrogen sulfide is obtained using a porous protective layer of metal oxide to which copper metal has been added. The metal may be, for example, mixed with the metal oxide and coated on the membrane, or the metal may be deposited or coated on a porous layer of the metal oxide.

Protective layers are generally thicker than other layers of the membrane. Protective layers useful for membranes herein include those that range in thickness from about 0.1 mm to about 1 mm.

Membranes of this invention, useful for hydrogen separation and other applications described herein, are prepared as described herein or using methods known in the art for membrane preparation in view of the teachings herein. Membranes, particularly those containing metals and metal alloys, are preferably not exposed to hydrogen at temperatures lower than the lowest operating temperature for which they are intended. The membranes of this invention are preferably not exposed to hydrogen at temperatures lower than about 250° C. This minimizes formation of hydrides and decreases or minimizes embrittlement of the membrane materials. Membranes are typically operated at temperatures between 250 and 600° C. (dependent upon the particular materials and application), and preferably between 300 and 450° C. Membranes are typically operated under a pressure differential between 0 and 1000 psi. Hydrogen permeation membranes can be increased by exposing the membrane to oxygen, air or other oxygen-containing gas for a selected period of time (ranging from minutes to hours as may be needed) at operating temperature prior to introduction of hydrogen.

Component Materials for Membrane Layers

The terms "electronic conduction" and "electron conduction" may be used in some references in the art and by some practitioners in the art to refer to conduction of electrons. For internal consistency and specificity, the term "electronic conductor" is used herein to indicate generally that material passes a charge, but this term does not specify the charged species (ions, electrons or holes). The term "electron conductor" as used herein refers specifically to conduction of electrons and also refers to holes that may be the conducting species (hole conduction is well-understood in the art). The term "hydrogen ion conductor" is used generically to refer to a material that conducts protons or hydride ions (both hydrogen ions). While certain materials have been called "proton-conducting" in the prior art, we employ the broader term "hydrogen ion-conducting," because it is presently unclear which ionic hydrogen species is being conducted through the membranes and it may be that a mixture of species are being conducted. The term hydrogen ion-conducting in reference to materials is intended to include all materials called "proton conductors."

Hydrogen-Permeable Metals and Alloys. High hydrogen permeability of transition metals has been well documented over many decades. In particular, Group V metals (V, Nb, Ta) and related alloys have exceptional permeability (See: U.S. Pat. No. 3,350,846, among others). There are a number of reports of metal and alloy materials, particularly metal foils, used for hydrogen separation and purification. (See: Makrides, A. C.; Wright, M. A.; Jewett, D. N., "Separation of Hydrogen by Permeation," U.S. Pat. No. 3,350,846, Nov. 7, 1967; Hill, E. F., "Hydrogen Separation Using Coated Titanium Alloys," U.S. Pat. No. 4,468,235, Aug. 28, 1984; Hara, S.; Sakaki, K.; Itoh, N., "Amorphous Ni Alloy Membrane for Separation/Dissociation of Hydrogen, Preparing Method and Activating Method Thereof," U.S. Pat. No. 6,478,853, Nov. 12, 2002; Edlund, D. J.; Pledger, W. A.; Studebaker, T., "Hydrogen-Permeable Metal Membrane and Hydrogen Purification Assemblies Containing the Same," U.S. Pat. No. 6,547,858, Apr. 15, 2003; Buxbaum, R. E., "Composite Metal Membrane for Hydrogen Extraction," U.S. Pat. No. 5,215,729, Jun. 1, 1993; Edlund, D. J., "Hydrogen-Permeable Composite Metal Membrane," U.S. Pat. No. 5,139,541, Aug. 18, 1992; Edlund, D. J.; Friesen, D. T., "Hydrogen-Permeable Composite Metal Membrane and Uses Thereof," U.S. Pat. No. 5,217,506, Jun. 8, 1993; Edlund, D. J., "Composite Hydrogen Separation Metal Membrane," U.S. Pat. No. 5,393,325, Feb. 28, 1995; Edlund, D. J.; Newbold, D. D.; Frost, C. B., "Composite Hydrogen Separation Element and Module," U.S. Pat. No. 5,645,626, Jul. 8, 1997; Thornton, P. H., "Supported Membrane for Hydrogen Separation," U.S. Pat. No. 6,475,268, Nov. 5, 2002; Peachey, N. M.; Dye, R. C.; Snow, R. C.; Birdsell, S. A., "Composite Metal Membrane," U.S. Pat. No. 5,738,708, Apr. 14, 1998; Dye, R. C.; Snow, R. C., "Thermally Tolerant Multilayer Metal Membrane," U.S. Pat. No. 6,214,090, Apr. 10, 2001; Buxbaum, R. E.; Marker, T. L. *J. Mem. Sci.* 1993, 85, 29–38; Peachey, N. M.; Snow, R. C.; Dye, R. C. *J. Mem. Sci.* 1996,111, 123–133; Nishimura, C.; Komaki, M.; Amano, M. *Mat. Trans.* 1991, 32, 501–507; Yamakawa, K.; Ege, M.; Ludescher, B.; Hirscher, M.; Kronmueller, H. *J. Alloys and Compounds* 2001, 321, 17–23; Zhang, Y.; Ozaki, T.; Komaki, M.; Nishimura, C. *Scripta Materialia* 2002, 47, 601–606; Heinze, S.; Vuillemin, B.; Colson, J.-C., Giroux, P.; Leterq, D. *Solid State Ionics* 1999, 122, 51–57; Nishimura, C.; Komaki, M.; Hwang, S.; Amano, M. *J. Alloys and Compounds* 2002, 330–332, 902–906.)

Hydrogen permeation rates in excess of 20 mL·min$^{-1}$·cm$^{-2}$ (mL of hydrogen per minute per cm$^2$ of membrane surface) are achievable using metal foils with appropriate catalysts.

Preferred hydrogen permeable metals for use as NPSP layers of this invention are those exhibiting hydrogen permeation rates (permeability) of 3 mL/min/cm$^2$ (1×10$^{-8}$ mol/ m/m$^2$/s/Pa$^{1/2}$) or greater. Metals useful as NPSP layers include those having hydrogen permeation rates in the range 0.5 to greater than 20 mL/min/cm$^2$.

The metal NPSP layer is preferably a hydrogen-permeable metal or metal alloy, other than palladium or an alloy of palladium. The hydrogen-permeable metal of the NPSP layer is preferably vanadium, niobium, tantalum, titanium, zirconium, and alloys thereof and alloys of vanadium, niobium, tantalum, titanium and zirconium with other metals, including for example, Al, Co, Cr, Fe, Mn, Mo, Nb, V, Ti, Ta, Cu, Ni, Ga, Ge, Sn, Zr, Si, W, La, Be, and Hf or mixtures thereof. Preferred hydrogen-permeable alloys are alloys of vanadium, niobium, tantalum, or zirconium and one or more of titanium, cobalt, chromium, aluminum or mixtures thereof. NPSP layer alloys include those having from about 1 at. % to about 50 at. % (and all subranges thereof) of Al, Co, Cr, Fe, Mn, Mo, Nb, Ti, Ta, Cu, Ni, Ga, Ge, Sn, Zr, Si, W, La, Be, and Hf or a mixture thereof with one or vanadium, niobium, tantalum, or zirconium. NPSP layer alloys include those having from about 1 at. % to about 25 at. % (and all subranges thereof) of titanium, cobalt, chromium, aluminum or a mixture thereof with one or more of vanadium, niobium, tantalum, or zirconium. NPSP layer alloys include those having from about 1 at. % to about 25 at. % (and all subranges thereof) of titanium, cobalt, chromium, aluminum or a mixture thereof with one or more of vanadium, niobium, tantalum, or zirconium. NPSP layer alloys include those having from about 1 at. % to about 25 at. % (and all subranges thereof) of titanium, cobalt, chromium, aluminum or a mixture thereof with vanadium. NPSP layer alloys include those having from about 5 at. % to about 15 at. % titanium, cobalt, chromium, aluminum or a mixture thereof with one or more of vanadium, niobium, tantalum, or zirconium. Alloys useful for NPSP layers also include alloys of vanadium, niobium or tantalum with one or more of titanium, cobalt, chromium, aluminum or mixtures thereof. Additional alloys for NPSP layers are alloys of vanadium with titanium, cobalt, chromium, aluminum or mixtures thereof. NPSP layers include alloys of vanadium with titanium and particularly those alloys containing from about 1 at. % to about 50 at. % titanium, those containing from 1 at. % to about 25 at. % titanium and those containing from about 5 at. % titanium to about 15 at. % titanium. NPSP layers include alloys of vanadium with titanium and particularly those alloys containing from about 1 at. % to about 50 at. % titanium, those containing from 1 at. % to about 25 at. % titanium and those containing from about 5 at. % titanium to about 15 at. % titanium. NPSP layers include alloys of vanadium with aluminum and particularly those alloys containing from about 1 at. % to about 20 at. % aluminum (and subranges thereof).

In a specific embodiment, the NPSP layer is based on metals and/or alloys with high hydrogen permeability having a body-centered cubic (bcc) structure. The primary metals (i.e., the metals present at the highest at. %) in the alloys comprise vanadium, niobium, tantalum, titanium and zirconium. Using vanadium (V) as an example, parent binary alloy structures include, among others, V—Al, V—Co, V—Cr, V—Fe, V—Mn, V—Mo, V—Nv, V—Ti, V—Ta, V—Cu, and V—Ni. Ternary and higher alloy compositions include those made through combinations of the above listed metals and/or addition of Ga, Ge, Sn, Zr, Si, W, La, Be, and Hf.

Specific examples of secondary and ternary alloys of V that retain a bcc structure can be determined using the data in Table 1. The quantities of second and third metals listed in the table cover ranges that will maintain a single-phase bcc structure in the resulting binary or ternary alloy.

TABLE 1

Ranges (in at. %) Possible for Second and Third Metals in Alloys of Primary Metals V, Nb, Ta or Zr Resulting in a Single-Phase Body-Centered Cubic Structure

| Second Metal (at. %) | Third Metal (at. %) |
|---|---|
| 0–40 Al | 0–5 Cu |
| 0–35 Al | 0–40 Fe |
| 0–40 Al | 0–12 Ga |
| 0–40 Al | 0–3 Ge |
| 0–40 Al | 0–53 Mn |
| 0–40 Al | 0–100 Mo |
| 0–40 Al | 0–100 Nb |
| 0–40 Al | 0–8 Ni |
| 0–40 Al | 0–100 Ta |
| 19–25 Al | 0–6 Sn |
| 0–50 Al | 0–90 Ti |
| 0–40 Al | 0–5 Zr |
| 0–2 Be | 0–50 Ti |
| 0–10 Co | 0–30 Fe |
| 0–12 Co | 0–12 Ga |
| 0–12 Co | 0–10 Ni |
| 0–12 Co | 0–7 Si |
| 0–100 Cr | 0–25 Fe |
| 0–100 Cr | 0–2 Hf |
| 0–100 Cr | 0–100 Mo |
| 0–100 Cr | 0–100 Nb |
| 0–100 Cr | 0–9 Ni |
| 0–100 Cr | 0–10 Ta |
| 0–100 Cr | 0–80 Ti |
| 0–100 Cr | 0–100 W |
| 0–100 Cr | 0–4 Zr |
| 0–4 Cu | 0–12 Ni |
| 0–30 Fe | 0–12 Ga |

TABLE 1-continued

Ranges (in at. %) Possible for Second and Third
Metals in Alloys of Primary Metals V, Nb, Ta or Zr
Resulting in a Single-Phase Body-Centered Cubic Structure

| Second Metal (at. %) | Third Metal (at. %) |
|---|---|
| 0–30 Fe | 0–100 Mo |
| 0–30 Fe | 0–5 Ni |
| 0–30 Fe | 0–95 Ti |
| 0–10 Ga | 0–4 Ge |
| 0–15 Ga | 0–15 Ln |
| 0–10 Ga | 0–50 Mn |
| 0–10 Ga | 0–100 Nb |
| 0–10 Ga | 0–8 Ni |
| 0–10 Ga | 0–4 Si |
| 0–2 Ge | 0–100 Nb |
| 0–5 Hf | 0–5 Ta |
| 0–50 Mn | 0–4 Si |
| 0–100 Mo | 0–100 Nb |
| 0–100 Mo | 0–22 Ni |
| 0–100 Mo | 0–4 Si |
| 0–100 Mo | 0–100 Ta |
| 0–100 Mo | 0–25 Ti |
| 0–100 Nb | 0–6 Ni |
| 0–100 Nb | 0–100 Ta |
| 0–100 Nb | 0–100 Ti |
| 0–100 Nb | 0–10 Zr |
| 0–15 Ni | 0–4 Si |
| 0–12 Ni | 0–100 Ti |
| 0–100 Ti | 0–4 Si |
| 0–100 Ti | 0–12 Sn |
| 0–40 Ti | 0–10 Ta |
| 0–100 Ta | 0–100 W |
| 0–15 Ta | 0–8 Zr |
| 0–80 Ti | 0–100 W |
| 0–90 Ti | 0–10 Zr |

The ranges listed in Table 1 show the maximum amount of each metal that can be added to a selected amount of vanadium and still maintain the bcc structure. To use the information in Table 1, a content of V is first selected. For example, an alloy of 80 at % V will have 20 at. % total of a second metal or 20 at. % of a combination of a second and a third metal. To prepare a binary or ternary vanadium-aluminum-copper alloy containing 80 at. % V and which retains bcc structure, up to about 5 at. % Cu and/or up to about 20 at. % Al is combined with the V. Examples of ternary bcc alloys of vanadium include, an alloy containing 80 at. % V, 19.9 at. % Al and 0.1 at. % Cu , an alloy containing 80 at. % V, 15 at. % Al and 5 at. % Cu. A V—Al—Cu alloy having bcc structure can not have more than 40 at. % Al or more than 5 at. % Cu. A V—Al—Mo alloy which retains a bcc structure can not have more than 40 at. % Al, but the amount of Mo present will not effect the bcc structure. Known phase diagrams can be employed, as is understood by those of ordinary skill in the art, to determine the at. % ranges of second and third metals that can be added to any of niobium, tantalum, or zirconium to prepare binary and ternary alloys which retain bcc structure. Useful phase diagrams are available for example, in Handbook of Ternary Alloy Phase Diagrams, (P. Villars, A. Prince, H. Okamoto; Materials Park, Ohio: ASM International, 1995) and Binary Alloy Phase Diagrams, Ed. T. B. Massalski, H. Okamoto, P. R. Subramanian, L. Kacprzak; Materials Park, Ohio: ASM International, 1990).

Hydrogen-Permeable Cermets. A limitation of metal membranes is that cracks can easily propagate through the thin structure and render the membrane useless. This problem is exacerbated by the tendency of many metals to embrittle in the presence of hydrogen. Cermets, which are composites containing a metal phase and a ceramic phase, are less susceptible to crack formation because i) depending on composition and engineering considerations, the surrounding ceramic matrix can allow the metal phase to expand and contract as the temperature and hydrogen concentration fluctuate, and ii) particle attrition during ball milling of the precursor powder minimizes defects that can lead to cracks. Moreover, when cracks do form in the metal phase, they are halted by the irregular path of the metal through the ceramic.

In all cermets for use in NPSP layers the ceramic phase should be nonporous, chemically and mechanically stable, unreactive with the metal phase, and have similar thermal expansion characteristics as the metal phase.

The hydrogen permeable cermet of the NPSP layer can be a cermet where hydrogen permeation occurs primarily through the metal phase and the function of the ceramic phase is primarily structural. The ceramic may or may not be permeable to hydrogen. The metal phase content is between about 30 and 99 vol. %, and preferably between 60 and 80 vol. %. Useful hydrogen-permeable metals include Group IVB or VB metals and alloys thereof, including alloys of the Group IVB or VB metals with each other or with any transition metal. Various suitable hydrogen-permeable metals and alloys are known to the art (for example, see U.S. Pat. Nos. 5,215,729; 5,139,541; 5,217,506; 5,393,325, 6,214,090, and Buxbaum, R. E.; Marker, T. L. *J. Mem. Sci.* 1993, 85, 29–38.) In preferred embodiments the hydrogen-permeable metal of the cermet is not palladium or an alloy containing palladium. In specific embodiments, hydrogen-permeable metals of the cermets of the NPSP layer include, among others, vanadium, niobium, tantalum or alloys thereof, and alloys of vanadium, niobium, zirconium or tantalum with one or more of nickel, cobalt, iron, titanium, chromium, aluminum, or copper. In other specific embodiments, hydrogen-permeable metals of the cermets of the NPSP layer include vanadium or alloys of vanadium with one or more of titanium, nickel, aluminum, or chromium.

The hydrogen permeable cermet of the NPSP layer can alternatively be a cermet where hydrogen permeation occurs substantially or primarily through the ceramic phase. The metal phase may or may not be hydrogen permeable. The ceramic and metal may additionally provide structural stability. The ceramic may be a hydrogen ion-conducting ceramic which does not necessarily exhibit substantial electron conduction or the hydrogen ion-conducting ceramic may be a mixed conducting ceramic which additionally exhibits substantial electron conduction. The hydrogen ion-conducting ceramic may be a single phase ceramic or a multiple phase ceramic. The metal phase content is between about 30 and 99 vol. %, preferably between about 20 and 60 vol. %), and more preferably between about 30 and about 50 vol. %.

Catalysts. Catalysts are employed in the membranes herein to facilitate dissociation of hydrogen to allow hydrogen ion conduction. Catalysts can also be employed to facilitate reassociation of hydrogen ions at the hydrogen sink.

Metal and Metal Alloy Catalysts. Because many of the metals and alloys with the highest hydrogen permeability (metals and alloys other than those containing Pd) are easily poisoned and lack sufficient catalytic activity for hydrogen dissociation, a thin layer of a protective catalytic metal, such as Pd, is applied to the membrane surface to enable sustained hydrogen permeation. In this way the bulk of the membrane can be a relatively inexpensive material with very high permeability and the expensive catalytic Pd layer can be provided as a very thin film. Many metal and alloy catalyst layers are known to the art and suitable for several embodiments of this invention. Examples include metals and alloys from Group IB, VIIB, and VIIIB (for example, see U.S. Pat. No. 5,139,541.)

Cermet Catalysts. A limitation of the use of metal catalyst layers is that interdiffusion of metals between the catalyst and NPSP layer can occur at operating temperature of the membrane which degrades membrane performance. The use of hydrogen-permeable cermets as discussed above and include cermets containing Pd, Pd alloys, Ni and Ni alloys (in general any of the metals and alloys listed under metal/alloy catalysts above can be used in cermets) as catalyst layers can minimize such interdiffusion. Hydrogen-permeable cermets that are useful as NPSP layers can be applied as catalyst layers, particularly when the NPSP layer is a metal or metal alloy or when the NPSP layer is a different cermet, particularly a cermet having a relatively high metal content (60 vol. % or more). Cermets for use as catalysts can have metal content ranging between about 10 and about 99 vol. % (and subranges thereof). Cermets for use as catalysts can have metal content ranging between about 10 and about 80 vol. % (and subranges thereof).

In specific embodiments, cermets particularly useful as catalyst layers include, $BaCe_{0.8}Y_{0.2}O_{3-\delta}/Ni$, $SrTiO_3/Ni$, $ZrO_2/Ni$, $Al_2O_3/Ni$ where the Ni content ranges from about 10 to 80 vol. % (and subranges thereof). In the above cermets, Ni can be replaced with any of the metals or alloys listed above as useful metal catalysts.

Ceramic Catalysts. Single-phase and multi-phase ceramics useful as catalysts are mixed hydrogen-ion-conducting and electron-conducting (or hole-conducting) ceramics. The mixed hydrogen-ion-conducting and electron-conducting materials can be substantially single phase or multiple phase ceramics. The catalyst may be a single mixed conducting phase or more typically is a ceramic having two or more phases at least one of which is a hydrogen ion conducting ceramic phase (for example, a perovskite based ceramic) and at least one of which is a ceramic phase that conducts electrons (or holes). A beneficial feature of these catalysts is that they are hydrogen permeable through mixed conduction. They function as catalysts by supplying either hydrogen ions or atoms to the central membrane layer, or by recombining hydrogen ions or atoms that have permeated through the membrane.

A substantially single phase material, e.g., a ceramic, is composed substantially of a single phase, which herein is a single phase material exhibiting about 1 weight % or less of any other identifiable phase. The presence of a single phase or multiple phases can be determined using art-known methods, e.g., X-ray diffraction.

A specific example of a multi-phase ceramic catalyst is $BaCe_{1-x}Y_xO_{3-\delta}/La_{1-x}Sr_xMnO_{3-\delta}$ (BCY/LSM) where most generally $0 \leq x \leq 1$ and where the $La_{1-x}Sr_xMnO_{3-\delta}$ is present in the combination at between about 1 and about 40 vol. %. The BCY is proton conducting, and the LSM is electron conducting and improves stability of the material.

Barrier Coatings. As indicated above, interdiffusion of the membrane and catalyst metals can occur at operating temperature, which impedes hydrogen flux and slowly degrades membrane performance. Edlund (U.S. Pat. Nos. 5,139,541, 5,217,506, and 5,393,325) reports the use of barrier coatings of selected oxides, including proton-conducting ceramics to minimize interdiffusion between the metal layers in a hydrogen separation membrane. The barrier coatings are sufficiently thin or porous to allow hydrogen to permeate without allowing contact of the catalyst and the NPSP layer and minimizing interdiffusion between the metal layers. Since hydrogen flux across the membrane is limited by the material in the composite structure with the lowest hydrogen permeability, preferred barrier coatings have very low resistance to hydrogen transport. For metal oxides, this prerequisite requires that the barrier coating have high hydrogen ion and electron (or hole) conductivity.

Hydrogen ion-conducting Ceramic Barrier Coatings. The term "hydrogen ion conducting" is intended to encompass ceramics that have been previously designated "proton-conducting." It is now believed that hydride ion or proton conduction or both may be occurring in at least some of those materials. The form in which dissociated hydrogen is transported through the ceramic does not matter for applications of this invention, but it is believed more correct to designate these materials as hydrogen ion-conducting ceramics.

Since the discovery in the early 1980s by Iwahara et al. of high temperature proton conduction in $SrCeO_3$, perovskite-based oxides have been the focus of extensive studies. (Iwahara, H.; Esaka, T.; Uchida, H.; Maeda, N. Solid State Ionics 1981, 3/4, 359–363; Iwahara, H.; Uchida, H.; Ono, K.; Ogaki, K. J. Electrochem. Soc. 1988, 135, 529–533; Lee, W.; Nowick, A. S. Solid State Ionics 1986, 18/19, 989.) The potential for these materials in fuel cells (galvanic systems) and chemical sensors was quickly recognized and as a result the majority of work on these materials has focused on achieving high proton conductivity without electron/hole conduction (which can be detrimental to use in fuel cells). The highest levels of proton conductivity are achieved by selectively doping perovskites, such as cerates and zirconates of Ba and Sr. In particular, $SrCeO_3$ and $BaCeO_3$ doped with trivalent cations such as Y, Yb, and Gd have been identified as particularly good high-temperature proton conductors. (Iwahara, H.; Uchida, H.; Ono, K.; Ogaki, K. J. Electrochem. Soc. 1988, 135, 529–533; 23. Iwahara, H.; Uchida, H.; Morimoto, K. J. Electrochem. Soc. 1990, 137, 462–465; Bonanos, N.; Ellis, B.; Knight, K. S.; Mahmood, M. N. Solid State Ionics 1989, 35, 179–188; Bonanos, N. Solid State Ionics 1992, 53–56, 967–974; Bonanos, N. J. Phys. Chem. Solids 1993, 54, 867–870; Bonanos, N.; Knight, K. S.; Ellis, B. Solid State Ionics 1995, 79, 161; Kreuer, K. D.; Fuchs, A.; Maier, J. Solid State Ionics 1995, 77, 157; Kreuer, K. D. Solid State Ionics 1997, 97, 1–15; Shima, D.; Haile, S. M. Solid State Ionics 1997, 97, 443.) It should be noted that recent results suggest that significant transport may also be in the form of hydride ions (Norby, T.; Larring, Y. Solid State Ionics 2000, 136–137, 139–148,) thus, hydrogen ion conduction is the preferred terminology in this invention disclosure.

Exemplary hydrogen ion-conducting material can be represented as $ABO_3$, or for doped perovskites:

$$A_{1-x}A'_xB_{1-y}B'_yO_{3-\delta} \qquad (1)$$

where x and y are the fractions of dopants in the A and B sites, respectively, (for undoped perovskites both x and y are 0) and δ is related to the number of oxygen vacancies. Generally for doped perovskites x is greater than 0 and less than 1 and/or y is greater than 0 and less than 1. Doping the B site with lower valence cations produces oxygen vacancies to maintain electroneutrality, and the presence of oxygen vacancies is necessary for maximum hydrogen ion conduction. The quantity of hydrogen ion charge carriers that can be introduced into a given material is dependent on the choice of dopant, dopant concentration, number of oxygen vacancies, atmospheric conditions, and temperature. Kreuer, K. D. Solid State Ionics 1997, 97, 1–15; Norby, T.;

Larring, Y. In *Ceramic Oxygen Ion Semiconductors and Their Applications*; Steele, B. C. H., Ed.; The Institute of Materials, 1996, pp 83–93.)

For doped $BaCeO_3$ materials, hydrogen ion concentrations from less than 0.1 mol % to greater than 10 mol % can be achieved depending on the exact composition, and operation conditions (Bonanos, N.; Knight, K. S.; Ellis, B. *Solid State Ionics* 1995, 79, 161; Kreuer, K. D. *Solid State Ionics* 1997, 97, 1–15; Yajima, T.; Iwahara, H. *Solid State Ionics* 1992, 50, 281–286; Liang, K. C.; Nowick, A. S. *Solid State Ionics* 1993, 61, 77–81; Norby, T. *Solid State Ionics* 1990, 40/41, 857–862. The result of the increased charge carrier concentration arising from doping these perovskite materials is an increase in hydrogen ion conductivity between two and four orders of magnitude relative to the undoped analogs.

For dense membranes to transport hydrogen they also must have high electron conductivity. Accordingly, much of the recent work developing ceramic materials for hydrogen separation has focused on introducing electron conductivity to high-temperature hydrogen ion conductors. For example, Balachandran et al. investigated the hydrogen ion conductor Y-doped $BaCeO_3$. (Balachandran, U.; Ma, B.; Maiya, P. S.; Mieville, R. L.; Dusek, J. T.; Picciolo, J.; Guan, J.; Dorris, S. E.; Liu, M. *Solid State Ionics* 1998, 108, 363; Balachandran, U.; Guan, J.; Dorris, S. E.; Bose, A. C.; Stiegel, G. J. In *Proceedings of the Fifth International Conference on Inorganic Membranes*: Nagoya, Japan, 1998.) Despite relatively high hydrogen ion conductivity, the electronic conductivity was reported to be low and an applied current density of 50 mA/cm² was necessary to transport hydrogen at a rate of approximately 0.25 mL·min⁻¹·cm⁻². However, by incorporating an electron conducting second phase, a comparable hydrogen transport rate was reported achieved in the non-galvanic mode. Norby and Larring recently presented theory for mixed conductivity based on different defect models (Norby, T.; Larring, Y. *Solid State Ionics* 2000, 136–137, 139–148.)

The introduction of hydrogen ions into the perovskite ceramic generally is shown in terms of moisture containing gas streams as an acid/base equilibrium between water molecules and oxygen vacancies. Using Kröger-Vink notation (Kroger, F. A. *The Chemistry of Imperfect Crystals*; North Holland Publishing Co.: Amsterdam, 1964,) oxygen vacancies, $V_o''$, react with water to fill lattice positions with oxide ions, $O_o^x$, and produce interstitial protons, $H_i'$, according to,

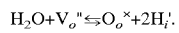

(See: Kreuer, K. D. *Solid State Ionics* 1997, 97, 1–15.) Protons are retained in the material by associating with oxide ions at normal lattice sites,

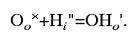

so that the net reaction demonstrating the interaction of oxygen vacancies with water vapor to produce proton charge carriers can be written as,

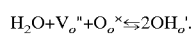

However, in the absence of moisture, hydrogen in the gas stream is incorporated directly into the material as protons and electrons (e') through interaction with oxide ions according to,

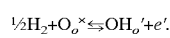

Alternatively, an analogous equation can be written in terms of hole and hydride ion conduction.

Conduction of hydrogen ions and electrons across the ceramic membrane is driven by the conditions or processes occurring at opposite surfaces of the membrane. For hydrogen separation, the driving force is a concentration gradient corresponding to a Nernst potential difference between 50 and 500 mV, dictated in part by the ratio of hydrogen partial pressure on opposite sides of the membrane. This potential difference determines the rate of conduction up to the catalysis-, mass transfer-, or material-limited rate.

It is generally accepted that once hydrogen ions are incorporated into the material, they are conducted by transference between oxygen ions at normal lattice positions. However, arguments have been presented for $OH^-$ conduction as well (Bonanos, N.; Knight, K. S.; Ellis, B. *Solid State Ionics* 1995, 79, 161; Kreuer, K. D. *Solid State Ionics* 1997, 97, 1–15; Yajima, T.; Iwahara, H. *Solid State Ionics* 1992, 50, 281–286; Liang, K. C.; Nowick, A. S. *Solid State Ionics* 1993, 61, 77–81; Norby, T. *Solid State Ionics* 1990, 40/41, 857–862.) It is possible that both mechanisms occur to some extent, and the relative contributions to overall hydrogen ion conductivity will be dependent on the material composition, the operation temperature, and gas stream composition. Numerous techniques have been employed to determine the dominant charge carrier in perovskite materials, and the conclusion of hydrogen ion "hopping at moderate temperatures (less than ~800° C.) is based on i) isotope effect studies that demonstrate the predicted $\sqrt{2}$ factor greater conductivity for hydrogen ions than deuterium ions (Bonanos, N. *Solid State Ionics* 1992, 53–56, 967–974; Norby, T.; Larring, Y. In *Ceramic Oxygen Ion Semiconductors and Their Applications*; Steele, B. C. H., Ed.; The Institute of Materials, 1996, pp 83–93), ii) chemical analysis of the product effluents from electrochemical cells under DC conditions, (Iwahara, H.; Uchida, H.; Ono, K.; Ogaki, K. *J. Electrochem. Soc.* 1988, 135, 529–533; Norby, T.; and Larring, Y. 1996, pp 83–93, supra; Iwahara, H.; Uchida, H.; Morimoto, K.; Hosogi, S. *J. Appl. Electrochem.* 1989, 19, 448–452; Iwahara, H. *Solid State Ionics* 1992, 52, 99), iii) comparison of measured and theoretical potentials from hydrogen and steam concentration cells (Bonanos, N.; Ellis, B.; Knight, K. S.; Mahmood, M. N. *Solid State Ionics* 1989, 35, 179–188; ,Iwahara, H.; Hibino, T.; Sunano, T. *J. Appl. Electrochem.* 1996, 26, 829–832; Yajima, T.; Kazeoka, H.; Yoga, T.; Iwahara, H. *Solid State Ionics* 1991, 47, 271), and iv) ¹⁸O diffusivity experiments that largely rule out $OH^-$ transport (Norby, T.; and Larring, Y. 1996, pp 83–93 supra.)

It also has been observed that the activation energy for hydrogen ion conduction decreases, and the hydrogen ion mobility increases when the distance between oxygen ions in the lattice is increased. (Norby, T.; Larring, Y. In *Ceramic Oxygen Ion Semiconductors and Their Applications*; Steele, B. C. H., Ed.; The Institute of Materials, 1996, pp 83–93.) Based on this result, and the fact that typical activation energies are too low to support hydrogen ion jumping between static oxygen sites, it was proposed that thermal fluctuations of oxygen ions facilitate hydrogen ion transfer (Kreuer, K. D.; Fuchs, A.; Maier, J. *Solid State Ionics* 1995, 77, 157.) As oxygen anions move closer together during a vibration, the energy barrier for hydrogen ion transfer diminishes. This description of the conduction mechanism was cited to explain the low activation energies and high hydrogen ion mobilities for loose-packed structures with soft metal-oxygen bonds(Kreuer, K. D. *Solid State Ionics* 1997, 97, 1–15.)

Support for this explanation was derived from quantum molecular dynamic simulations of hydrogen ion conduction in $BaCeO_3$, $BaTiO_3$, and $BaZrO_3$ (Munch, W.; Seifert, G.;

Kreuer, K. D.; Maier, J. *Solid State Ionics* 1996, 86–88, 647; Munch, W.; Seifert, G.; Kreuer, K. D.; Maier, J. *Solid State Ionics* 1997, 97, 39.) From these simulations, the critical factors that influence conductivity were suggested to be the degree of covalence between B site cations and oxygen anions, and the degree of hydrogen bonding within the lattice. Materials with relatively open crystal structures have greater separation between oxygen anions and a tendency for low B—O covalence. The low covalence results in softer B—O vibrations that facilitate transfer of hydrogen ions between oxygen sites. Thus, the potential barrier for hydrogen ion transfer oscillates between high and low values with the molecular vibration as the separation between oxygen anions fluctuates. It also is expected that a high degree of hydrogen bonding leads to greater hydrogen ion conduction since, in this case, hydrogen ions are somewhat in contact with adjacent oxygen anions and hydrogen ion transfer would be fast. However, strong hydrogen bonding is associated with more closely packed structures that have smaller separation between oxygen anions and stiffer B—O vibrations. It is likely that despite rapid hydrogen ion transfer between oxygen anions in closely-packed hydrogen-bonded systems, reorientation of hydrogen ions around the oxygen anions is slow and becomes rate limiting. Therefore, based on quantum molecular dynamics simulations, a compromise between the oxygen-oxygen separation and the stiffness of the B—O bonds must be achieved to maximize hydrogen ion conductivity. From these simulations, the calculated barrier for hydrogen ion conduction was lower for $BaCeO_3$ than the more closely-packed $BaZrO_3$. However, the stiffness of the Ti—O bond in $BaTiO_3$ was more optimally offset by the lower oxygen-oxygen separation, and $BaTiO_3$ was predicted to have the lowest barrier for hydrogen ion conduction.

Exemplary hydrogen ion-conductors particularly useful in membrane of this invention are those in which A and A' are alkaline earth cations, particularly Ca, Sr, Ba; and the B and B' cations are selected from Ce, Ti, Zr, Sn, Tb, Pr, Th, Y, Gd, Nb, Bi, Nd, Sc, V, Cr, Mn, Fe, Co, Ni, Cu. In specific embodiments, x and y are between 0 and 0.5, and $\delta$ is a number that neutralizes the charge in the mixed metal oxide material. Although it is believed that the hydrogen ion-conducting ceramic phase is based on perovskite ceramics, hydrogen ion-conducting materials prepared to have the stoichiometric of formula 1 may contain phases consisting of oxides of A, A', B, and/or B'. These other phase may or may not be hydrogen ion-conducting and may or may not be electron-conducting. These secondary phases may however, provide additional mechanical and thermal stability to a membrane. Hydrogen ion-conducting phases may or may not additionally conduct electrons.

When in the above formula, x and y are greater than or equal to zero, but less than one, preferably at least one of x or y is greater than zero, and x and y preferably range from 0 to 0.9; A and A' are different and can be selected from Ba, Sr and Ca and B and B' are different and can be selected from Ce, Ti, Zr, Sn, Tb, Pr, Th, Y, Gd, Nb, Bi, Nd, Sc, V, Cr, Mn, Fe, Co, Ni, Cu, and mixtures thereof and $\delta$ is a number that renders the composition charge neutral. In specific embodiments, one or both of x and y are between 0 and 0.5.

Hydrogen ion-conducting ceramics include those of formula 1 above where x is zero, B is Ce, Tb, Pr, Th, or mixtures thereof; and B' is Ti, V, Cr, Mn, Fe, Co, Ni, Cu or mixtures. Hydrogen ion-conducting ceramics include those of formula 1 above where x is zero, B is Ce, Tb, Pr, Th, or mixtures thereof; and B' is Ti, V, Cr, Mn, Fe, Co, Ni, Cu or mixtures thereof and $0.2 \leq y \leq 0.5$.

Hydrogen ion-conducting ceramics further include those having the stoichiometry:

$$BaCe_yB'_{1-y}O_{3-\delta} \qquad (2)$$

where y is greater than zero, but less than 1; $\delta$ is a number that renders the composition charge neutral and B' is yttrium, cobalt, manganese or mixtures thereof. In specific embodiments, the hydrogen ion-conducting ceramic has stoichiometry of the above formula 2 where y is 0.8–0.9 and B' is cobalt or manganese. Materials prepared to have the stoichiometry of formula 2 may contain metal oxide phases in addition to a hydrogen ion-conducting perovskite phase. Hydrogen ion-conducting phases may or may not additionally conduct electrons. The additional phases may or may not conduct hydrogen ion and/or electrons.

Hydrogen Ion Conducting Oxyacid Salt Barrier Coatings. Oxyacid salts also are known to conduct hydrogen ions, (Heed, B.; Zhu, B.; Mellander, B.-E.; Lunden, A. *Solid State Ionics* 1991, 46, 121) and conductivities between 0.01 and 0.1 S/cm have been reported for various compositions (Zhu, B.; Mellander, B.-E. *Solid State Ionics* 1995, 77, 244–249.) Proton conducting salts include $RbNO_3$, $CsNO_3$, $KNO_3$, $Na_2SO_4$, $Li_2SO_4$ and $K_3PO_4$. Concentration cells using these salts as solid electrolytes generate potentials near the Nernst value under a hydrogen partial pressure gradient, yet show little response to changes in $O_2$ pressure.(Lunden, A.; Mellander, B.-E.; Zhu, B. *Acta. Chem. Scand.* 1991, 45, 981.) Furthermore, the open circuit potential reported under fuel cell conditions with one side exposed to $H_2$ and the other to air is close to the theoretical value of 1 V (Zhu, B.; Mellander, B.-E. *Solid State Ionics* 1995, 77, 244–249.) These observations indicate that these materials are primarily hydrogen ion conductors.

For some of these salts, addition of a second insulating phase was shown to produce substantial improvements in membrane characteristics. In particular, addition of alumina to $Li_2SO_4$ and $RbNO_3$ results in an increase in ionic conductivity and mechanical stability (Zhu, B.; Mellander, B.-E. *Solid State Ionics* 1995, 77, 244–249; Zhu, B.; Mellander, B.-E. *Ferroelectrics* 1995, 167, 1–8; Zhu, B.; Lai, Z. H.; Mellander, B.-E. *Solid State Ionics* 1994, 70/71, 125–129; Zhu, B. *Solid State Ionics* 1999, 125, 397–405.) Other structural additives include $SiO_2$, $CeO_2$, $ZrO_2$, MgO, CaO, and ZnO (Zhu, B. *Solid State Ionics* 1999, 125, 397–405.) In some cases, addition of a second phase enhances ionic conductivity by stabilizing a higher symmetry, more conductive cubic phase of the oxyacid (Zhu, B.; Mellander, B.-E. *Solid State Ionics* 1995, 77, 244–249.) However, it is also proposed that hydrogen ion conductivity is enhanced through interaction of the cation from the oxyacid with the second phase. For example, interaction between $Rb^+$ and $Al_2O_3$ in $RbNO_3/Al_2O_3$ composites softens the $Rb^+$-$NO_3^-$ bond and allows greater coordination of $H^+$ to $NO_3^-$, which is the hydrogen ion conduction pathway. Hydrogen ion conduction by this mechanism thus occurs at the interface between the two phases, and conductivity is maximized by increasing the interfacial area. Moreover, addition of a refractory second phase enables the use of salts at temperatures well above their melting point where conductivity is at a maximum. Under these conditions, the ion conducting phase is in a molten state held within a rigid matrix of the refractory second phase, analogous to some superionic conductors (Zhu, B.; Mellander, B.-E. *Ferroelectrics* 1995, 167, 1–8.)

Nitrate oxyacid salts have several potential advantages for hydrogen separation relative to sulfates and phosphates. For example, when tested in fuel cell configurations, nitrate salts demonstrate a lower and wider operating temperature range, and better cell performance. Furthermore, it has been shown for several nitrate-based oxyacids that ionic conductivity increases with increasing cation size, giving a maximum ionic conductivity (primarily hydrogen ion) of 0.08 S/cm at 400° C. for a $CsNO_3/Al_2O_3$ composite (Zhu, B.; Mellander, B.-E. In *High Temperature Electrochemical Behavior of Fast Ion and Mixed Conductors*; Poulsen, F. W., Bentzen, J. J., Jacobson, T., Skou, E., Ostergard, M. J. L., Eds.: Roskilde, 1993, p 495.) More extensive studies were performed on $RbNO_3/Al_2O_3$, and ionic conductivities between 0.01 and 0.1 S/cm were measured at temperatures greater than 480° C., which is well above the melting point of $RbNO_3$ (310° C.). Zhu, B.; Mellander, B.-E. *Solid State Ionics* 1995, 77, 244–249; Zhu, B.; Mellander, B.-E. *Ferroelectrics* 1995, 167, 1–8.)

Hydrogen ion conducting oxyacid salts include nitrates, sulfates, and phosphates of Li, Na, K, Rb, and Cs. Hydrogen ion-conducting compositions include those in which oxyacid salts are mixed with metal oxides, such as $Al_2O_3$, $SiO_2$, $CeO_2$, $ZrO_2$, MgO, CaO, and ZnO to promote hydrogen ion conduction and impart structural stability. Hydrogen ion-conducting compositions include those containing about 30 vol. % to about 99 vol. % (and subranges thereof) of an oxyacid salt with one or more metal oxides or metals. Hydrogen ion-conducting compositions include those containing about 40 vol. % to about 90 vol. % (and subranges thereof) of an oxyacid salt with one or more metal oxides or metals. Hydrogen ion-conducting compositions include those containing about 60 vol. % to about 80 vol. % (and subranges thereof) of an oxyacid salt with one or more metal oxides or metals.

Hydrogen Ion Conductors: Fluoride Salts High hydrogen ion conductivity in $BaF_2$ and $CaF_2$ has been demonstrated, and derivatives of these materials were shown by Zhu et. al to have great potential for intermediate temperature fuel cells (Zhu, B.; Mellander, B.-E. *J. Mat. Sci. Lett.* 2000, 19, 971–973; Zhu, B. *Int. J. Energy Res.* 2000, 24, 39–49; Zhu, B.; Albinsson, I.; Mellander, B.-E. *Solid State Ionics* 2000, 135, 503–512.) $BaF_2$ has a hydrogen ion conductivity of only $10^{-4}$ S/cm above 600° C. However, when $BaF_2$ was doped with LiF or NaF, the hydrogen ion conductivity increased to $10^{-3}$ to $10^{-2}$ S/cm. (Zhu, B.; Mellander, B.-E. *J. Mat. Sci. Lett.* 2000, 19, 971–973.) Further improvements in hydrogen ion conductivity were reported by adding $CaH_2$ to these materials, and $LiF$—$BaF_2$—$CaH_2$ demonstrated hydrogen ion conductivity near 0.1 S/cm between 720° and 800° C. Furthermore, the activation energy for hydrogen ion conduction decreased from 0.74 to 0.16 eV when $CaH_2$ was added to $LiF$—$BaF_2$. It should be noted that some evidence exists for both proton and hydride ion conduction in these fluorides.

Hydrogen ion conducting fluorides are represented by the formulas:

MF-M'$F_2$ and

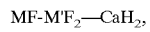

MF-M'$F_2$—$CaH_2$, where M=Li, Na, K, Rb, Cs and M'=Mg, Ca, Sr, Ba. More specifically, fluorides include $BaF_2$, $CaF_2$ and the composites $LiF$—$BaF_2$—$CaH_2$ and $NaF$—$BaF_2$—$CaH_2$. The fluoride salts can be mixed with oxides, such as $Al_2O_3$, $SiO_2$, $CeO_2$, $ZrO_2$, MgO, CaO, and ZnO to promote hydrogen ion conduction and impart structural stability. Hydrogen ion-conducting compositions include those containing about 30 vol. % to about 99 vol. % (and subranges thereof) of a fluoride with one or more metal oxides. Hydrogen ion-conducting compositions include those containing about 40 vol. % to about 90 vol. % (and subranges thereof) of a fluoride with one or more metal oxides. Hydrogen ion-conducting compositions include those containing about 60 vol. % to about 80 vol. % (and subranges thereof) of a fluoride with one or more metal oxides.

Electron Conductors. To enable hydrogen permeation through any of the hydrogen ion conductors described above, the material must be "short circuited" by addition of an electron-conducting phase. It is desirable to use a material with sufficiently high electron conductivity so that hydrogen permeation is limited by overall hydrogen ion conductivity of the composite material. This condition can be achieved using metal oxides, metals, or metal alloys.

Generally perovskites containing transition metals of mixed valency exhibit electron conductivity. Exemplary electron-conducting metal oxides are those of formula 3 above. Additionally indium-tin-oxide (approximately 91 mol. % $In_2O_3$ and 9mol. % $SnO_2$) is a suitable electron conductor for use in membranes herein. Exemplary electron-conducting metal oxides include the oxides of Ti, V, Cr, Mn, Fe, Co, Ni, and Cu, or ceramic phases, such as $La_{1-x}Sr_xMnO_3$ (where $0<x<1$, particularly where $0.1 \leq x \leq 0.4$), $La_{1-x}Sr_xCrO_3$ (where $0<x<1$, particularly where $0.1 \leq x \leq 0.4$), $La_{1-x}Sr_xCoO_3$ (LSC, where $0<x<1$, particularly where $0.1 \leq x \leq 0.4$), and $SrMn_{1-x}Co_xO_3$ (where $0<x<1$ and particularly where $x \leq 0.2$). These metal oxides have electron conductivities between about 1 and 4 S/cm in the relevant temperature range, and the structural characteristics are conducive to membrane formation.

Exemplary suitable metal phases include Ti, V, Nb, Ta, Zr, Cr, Mo, W, Mn, Fe, Co, Ni, Cu, Ag, Au, Pt, Ir, Al, and alloys of these metals. Several of these metals and alloys, may also exhibit significant hydrogen permeation, so that hydrogen permeation could also occur through the metal phase. However, these metals and alloys components are contemplated first as providing electron conductivity in combination with hydrogen ion-conducting materials, such as metal oxides, oxyacid salts, and fluorides discussed above.

In specific embodiments, hydrogen-permeable materials exhibiting both hydrogen ion conduction and electron conduction are prepared by mixing hydrogen ion-conducting metal oxides, oxyacid salts and fluorides with electron conducting metal oxides, metals or alloys. Hydrogen-permeable materials can further include distinct metal oxide phases which impart mechanical strength or other beneficial mechanical properties. The electron-conducting phase of the hydrogen-permeable material can be single- or multi-phase, and can comprise from about 20 to 60 vol. % of the composite. In more specific embodiments, hydrogen permeable materials exhibiting both hydrogen ion conduction and electron conduction are prepared by mixing a hydrogen ion-conducting oxyacid salts in optional combination with one or more metal oxides and with electron conducting metal oxides, metals or alloys. In more specific embodiments, hydrogen permeable materials exhibiting both hydrogen ion conduction and electron conduction are prepared by mixing one or more hydrogen ion-conducting fluorides in optional combination with one or more metal oxides and with electron conducting metal oxides, metals or alloys. In other specific embodiments, hydrogen permeable materials exhibiting both hydrogen ion conduction and electron conduction are prepared by mixing a hydrogen ion-conducting metal oxide with electron conducting metal oxides, metals or alloys.

Hydrogen-permeable oxyacid salt compositions include those containing nitrate salts, particularly $RbNO_3$, in combination with metals (e.g., Pd, Ag, Pd/Ag alloys or electronic- or electron-conducting ceramics). Preferred oxyacid salt hydrogen permeable compositions are those containing $RbNO_3$ and particularly compositions containing a mixture of $RbNO_3$ with LSC.

FIGS. 1B through 1E schematically illustrate four exemplary embodiments of the invention. FIG. 1B illustrates a multilayer membrane in which a hydrogen permeable central layer is separated from metal or metal alloy catalysts by use of layers of barrier coatings. The primary function of the central metal or alloy layer is to selectively permeate (purify) hydrogen. The primary function of the barrier coating is to minimize interdiffusion of metals between the central and catalyst layers. The primary function of the catalyst is to split hydrogen into atoms or ions suitable for permeation through the barrier and central layers. The barrier coating and catalyst layers on either side of the membrane may be made of the same or different materials.

In FIG. 1C, the layered membrane comprises a hydrogen permeable metal or alloy, two layers of a multi-phase ceramic or cermet catalyst and optional layers of a barrier coating. The primary functions of each layer are as noted for FIG. 1B. The catalyst layers and if present, the barrier coating layers may be the same or different on either side of the hydrogen permeable layer.

In FIG. 1D, the layered membrane comprises a hydrogen permeable cermet, layers of metal or metal alloy catalysts and optionally comprises barrier coating layers. The primary functions of each layer are as described in FIG. 1B. The barrier coating and catalyst layers on either side of the membrane may be made of the same or different materials.

Figure 15:
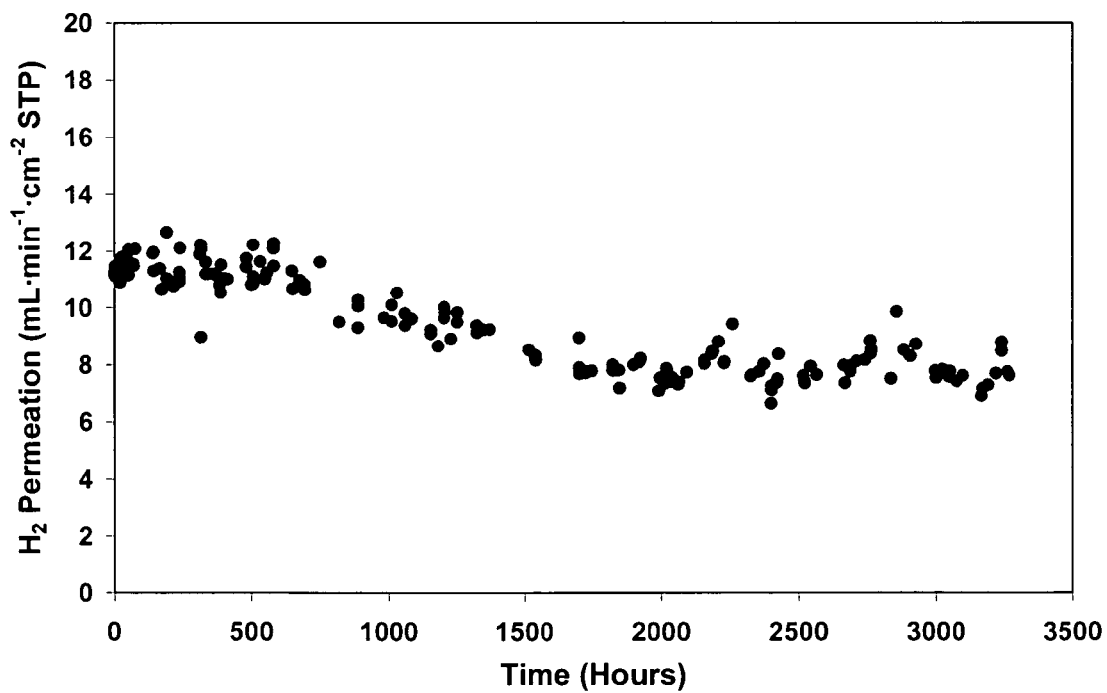
FIG. 15 shows hydrogen permeation data for a 0.127-mm thick vanadium membrane with 0.5 μm of palladium on each side and an approximately 2-mm thick porous alumina layer on the feed side. Hydrogen permeation as a function of time at 320° C. for a 0.127-mm thick vanadium membrane with 0.5 μm of palladium on each side and an approximately 2-mm thick porous ceramic layer on the hydrogen feed side. The feed gas was 200 mL/min 87.5 vol. % hydrogen (bal. helium), and the sweep gas was 240 mL/min argon.

In FIG. 1E, the layered membrane comprises a hydrogen-permeable cermet, one or two layers of barrier coating, and layers of a multi-phase ceramic or cermet catalyst, all as described in FIGS. 1B–1D. The barrier coating and catalyst layers on either side of the membrane may be made of the same or different materials. All of the exemplified membranes of FIGS. 1B–1E can be provided with one or more protective layers as described above to provide long term membrane operation as illustrated in the results of FIG. 15.

The illustrated composite multi-layer membranes of FIGS. 1B–1E each selectively permeate hydrogen between about 250 and 950° C., depending on the composition. The membranes can be used to separate hydrogen from a wide range of gases typical of industrial processes. Examples in which the membranes of this invention can be used include coal gasification, steam reforming of natural gas, biomass utilization, petroleum refining, municipal waste treatment, and promoting water-gas shift reactions.

Membrane materials of this invention exhibit improved resistance to hydrogen embrittlement, improved resistance to feedstream contaminants and in general exhibit longer operation lifetimes.

Multilayer membranes of this invention can be made in various shapes that can be employed in various membrane reactor designs. The membranes may be plates, disks, tubes, tubes with one sealed or closed end. Membrane layers may be integrated such that each layer is in some way adhered to adjacent layers, e.g., by sequential deposition or coating processes. Membrane layers may also be held closely in contact by mechanical means, e.g., by clamping or the use of mechanical devices that apply force (e.g., using springs, clamps, screws and other attachment devices). Protective layers may be integral with other layers of the membrane, they may be mechanically held in contact with the other layers or they may be provided as separate elements in a reactor membrane.

Hydrogen-ion conducting, electron-conducting, electronic-conducting materials, cermets and mixed metal oxides of this invention can be prepared using the teachings herein and what is generally known in the art. In particular, a number of the references cited herein provide methods for making such materials. The membrane layers of this invention can be prepared using teachings herein and what is generally known in the art, particularly with respect to deposition, and coating methods.

In preferred embodiments, the materials employed in the membranes of this invention are selected to minimize thermal expansion mismatch. Thermal expansion coefficients of various metal, alloys and ceramics are known. In general, it is preferred to select combinations of materials for membranes of this invention in which the coefficients of thermal expansion of all materials used in the membrane differ from each other by less than about 30% and more preferably less than about 10%. For a given practical application, more or less variation in the thermal expansion coefficients of membrane components may be acceptable depending upon the specific membrane and reactor configuration employed, membrane or layer thickness, and operational temperature conditions, e.g., temperatures employed and the rate of heating or cooling of the membrane, etc.

This invention provides membrane reactors which employ membranes of this invention for hydrogen separation. Various reactor membrane designs are known and used in the art. A number of references cited herein provide useful reactor designs. U.S. Pat. Nos. 6,281,403, 6,037,514, and 5,821,185 provide descriptions of exemplary reactors. U.S. Pat. No. 6,569,226 also provides a description of an exemplary reactor.

Figure 24:
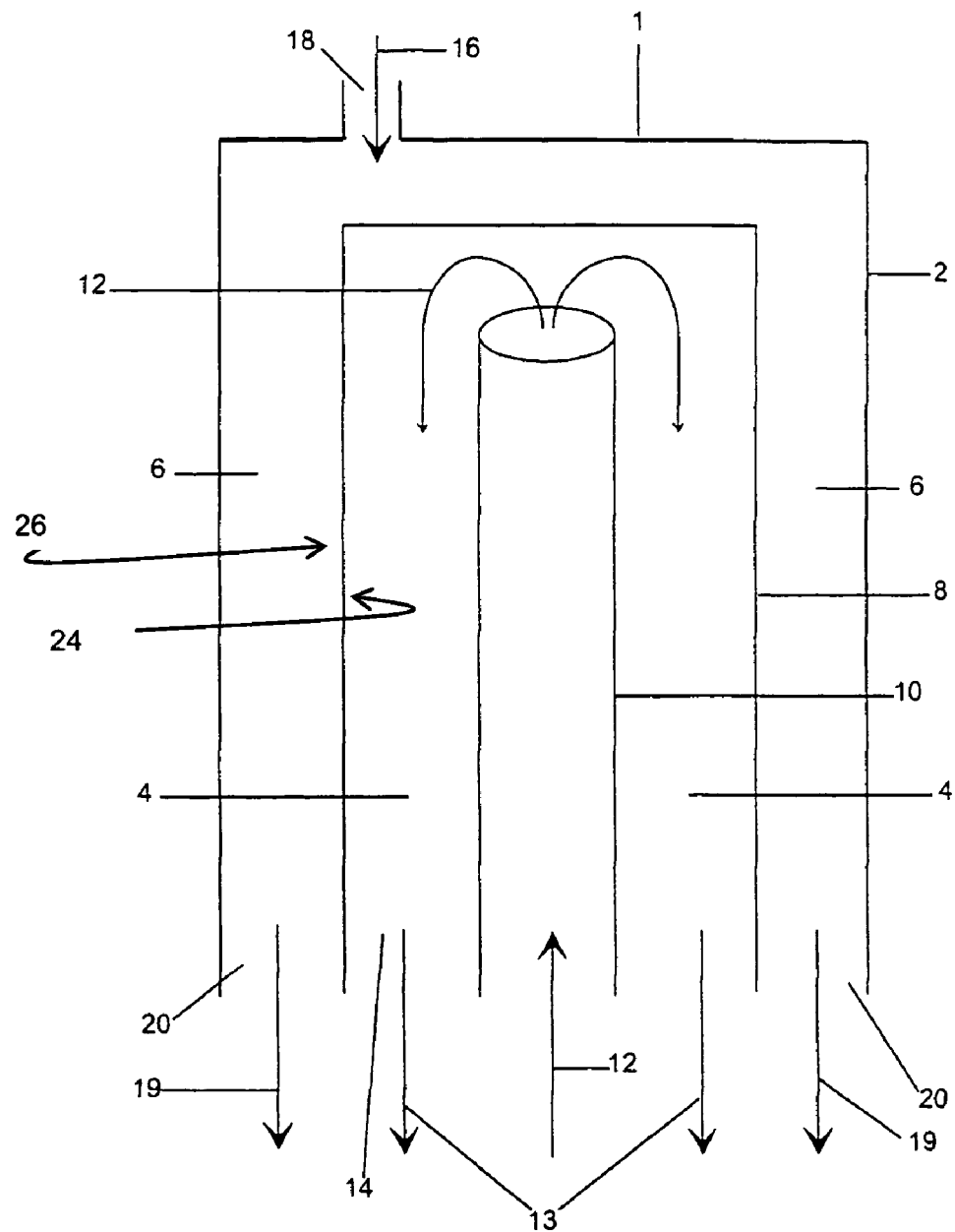
FIG. 24 is a schematic drawing of an exemplary reactor of this invention in cross-section.

An exemplary membrane reactor is illustrated in FIG. 24 in cross-section. The reactor includes a cell 1 having a hydrogen feed zone 4 separated from a hydrogen sink 6 by a membrane of this invention 8. The membrane 8 illustrated is a tube with one closed end, but any shape capable of creating two separate zones could be employed. A reactor shell 2 defines the hydrogen sink. The membrane has a hydrogen feed surface (24) facing the hydrogen feed zone and a hydrogen sink surface (26) facing the hydrogen sink. Feed tube 10 delivers a hydrogen-containing gas 12 into the hydrogen feed zone. Hydrogen-depleted gases 13 exit the hydrogen feed zone via at least one exit port 14. An optional sweep gas (e.g., a gas chemically inert to hydrogen, e.g., $N_2$, Ar, He) 16 is applied via at least one entrance port 18. Separated hydrogen (e.g., in sweep gas) 19 exits the reactor via exit port 20. Additionally or as an alternative to use of the sweep gas, a vacuum can be applied at port 20 to facilitate removal and collection of separated hydrogen. The reactor for separation of hydrogen can be coupled to other chemical reactors which employ hydrogen gas as a reactant.

A reactor may have a plurality of cells within a single reactor shell. In this case a gas manifold or other gas delivery system would be employed to introduce hydrogen-containing gas into the hydrogen feed zones of each cell.

The invention also relates to methods for separating hydrogen from other components in a hydrogen-containing gas. Exemplary feedstreams from which hydrogen can be separated include water-gas shift mixtures and mixtures resulting from petroleum reforming. The membranes and reactors of this invention can be used to separate hydrogen from gas mixtures containing hydrocarbons (e.g., methane, ethane, butane, etc.), aromatic species (e.g., benzene, naphthalene, etc.), nitrogen containing species (e.g., ammonia, etc.), oxidized hydrocarbons (e.g., ethanol and/or other alcohols) and sulfur containing species (e.g., hydrogen sulfide, sulfur dioxide, etc.)

The membranes and reactors of this invention can be applied to various hydrogen-containing feedstreams including those having low levels of hydrogen (less than about 1% by volume) and those feedstreams that are almost pure (99%+) and contain trace levels of contaminants. Feedstreams containing hydrogen may be diluted with a carrier gas prior to processing the membrane reactors of this invention, if desirable, for example, to dilute detrimental impurities. Feedstreams may be concentrated, by selective removal of other gases, by drying or similar pre-treatment prior to processing in a membrane reactor of this invention. The separation process of this invention to provide separated hydrogen involves the steps of contacting the hydrogen feed surface of a membrane of this invention with a hydrogen-containing gas, heating the membrane to a temperature such that hydrogen dissociation occurs and hydrogen ions are transported through the membrane, and reassociated to hydrogen in the hydrogen sink. A vacuum or sweep gas then is used to facilitate collection of separated hydrogen Exemplary feedstreams from which hydrogen can be separated include water-gas shift mixtures and mixtures resulting from petroleum reforming. The membranes and reactors of this invention can be used to separate hydrogen from gas mixtures containing hydrocarbons (e.g., methane, ethane, butane, etc.), aromatic species (e.g., benzene, naphthalene, etc.), nitrogen containing species (e.g., ammonia, etc.), oxidized hydrocarbons (e.g., ethanol and/or other alcohols) and sulfur containing species (e.g., hydrogen sulfide, sulfur dioxide, etc.)

The invention further relates to methods for carrying out various chemical reactions, particularly oxidation-reduction reactions. In these reactions, hydrogen is removed from at least one hydrogen-containing species (hydrocarbon, hydrogen sulfide, etc.) on the hydrogen source side of the membrane and transported to the other side of the membrane to reduce an oxidized species (e.g., oxygen) or to be released as hydrogen to facilitate the reaction.

Membranes and membrane reactors herein can specifically be used to facilitate dehydrogenation reactions as illustrated in the following equations:

$$C_4H_{10} + \tfrac{1}{2}O_2 \rightarrow C_4H_8 + H_2O$$

$$C_nH_{2n+2} + \tfrac{1}{2}O_2 \rightarrow C_nH_{2n} + H_2O$$

In application to dehydrogenation reactions, a hydrocarbon dehydrogenation catalyst is provided on the surface of the membrane (feed side) in contact with the hydrogen-containing species. A reduction catalyst, or more specifically an $O^{2-}$ reduction catalyst can be provided on the hydrogen sink surface of the membrane. For example, the feed side, of the membrane can be provided with a Pt/Sn catalyst, optionally supported on MgO or $SiO_2$ and the sink side with Ag, Pt, or LSM ($La_{0.8}Sr_{0.2}CoO_3$) or related catalysts.

Membranes and membrane reactors herein can specifically be used to facilitate oxidative dimerization or more generally oxidative oligomerization as illustrated in the following equations:

$$2CH_4 + O_2 \rightarrow C_2H_4 + 2H_2O$$

$$2C_nH_{2n+2} + O_2 \rightarrow C_{2n}H_{4n} + 2H_2O$$

$$CH_4 + C_2H_6 + O_2 \rightarrow C_3H_6 + 2H_2O$$

$$C_nH_{2n+2} + C_mH_{2m+2} + O_2 \rightarrow C_{n+m}H_{2n+2m} + 2H_2O$$

In application to oxidative dimerization or oligomerization reaction, a hydrocarbon oligomerization catalyst is provided on the surface of the membrane in contact with the hydrogen-containing species and a reduction catalyst is provided on the hydrogen sink surface of the membrane. For example, a) oxides of the first row transition metals supported on the alkali metal oxides, b) the metals Ni, Fe, Pt, Ag or Pd and their alloys, and/or c) perovskite compounds $AB_{1-x}B'_xO_{3-y}$, where A=Ca, Sr, Ba, B=Ce, Tb, Pr, or Th; B'=Ti, V, Cr, Mn, Fe, Co, Ni or Cu and $0.02<x<0.5$ and y is a number that renders the compound charge neutral).

Membranes and membrane reactors herein can specifically be used to facilitate aromatic coupling reactions as illustrated in the following equation:

$$2C_6H_6(benzene) + \tfrac{1}{2}O_2 \rightarrow C_6H_5\text{'}C_6H_5(biphenyl) + H_2O.$$

In application to aromatic coupling, a coupling catalyst is provided on the surface of the membrane in contact with the aromatic species to be coupled a reduction catalyst is provided on the hydrogen sink surface of the membrane. For example, Pt group metals, Pt/Sn, and basic oxides, including $Li_2O$ or MgO can be employed as catalysts in aromatic coupling reactions.

Membranes and membrane reactors herein can specifically be used to facilitate hydrogen sulfide decomposition as illustrated in the following equation:

$$H_2S + \tfrac{1}{2}O_2 \rightarrow S + H_2O$$

In application to hydrogen sulfide decomposition, a hydrogen sulfide decomposition catalyst is provided on the surface of the membrane in contact with the hydrogen sulfide and a reduction catalyst is provided on the hydrogen sink surface of the membrane. For example, thiospinels $AB_2S_4$, where A is a $2^+$ group VIII ion and B is 3+group VIII ion, and/or $MoS_2$ or $WS_2$ can be used.

In oxidation-reduction reactions facilitated by the membranes and membrane reactors herein, a hydrogen-containing species (e.g., hydrocarbon, hydrogen sulfide, etc.) is contacted with the hydrogen source side of a membrane heated to operational temperature suitable for the reaction to be carried out and the hydrogen sink side of the membrane is contacted with a species to be reduced (e.g., oxygen), or a sweep gas or vacuum to remove hydrogen. Reactions as illustrated above are carried out with membranes at temperatures ranging from about 250 to about 800° C. and at pressures in the range of ambient to 1000 psi.

The following examples further illustrate the invention, but are not intended to limit the invention.

EXAMPLES

Example 1

Preparation of Dense Vanadium-Containing Cermet Membranes

Cermets are prepared by combining selected amounts of powders of vanadium and a selected ceramic optionally in further combination with a sintering aid and optionally in further combination with an organic binder. The combined powders are formed into selected shapes, e.g., by pressing and the shaped cermets are sintered in vacuum or inert gas at an appropriate temperature until dense. Sintering agents and organic binders are employed, as is known in the art, as needed to achieve densification. When sintering agents are employed, typically 0.5 to 4 wt. % of the sintering agent may remain in the sintered material.

Sintered shaped cermets are ground to a selected thickness and provided with catalyst layers, typically applied as thin layers by, for example, metal deposition.

Vanadium-alumina cermets are prepared by combining powders of vanadium metal and alumina in combination with $Y_2O_3$ as a sintering aide and polyvinyl butryal binder. The combination is pressed to form a disk which is sintered under vacuum at 1650° C. for two to four hours. The disk is then ground to the selected thickness. Both surfaces are coated with appropriate catalyst layers, such as thin layers of Pd metal or a Pd alloy (e.g., Pd—Ag).

Figure 2:
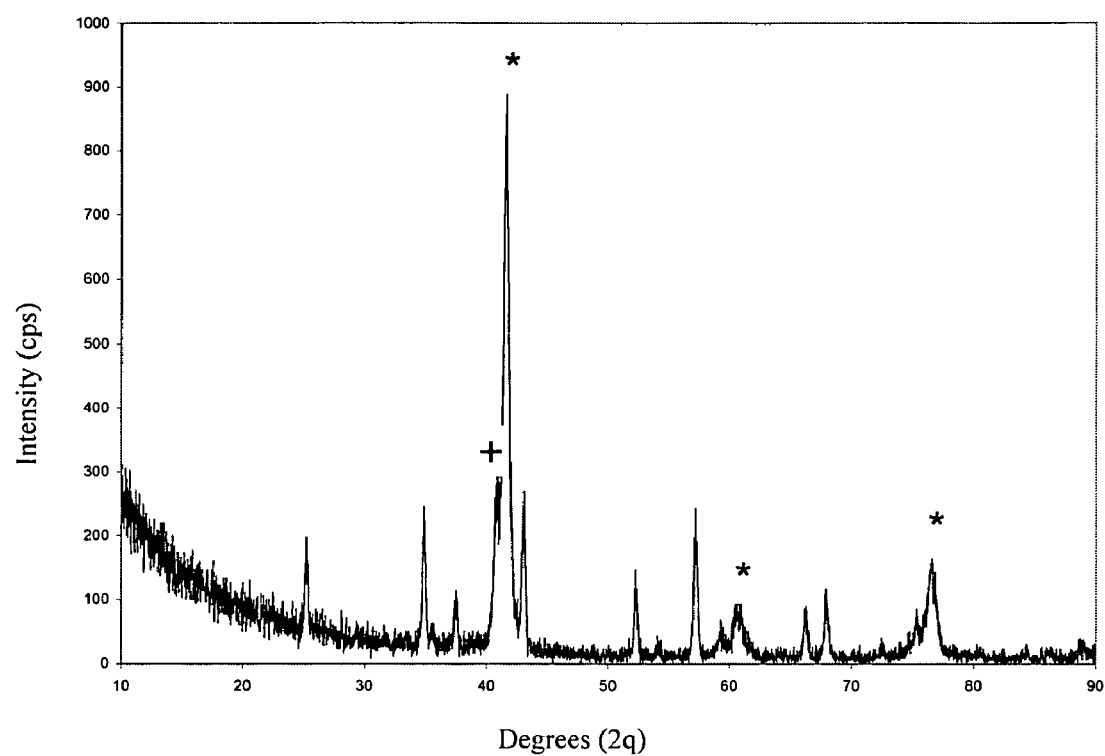
FIG. 2 provides an XRD pattern of the ground disk surface of a 60 vol. % V/alumina cermet prepared as described in the Examples herein. The V phase is marked by *. The vanadium carbide phase impurity is marked with +. Unmarked peaks are from $Al_2O_3$.

1. A 60 vol. % V/alumina cermet is prepared by combining 4.19 g vanadium metal (–325 mesh, 99.5% metals basis, Alfa Aesar) with 3.81 g aluminum oxide (alpha-alumina, 0.35–0.49 μM. 99.95% Alfa Aesar). A sintering aid (0.04 g $Y_2O_3$) and organic binder (0.16 g, polyvinyl butryal, PVB) can also be added. The mixture is thoroughly mixed under conditions that prevent oxidation of the vanadium. The mixture is mixed dry, or under inert atmosphere, or using either a minimum amount of solvent, or an oxygen-free solvent. The combination is pressed in a ½ inch diameter die uniaxially at 17,000 lbs for at least about 2 minutes at 130° C. The pressed disks are then heated to 1650° C. under vacuum ($10^{-4}$ to $10^{-5}$ torr) for 2 to 4 hrs until dense. FIG. 2 provides an XRD spectrum of the ground disk surface of the cermet formed.

Thin layers of Pd, 0.1 to 0.5 μm thick are deposited on each face of the disk. Pd is deposited by vapor deposition under a vacuum of $10^{-6}$ torr, at a rate of 0.6 nm/sec. The Pd is in metallic form and the thickness is measured in situ using a quartz crystal microbalance and confirmed by SEM.

2. A 40 vol. % V/alumina cermet is prepared essentially as in 1 above by initially combining 4.19 g vanadium metal, 3.81 g of aluminum oxide, 0.04 g $Y_2O_3$ and 0.16 g PVB. The combined materials are mixed in a small bottle with acetone and two milling beads for 1 hour.

Figure 3:
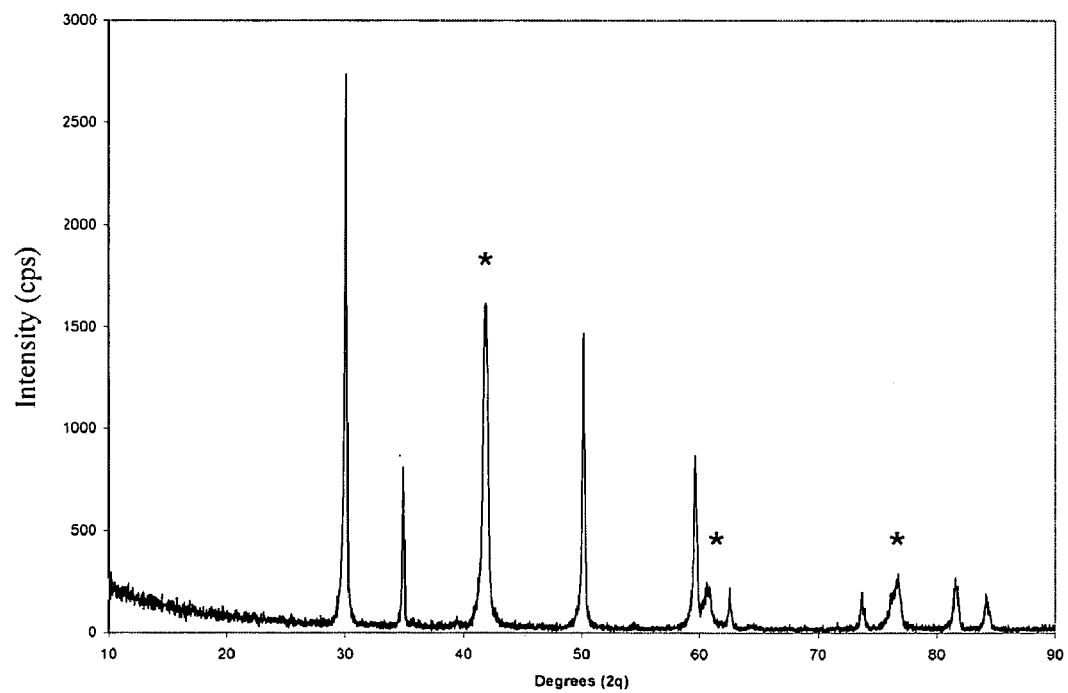
FIG. 3 is an XRD pattern of the ground surface of a disk formed from a vanadium-stabilized zirconia cermet prepared as described in the Examples herein. V phase marked by *. Unmarked peaks are from cubic stabilized zirconia.

3. Vanadium-zirconia cermets are prepared by combining powders of vanadium metal, yttria-stablized zirconium oxide (Tosoh-Zirconia, TZ-8Y) and organic binder PVB. The combined materials are mixed as in 2. The combinations are pressed into a desired shape (disks of approximate selected thickness), sintered at 1600° C. in vacuum and ground to a selected thickness. FIG. 3 is an XRD spectrum of the ground surface of the disk.

Thin layers of Pd (about 0.5 micron thick are deposited on each face of the disk as described above.).

Figure 4:
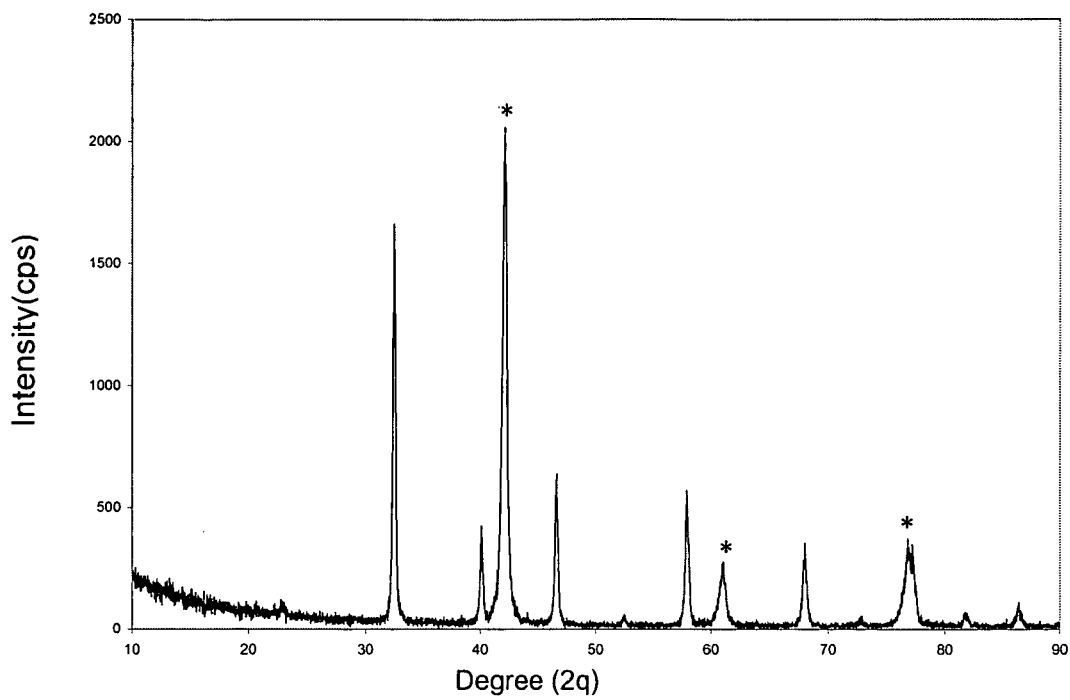
FIG. 4 is an XRD pattern of the ground surface of a disk formed from a vanadium-strontium titanate cermet as described in the Examples herein. V phase marked by *. Unmarked peaks are from cubic perovskite strontium titanate phase.

4. Vanadium-strontium titanate cermets are prepared by combining vanadium metal and strontium titanate powders, and mixing as in 1 and 2. The combination is shaped by pressing and heating the pressed cermet in inert gas (He) to 1650° C. The disk is ground to a desired thickness. FIG. 4 is an XRD pattern of the ground surface of the disk.

Figure 5:
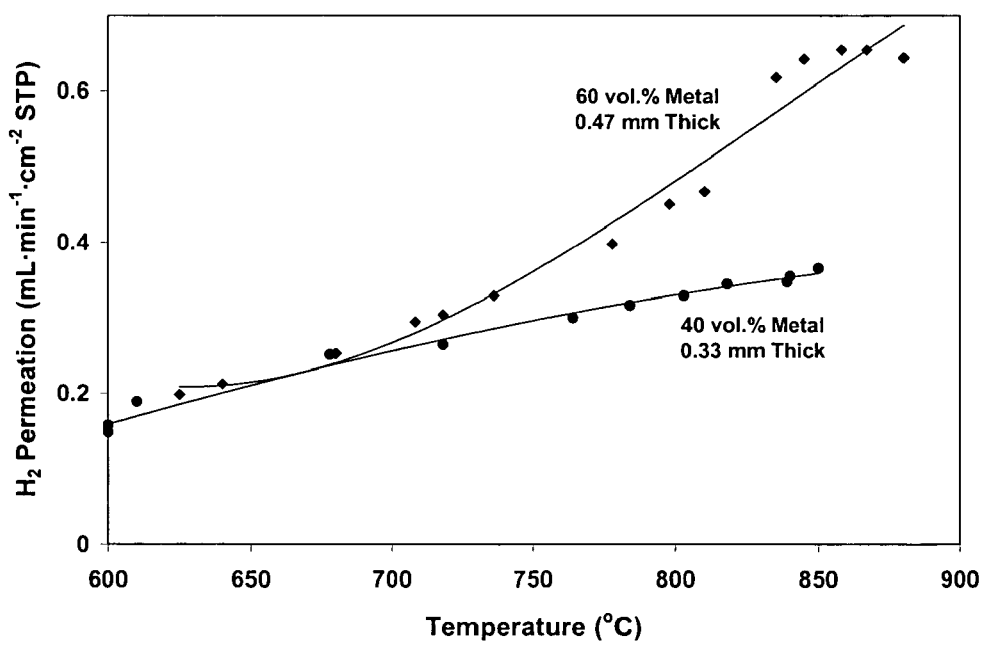
FIG. 5 is a graph illustrating exemplary hydrogen permeation data as a function of temperature for alumina vanadium cermet membranes having Pd catalyst layers. Results are shown for cermets containing 60 and 40 vol. % V, (diamonds and circles, respectively).

FIG. 5 illustrates exemplary hydrogen permeation data as a function of temperature for exemplary vanadium cermet membranes having 0.5 micron thick Pd catalyst layers. A feed gas containing 80/20 (V/V) $H_2$/He is introduced on one side of the membrane at a flow rate of 75 ml/min, and a sweep gas on the opposite side is introduced at a flow rate of 150 mL/min. Ar carries permeate from the sweep side of the membrane to a gas chromatograph (GC) to detect gases present.

Example 2

Hydrogen Permeation Characteristics of Composite Barrier Coatings

To function as barrier coatings, ceramics, cermets, and inorganic salts must exhibit sufficient hydrogen permeability. Accordingly, a series of membranes were prepared from barrier coating materials and selective hydrogen flux across the membranes was measured. Examples for each category of barrier coating are provided below.

Figure 6:
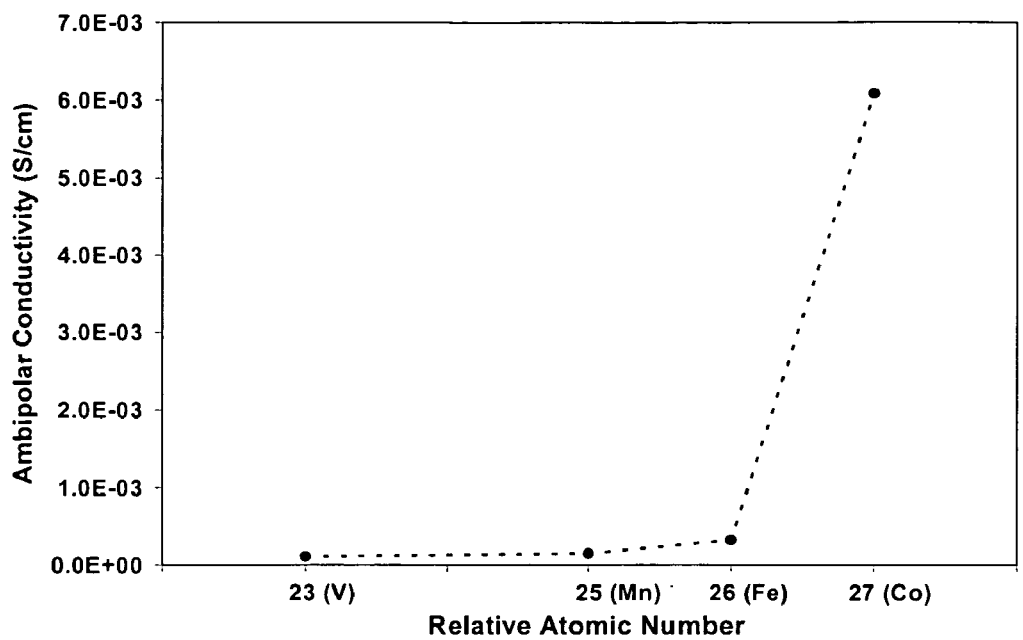
FIG. 6 shows the ambipolar conductivity (i.e., mixed hydrogen ion/electron conductivity) of four perovskite-based ceramics. Ambipolar conductivity is plotted as a function of atomic number for four transition metal dopants, B', in the general composition $BaCe_{0.8}B'_{0.2}O_{3-\delta}$. The inlet gas was humidified 80 vol. % $H_2$ (bal. He) and the sweep gas was Ar. Flow rates were 120 mL/min, and the temperature was 850° C. Ni catalyst was applied to the membrane surfaces.

Ceramic Composites. FIG. 6 shows the ambipolar conductivity (i.e., mixed hydrogen ion/electron conductivity) of four perovskite-based ceramics, each with a different B-site dopant, B', at a fixed concentration. The general composition for these ceramics is $BaCe_{0.8}B'_{0.2}O_{3-\delta}$. Within this series, there is a gradual increase in ambipolar conductivity from $1.1 \times 10^{-4}$ to $3.3 \times 10^{-4}$ S/cm for the first three compositions as the transition metal dopant moved from left to right across the periodic table (i.e., V to Fe). However, a more substantial increase in conductivity to $6 \times 10^{-3}$ S/cm is observed for B'=Co, and a 1-mm thick membrane of this composition enables hydrogen transport at a rate of approximately 0.3 mL/min/cm². X-ray diffraction measurements indicate that each sample in FIG. 6 contained a barium cerate-based phase in addition to a second phase that was dependent on the transition metal dopant. There is no detectable (or measurable) change in the lattice parameters of the perovskite phase for the samples above, indicating that the dopant level for each of these transition metals was low.

The minor phases matched well with phases such as $BaCoO_{2.6}$, $BaFeO_3$, $Ba_3(CrO_4)_2$, and $Ba_3(VO_4)_2$ for the respective transition metal dopant. In the case of $BaFeO_3$ a shift in peak positions, and lattice parameters, suggests the possibility of a Ce-doped $BaFeO_3$, analogous to the proposed Fe-doped $BaCeO_3$. The formation of the $Ba_3(MO_4)_2$ phases implies either the presence of an undetected B-cation rich oxide or an off stoichiometric A:B ratio in the perovskite phase to maintain an overall A:B ratio of 1:1. (On the other hand, a deficiency in Ba could be accounted for by its volatility). The exact identity of the minor phases is observed to depend on the choice of dopant, the dopant level, as well as the heating temperature. Some of these observations correlate well with published phase diagrams. For some mixtures, no corresponding phase diagrams were found.

Figure 7:
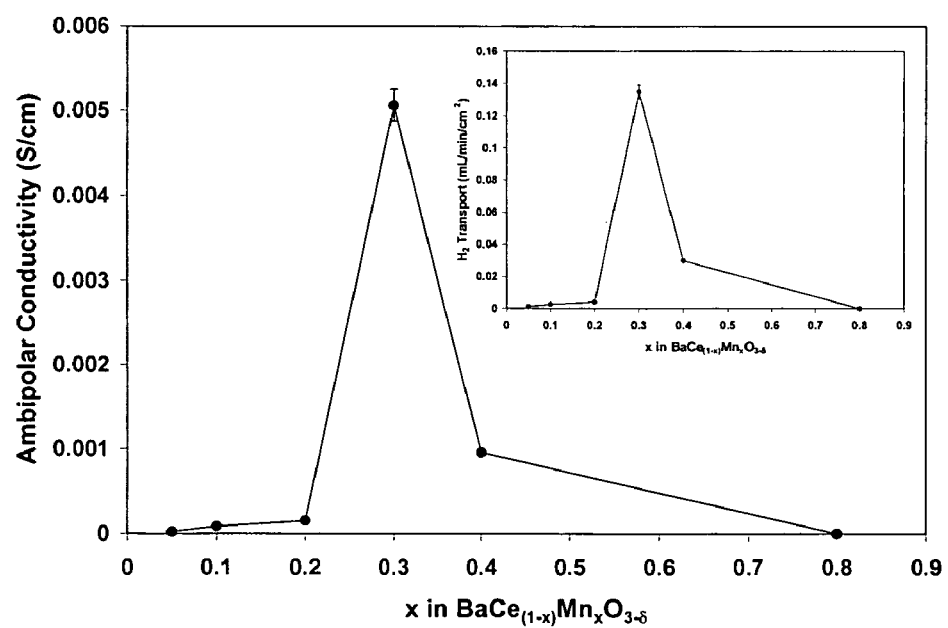
FIG. 7 illustrates the effect of dopant (Mn) concentration on ambipolar conductivity and hydrogen transport rate (inset) for the composition $BaCe_{1-x}Mn_xO_{3-\delta}$, where $0.05 \leq x \leq 0.8$. The measurements were obtained at 850° C. without humidity. Ni catalyst was applied to the membrane surfaces.

The dopant Mn is used to test the effect of dopant concentration on conductivity and hydrogen transport. The results are summarized in FIG. 7 for the composition $BaCe_{1-x}Mn_xO_{3-\delta}$, where $0.05 \leq x \leq 0.8$. As evident in the figure, conductivity increased slightly from x=0.05 to x=0.2. However, at x=0.3, there is a sharp maximum of $5 \times 10^{-3}$ S/cm corresponding to a hydrogen transport rate of 0.13 mL/min/cm . X-ray diffraction patterns indicated that at x=0.05, the material is primarily a single-phase pseudo-cubic perovskite with a lattice parameter of 4.393(1) Å, which is approximately equal to the undoped $BaCeO_3$ analog. At low dopant levels ($0.1 \leq x \leq 0.4$) a second phase is observed that can be indexed to a rhombohedral distorted perovskite cell analogous to other barium perovskites with lattice parameters a=5.797 Å and c=28.595 Å. This second phase increases in prominence with increasing dopant concentration. At x=0.8, the cubic perovskite phase is completely absent, and the resulting material (i.e., $BaCe_{0.2}Mn0.8O_{3-\delta}$) is not stable in hydrogen above 600° C. It is believed that the pseudo-cubic perovskite phase primarily is responsible for hydrogen ion conductivity, and ambipolar conductivity increased as the more electron conducting second phase from the transition metal dopant emerged. However, beyond the maximum at x=0.3, the more electron conducting phase began to dominate and dilute the hydrogen ion conducting phase. The result is a decrease in ambipolar conductivity, and ultimately instability of the material.

Cermet Composites. As an alternative to composite ceramic membranes, a primarily hydrogen ion-conducting ceramic phase is combined with a metallic phase to provide electron conductivity. The potential advantages of this approach are that i) ceramic materials with maximum hydrogen ion conductivity can be used regardless of their electron conductivity, and ii) provided the metallic phase is continuous, electron conductivity does not limit hydrogen transport.

Figure 8:
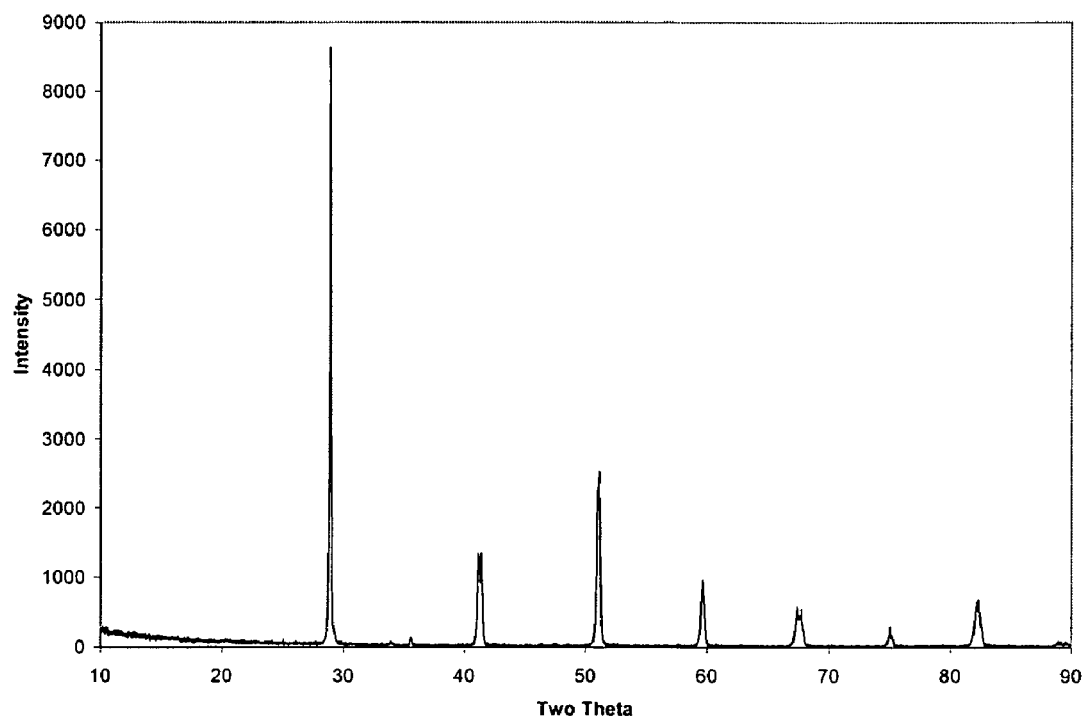
FIG. 8 is an X-ray diffraction pattern of a cermet membrane for hydrogen separation represented by the formula $BaCe_{0.8}Y_{0.2}O_{3-\delta}$/44 wt. % Ni.
Figure 9:
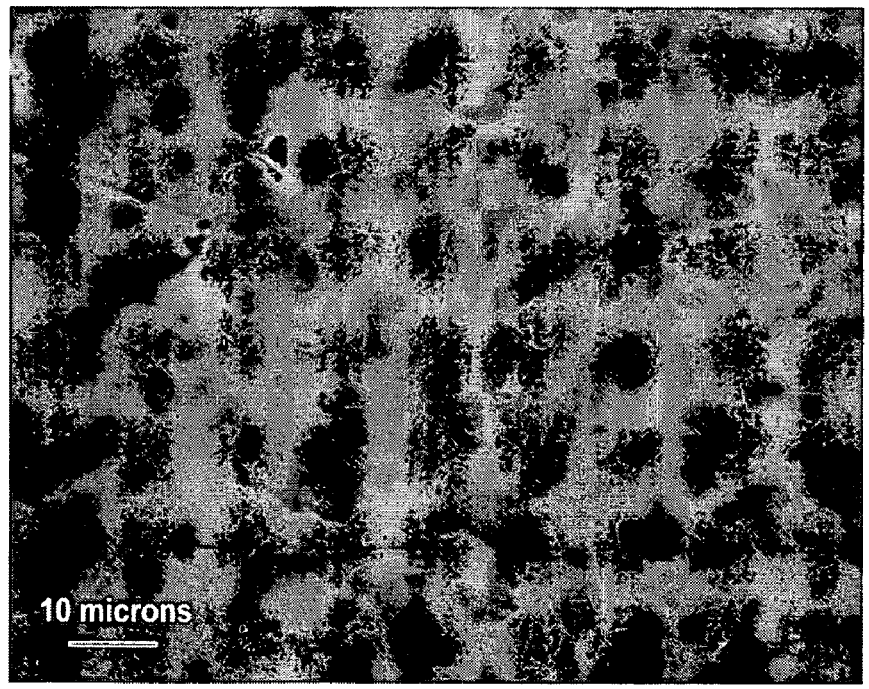
FIG. 9 shows a scanning electron microscope image of a cermet membrane with the composition $BaCe_{0.8}Y0.2O_{3-\delta}$ 44 wt. % Ni. The proton-conducting ceramic appears as the light regions and the metal is the dark regions.

A specific example of a cermet membrane for hydrogen separation is represented by the formula $BaCe_{0.8}Y_{0.2}O_{3-\delta}/44$ wt. % Ni. The hydrogen ion conducting metal oxide phase of this material (i.e., $BaCe_{0.8}Y_{0.2}O_{3-\delta}$) is prepared by mixing $BaCO_3$ and the binary metal oxides in stoichiometric quantities, then is processed by ball-milling for several hours. The ball-milled powders are calcined at temperatures between 1200 and 1250° C. for a total of 12 to 24 hours to form a phase-pure material. An X-ray diffraction pattern of this material is shown in FIG. 8. The particle size of this metal oxide is reduced to between 0.4 and 1.5 $\mu$m by attrition milling. Next, Ni powder with particle sizes between 0.4 and 1.5 $\mu$m is added to the metal oxide powder to achieve a metal contents of 44 wt. % (approximately 36 vol. %). The mixture of powders is ball-milled for 1 hr, then pressed into pellets and sintered under a reducing atmosphere of hydrogen containing gas at 1425° C. for 4 hours. FIG. 9 shows a scanning electron microscope image of the cermet membrane. Continuity of the ceramic phase (light region) is very apparent in the image, whereas, the metal phase (dark region) appears more like isolated metal pockets. However, the SEM image does not reveal three-dimensional continuity. In fact, these membranes appear metallic, and electrical continuity between opposite faces of the membrane is confirmed by low electrical resistance measured across the membrane.

Figure 10:
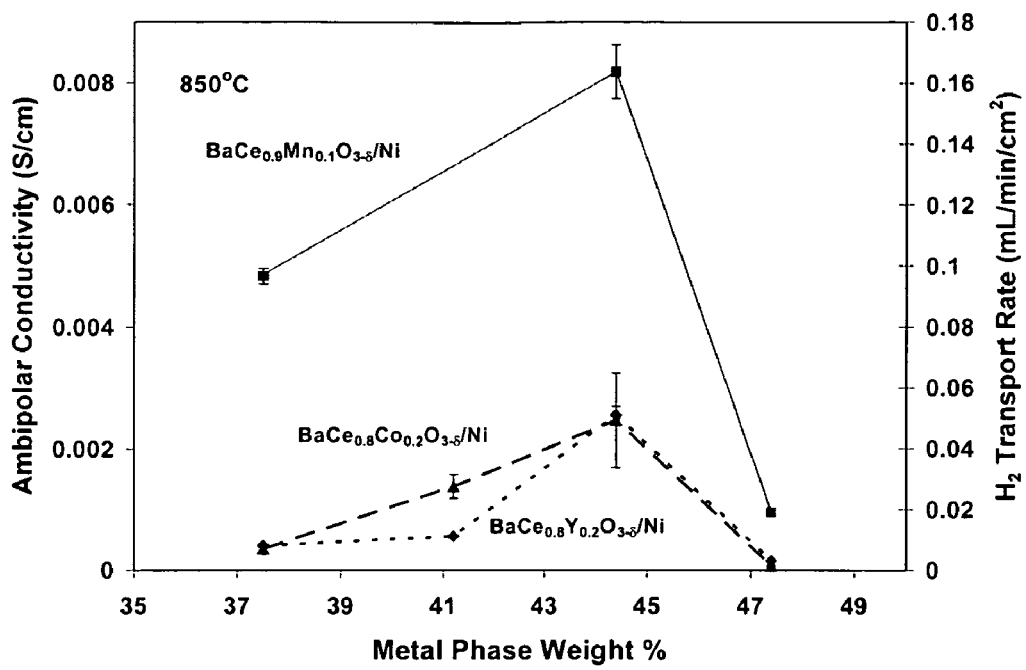
FIG. 10 is a graph of ambipolar conductivity and hydrogen transport as a function of metal phase weight percent for several cermet membranes.

FIG. 10 contains a plot of ambipolar conductivity and hydrogen transport as a function of metal phase weight percent for several cermet membranes. The ceramic phases were $BaCe_{0.9}Mn_{0.1}O_{3-\delta}$, $BaCe_{0.8}Co_{0.2}O_{3-\delta}$, and $BaCe_{0.8}Y_{0.2}O_{3-\delta}$, and the metal phase for each was Ni, which has an added benefit of possessing catalytic activity for dissociation of hydrogen. Ceramic phases $BaCe_{0.9}Mn_{0.1}O_{3-\delta}$ and $BaCe_{0.8}Co0.2O_{3-\delta}$ were multi-phase ceramics that demonstrated significant hydrogen transport even in the absence of Ni, as described earlier. However, $BaCe_{0.8}Y_{0.2}O_{3-\delta}$ had very low electron conductivity and, without the metal phase, negligible hydrogen transport. Maximum conductivity and hydrogen transport for each curve was observed at a metal content of 44.4 wt. %, which corresponded to between 34 and 36 vol. % metal phase, and approximately 80 mol % metal phase. It should be emphasized that ambipolar conductivity was calculated based on hydrogen transport, and thus is an apparent conductivity that represents a bulk property of the sample. Additionally, differences in surface catalytic activity also might contribute to the dependence in ambipolar conductivity and $H_2$ transport on metal phase content (Siriwardane, R. V.; Jr., J. A. P.; Fisher, E. P.; Lee, T. H.; Dorris, S. E.; Balachandran, U. *Appl. Surf Sci.* 2000, 167, 34–50.)

Figure 11:
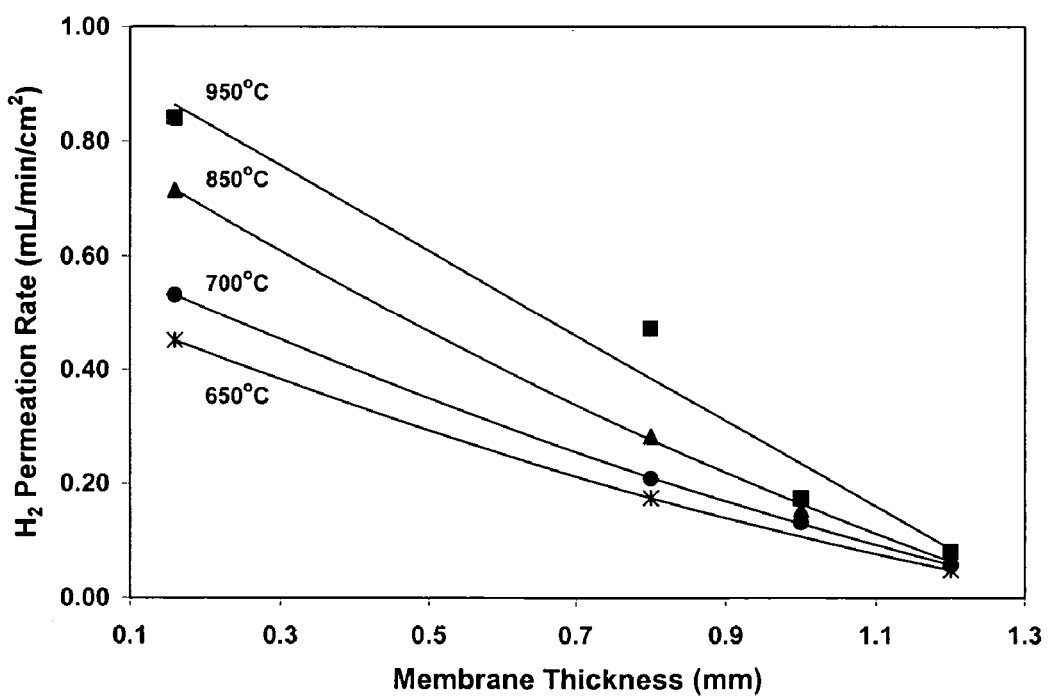
FIG. 11 shows the dependence of $H_2$ permeation on cermet thickness for BaCe0.8Y0.2O3-δ/44 wt. % Ni.

The dependence of $H_2$ permeation on cermet thickness is shown in FIG. 11 for $BaCe_{0.8}Y_{0.2}O_{3-\delta}/44$ wt. % Ni. At 950° C., hydrogen transport increased from 0.08 to 0.47 mL/min/cm$^2$ as the membrane thickness was decreased from 1.2 to 0.8 mm. The greater dependence of $H_2$ permeation on temperature as thickness decreased presumably was the result of surface kinetic resistance contributing more to the overall $H_2$ transport process.

Figure 12:
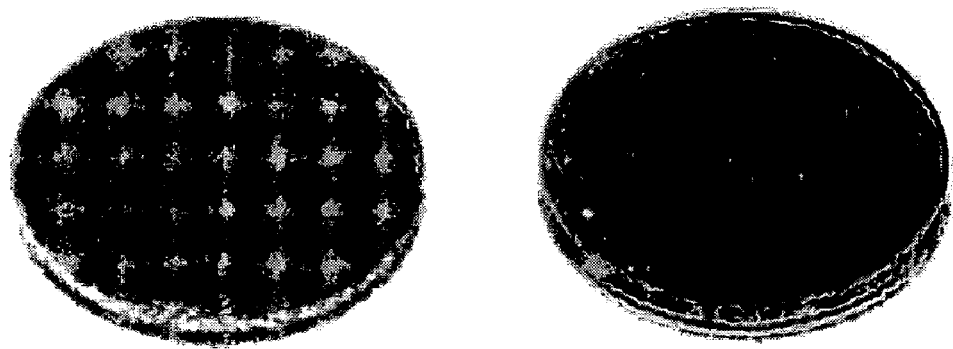
FIG. 12 contains a photograph of two representative sintered membrane samples. Composites that contained either Ag or Ni appear lustrous and metallic (left), whereas composites with electron conducting metal oxides are black (right).
Figure 13:
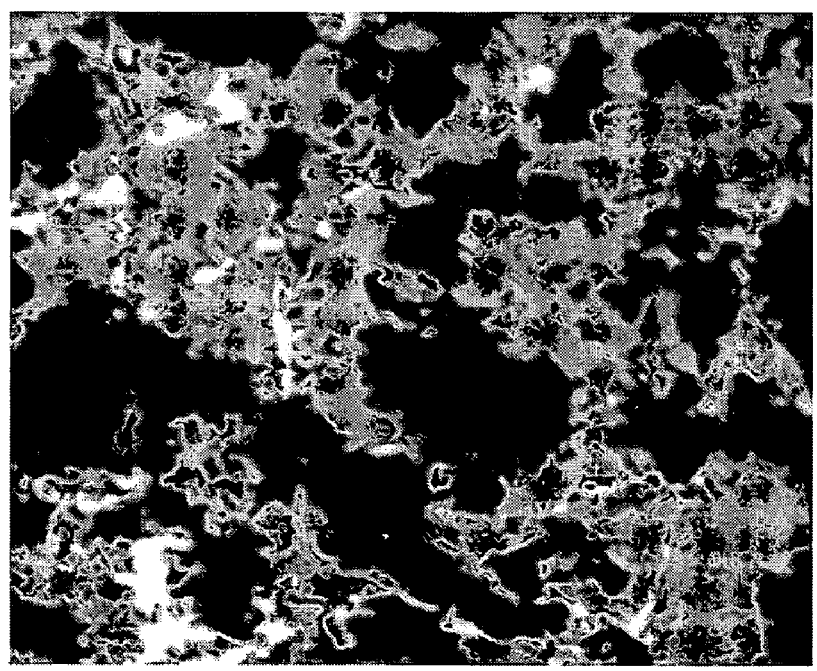
FIG. 13 is a representative SEM micrograph (1000×) of a ground surface of an oxyacid salt/metal composite membrane (a sintered $RbNO_3$/Ag membrane).The light areas are Ag and the dark areas are $RbNO_3$.

Oxyacid Salt Composites. FIG. 12 contains a photograph of two representative sintered membrane samples. Composites that contained either Ag or Ni appear lustrous and metallic (left), whereas composites with electron conducting metal oxides are black (right). Generally, composites containing pure metals have higher mechanical strength than the ceramic-containing analogs. FIG. 13 shows a representative SEM micrograph (1000×) of a ground surface of an oxyacid salt/metal composite membrane. The dark areas were the proton-conducting salt and the light areas were the metal. This image clearly shows continuity between each phase. Continuity of the electron conducting phase was confirmed with ohmmeter measurements.

Table 2 contains a summary of composite membrane compositions evaluated for hydrogen separation. Included in the table are the percent of theoretical density of the membranes, the membrane thickness, and the maximum hydrogen transport rate and conductivity measured for each sample. The conditions under which the maximum values were obtained are included in the maximum transport column. For samples that had adequate temperature dependence data, activation energies and pre-exponential factors for hydrogen transport were included.

$RbNO_3$ powder used in the composite membranes exhibited several phase changes over the temperature range from 150° to 320° C., as determined by differential thermal analysis (DTA). At approximately 161° C. there was an endothermic transition from trigonal/hexagonal to cubic (CsCl symmetry) (Chary, A. S.; Reddy, S. N. *Phys. Stat. Sol.* 1998, 208, 349–352.) This phase transition results in an increase in symmetry and proton conductivity; however, as the temperature was increased beyond approximately 222° C., a transition to a less symmetrical, less conductive rhombohedral phase occurred. At about 283° C., another transition back to a cubic phase (NaCl symmetry) occurred, and the melting point was apparent at 310° C. The DTA curve was completely reversible upon cooling, and X-ray diffraction (XRD) patterns from sintered $RbNO_3$ composite pellets with Ag, Ni, or LSC corresponded to the low-temperature trigonal/hexagonal phase. XRD patterns of sintered composite membranes showed no signs of reaction between the two phases.

TABLE 2

Summary of Composite Membrane Evaluation for Selected Samples.

| Composition | % of Theor. Density | Mem. Thick. (mm) | Max. H$_2$ Transport (mL/mim/cm$^2$) | Max. H+ Cond. (S/cm) | E$_a$ (eV) | lnA |
|---|---|---|---|---|---|---|
| RbNO$_3$/Ag 50/50 vol % | 91 | 1.5 | 0.18 at 325° C. [H$_2$]$_{in}$ = 50 vol % | 0.068 | 0.09 (<200° C.) 1.4 (>200° C.) | 1.2 30 |

TABLE 2-continued

Summary of Composite Membrane Evaluation for Selected Samples.

| Composition | % of Theor. Density | Mem. Thick. (mm) | Max. $H_2$ Transport (mL/mim/cm$^2$) | Max. H+ Cond. (S/cm) | $E_a$ (eV) | ln A |
|---|---|---|---|---|---|---|
| $RbNO_3$/Ni 50/50 vol % | 87 | 0.75 | 0.17 at 310° C. [$H_2$]$_{in}$ = 80 vol % | 0.019 | 0.07 (<250° C.) 4.0 (>250° C.) | −0.9 81 |
| $RbNO_3$/LSC 50/50 vol % | 94 | 0.85 | 1.0 at 400° C. [$H_2$]$_{in}$ = 80 vol % | 0.13 | 0.50 (>200° C.) | 13 |
| $CsNO_3$/Ag 50/50 vol % | 93 | 1.1 | 0.21 at 300° C. [$H_2$]$_{in}$ = 80 vol % | 0.055 | — | — |
| $CsNO_3/Al_2O_3$/Ag 38/22/40 vol % | 88 | 0.71 | 0.13 at 420° C. [$H_2$]$_{in}$ = 80 vol % | 0.0060 | 1.1 (>350° C.) | 19 |
| $CsNO_3$/LSC 50/50 vol % | 96 | 0.80 | 0.059 at 400° C. [$H^2$]$_{in}$ = 80 vol % | 0.0042 | — | — |
| $Li_2SO_4$/Ag 50/50 vol % | 77 | 1.6 | *0.79 at 600° C. [$H_2$]$_{in}$ = 76 vol % | *0.29 | 0.08 Low-Temp Monoclinic | 6.2 |

Figure 14:
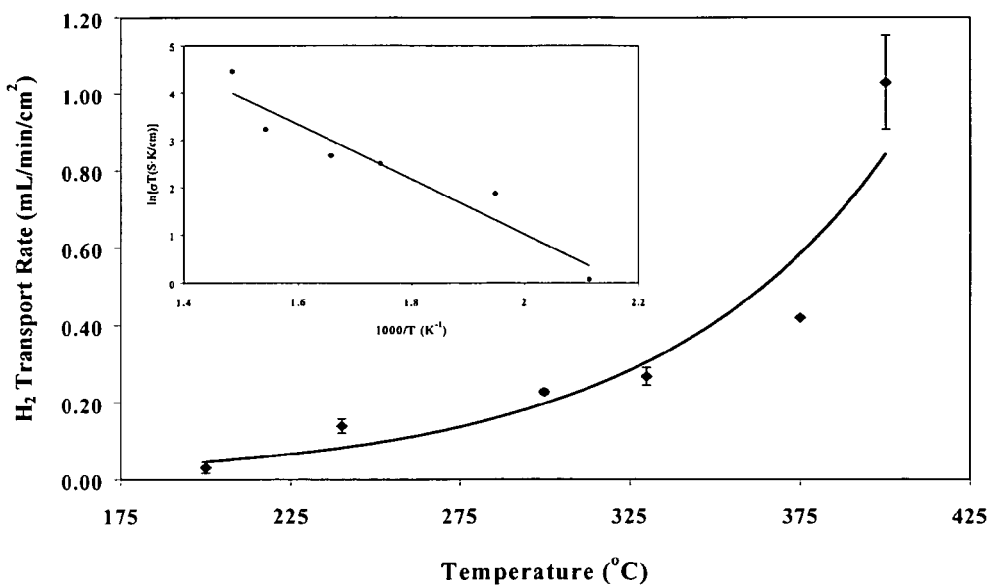
FIG. 14 shows the hydrogen transport temperature dependence for a 50/50 vol. % $RbNO_3$/LSC composite membrane, and the figure inset shows the apparent proton conductivity temperature dependence based on the transport values. The membrane was 0.85 mm thick, and the inlet gas was 80 vol. % $H_2$ with a balance of He. The sweep gas was Ar and flow rates were ~100 mL/min. The error bars represent ±1σ.

FIG. 14 shows the hydrogen transport temperature dependence for a $RbNO_3$/LSC composite membrane, and the figure inset shows the apparent proton conductivity temperature dependence based on the transport values. Between about 300° and 325° C., hydrogen transport and conductivity for $RbNO_3$/LSC was only slightly higher than for $RbNO_3$/Ag and $RbNO_3$/Ni, i.e., each sample demonstrated a hydrogen transport of ~0.1 to 0.2 mL/min/cm$^2$ and conductivity between ~0.01 and 0.02 S/cm in this temperature range. However, increasing the temperature up to 400° C. resulted in a transport rate of 1 mL·min$^{-1}$·cm$^{-2}$ and corresponding conductivity of 0.13 S/cm. These results were close to those obtained for hydrogen ion conducting analogs (i.e., no electron conductivity) (Zhu, B.; Mellander, B.-E. *Solid State Ionics* 1995, 77, 244–249; Zhu, B.; Mellander, B.-E. *Ferroelectrics* 1995, 167, 1–8; Zhu, B. *Solid State Ionics* 1999, 125, 397–405.) Specifically, hydrogen ion conductivities in the range of 0.01 to 0.1 S/cm were reported for $RbNO_3$ systems above 480° C. (Zhu, B.; Mellander, B.-E. *Ferroelectrics* 1995, supra) and Zhu,and Mellander (*Solid State Ionics* 1995, 77, 244–249) reported a hydrogen ion conductivity of 0.038 S/cm at 400° C. for $RbNO_3$ with 55–60 mol. % $Al_2O_3$. The activation energy for hydrogen (proton) transport above 200° C. was 0.5 eV, which was the lowest of the $RbNO_3$-based composites.

After six days of operation, the $RbNO_3$/Ag (50/50 vol. %) membrane retained its integrity. However, XRD, energy dispersive X-ray (EDX), and scanning electron microscope (SEM) measurements indicated that $RbNO_3$ migrated to the surface and partially enveloped surface Ag. In contrast, after only two days of operation, the $RbNO_3$/Ni membrane became soft and moist upon removal from the cell. After drying, XRD analysis of the sample showed peaks for Ni and $RbNO_3$ in addition to multiple peaks of unknown origin. It is possible that $Ni(OH)_2$ and NiO contributed to these peaks, however, no evidence of RbOH or RbH was observed. $RbNO_3$/LSC (50/50 vol. %) membranes were the most stable, showing no signs of chemical or mechanical decomposition after several days of testing.

Example 3

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous zinc oxide, 1 mm thick;
Layer 3: Pd, 0.25 μm thick;
Layer 4: 60 vol. % $RbNO_3$/40 vol. % $La_{1-x}Sr_xCoO_3$ (LSC, where $0.1 \leq x \leq 0.4$), 1 μm thick;
Layer 5: Vanadium metal, 100 μm thick;
Layer 6: same as Layer 4;
Layer 7: same as Layer 3;
Layer 8: none; and
Layer 9: none.

Example 4

An exemplary dense multilayer membrane useful for hydrogen separation or purification at a preferred temperature range of 600 to 900° C. with layers as illustrated in FIG. 1A is prepared with layers and layer thicknesses as follows:
Layer 1: porous alumina, 1 mm thick;
Layer 2: porous zinc oxide, 1 mm thick;
Layer 3: Pd, 0.25 μm thick;
Layer 4: $BaCe_{0.7}Mn_{0.3}O_{3-\delta}$, where the phases are a mixture of Mn-doped $BaCeO_3$ and mixed Mn oxides, 1 μm thick;
Layer 5: Vanadium metal, 100 μm thick;
Layer 6: same as Layer 4;
Layer 7: same as Layer 3; and
Layers 8 and 9 none.

Example 5

An exemplary dense multilayer membrane useful for hydrogen separation or purification at a preferred temperature range of 600 to 900° C. with layers as illustrated in FIG. 1A is prepared with layers and layer thicknesses as follows:
Layer 1: porous alumina, 1 mm thick;
Layer 2: porous zinc oxide, 1 mm thick;
Layer 3: Pd, 0.25 μm thick;
Layer 4: $BaCe_{0.8}Y_{0.2}O_{3-\delta}$/44 wt. % Ni, 1 μm thick;
Layer 5: V/10 wt. % Ni, 100 μm thick;
Layer 6: same as Layer 4;
Layer 7: same as Layer 3;
Layer 8: same as Layer 2; and
Layer 9: same as Layer 1.

Example 6

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous $CeO_2$, 1 mm thick;
Layer 3: 40 vol. % Pd/60 vol. % $Al_2O_3$, 0.5 $\mu$m thick;
Layer 4: None;
Layer 5: V/10 wt. % Ni, 100 $\mu$m thick;
Layer 6: same as Layer 4;
Layer 7: same as Layer 3;
Layer 8: same as Layer 2; and
Layer 9: same as Layer 1.

Example 7

An exemplary dense multilayer membrane useful for hydrogen separation or purification at a preferred temperature range of 600 to 900° C. with layers as illustrated in FIG. 1A is prepared with layers and layer thicknesses as follows:
Layer 1: porous alumina, 1 mm thick;
Layer 2: porous $CeO_2$, 1 mm thick;
Layer 3: 65 wt. % $BaCe_{0.8}Y_{0.2}O_{3-\delta}$/35 wt. % $La_{1-x}Sr_xMnO_3$ (LSM, where $0.1 \leq x \leq 0.4$), 0.5 $\mu$m thick;
Layer 4: None;
Layer 5: Nb metal, 100 $\mu$m thick;
Layer 6: same as Layer 4;
Layer 7: same as Layer 3;
Layer 8: same as Layer 2; and
Layer 9: same as Layer 1

Example 8

An exemplary dense multilayer membrane useful for hydrogen separation or purification at a preferred temperature range of 300 to 600° C. with layers as illustrated in FIG. 1A is prepared with layers and layer thicknesses as follows:
Preferred temperature range: 300 to 600° C.
Layer 1: porous alumina, 1 mm thick;
Layer 2: porous $CeO_2$, 1 mm thick;
Layer 3: Pd, 0.25 $\mu$m thick;
Layer 4: 60 vol. % $RbNO_3$/40 vol. % $La_{1-x}Sr_xCoO_3$ (LSC, where $0.1 \leq x \leq 0.4$), 1 $\mu$m thick;
Layer 5: 60 vol. % V/40 vol. % $SrTiO_3$, 200 $\mu$m thick;
Layer 6: same as Layer 4;
Layer 7: same as Layer 3;
Layer 8: same as Layer 2; and
Layer 9: same as Layer 1.

Example 9

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous $ZnO_2$, 1 mm thick;
Layer 3: 40 vol. % Pd/60 vol. % $La_{1-x}Fe_xCr_xO_{3-\delta}$, 0.5 $\mu$m thick;
Layer 4: none;
Layer 5: 60 vol. % V/40 vol. % $SrTiO_3$, 200 $\mu$m thick;
Layer 6: none;
Layer 7: same as Layer 3;
Layer 8: same as Layer 2; and
Layer 9: same as Layer 1.

Example 10

Hydrogen Permeable Membrane with Integrated Guard Bed

FIG. 15 shows hydrogen permeation data for a 0.127-mm thick vanadium membrane with 0.5 $\mu$m of palladium on each side and an approximately 2-mm thick porous alumina layer on the feed side. The vanadium membrane was 99.8% pure, with aluminum, molybdenum, and silicon as the major impurities. The vanadium was polished, cleaned in methanol, and dried prior to vapor deposition of palladium onto both sides. The porous alumina layer was applied as an aqueous paste, and then cured at room temperature.

As evident in the figure, this material demonstrates good long-term stability, which suggests resistance to hydrogen embrittlement under operating conditions. Analogous membranes without a protective coating have significantly shortened operational lifetimes and are more susceptible to failure. For this category of membranes, hydrogen embrittlement can be avoided by maintaining the membrane above approximately 300° C. Prior to cooling the membrane, the separation cell first is purged with an inert gas for several hours. Once an inert atmosphere is established and residual hydrogen is liberated from the membrane, the sample can be cooled to room temperature and subsequent sample analysis indicates no metal hydride is present.

Example 11

Effect of Hydrogen Concentration on Permeation

Figure 16:
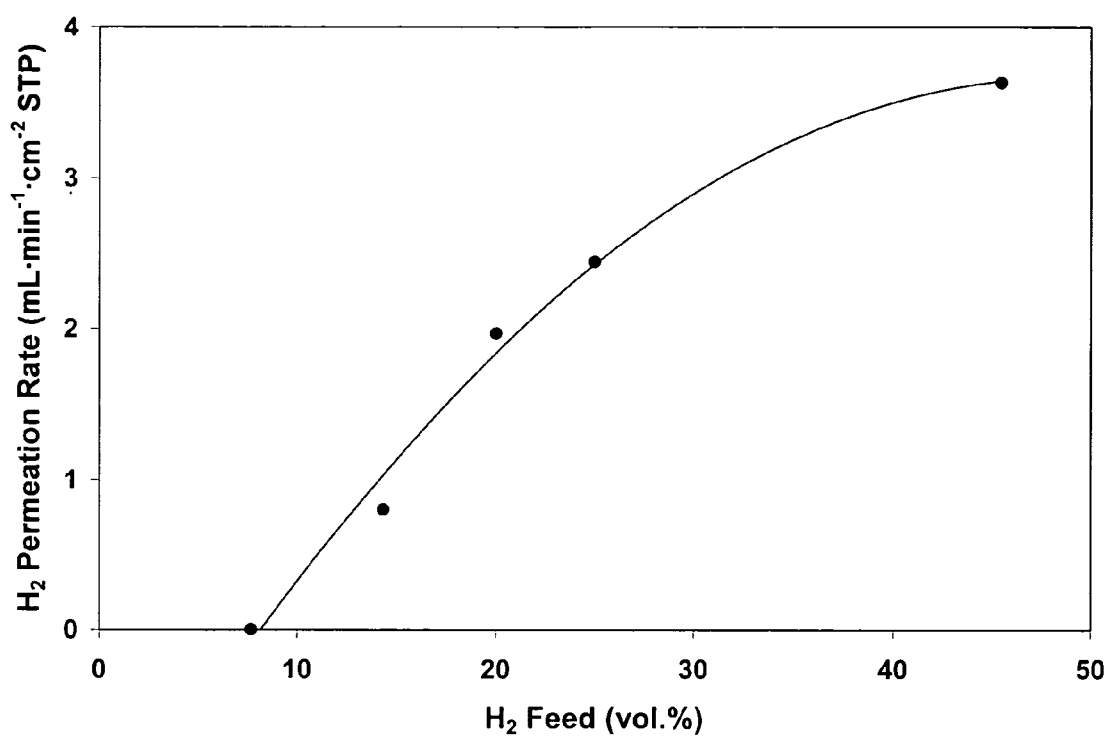
FIG. 16 illustrates the effect of hydrogen concentration on the feed (or hydrogen source) side of the membrane on hydrogen permeation. The membrane used was SrTiO3 with 60 vol. % V and a 0.5-μm thick Pd film on both sides. The temperature was 320° C. The feed gas was a H2/He mix at a flow rate of approximately 80 mL/min. The sweep gas was Ar at 120 mL/min.

FIG. 16 illustrates the effect of hydrogen concentration on the feed (or hydrogen source) side of the membrane. The membrane used was $SrTiO_3$ with 60 vol. % V and a 0.5-$\mu$m thick Pd film on both sides. The temperature was 320° C. The feed gas was a $H_2$/He mix at a flow rate of approximately 80 mL/min. The sweep gas was Ar at 120 mL/min. Permeation rate generally increases with increasing hydrogen concentration.

Example 12

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous zinc oxide, 1 mm thick
Layer 3: Pd, 0.25 $\mu$m thick;
Layer 4: $BaCe_{0.7}Mn_{0.3}O_{3-\delta}$, where the phases are a mixture of Mn-doped $BaCeO_3$ and mixed Mn oxides, 1 $\mu$m thick;
Layer 5: Vanadium/10 at. % Ni alloy, 100 $\mu$m thick;
Layer 6: same as Layer 4;
Layer 7: same as Layer 3;
Layer 8: none; and
Layer 9: none.

Example 13

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous zinc oxide, 1 mm thick;

Layer 3: Pd, 0.25 μm thick;
Layer 4: BaCe$_{0.7}$Mn0.3O$_{3-\delta}$, where the phases are a mixture of Mn-doped BaCeO$_3$ and mixed Mn oxides, 1 μm thick;
Layer 5: Vanadium/10 at. % Ti alloy, 100 μm thick;
Layer 6: same as Layer 4;
Layer 7: same as Layer 3;
Layer 8: none; and
Layer 9: none.

Example 14

An exemplary dense multilayer membrane useful for hydrogen separation or purification at a preferred temperature range of 300 to 600° C. with layers as illustrated in FIG. 1A is prepared with layers and layer thicknesses as follows:
Layer 1: porous alumina, 1 mm thick;
Layer 2: porous zinc oxide, 1 mm thick;
Layer 3: Pd, 0.25 μm thick;
Layer 4: BaCe$_{0.7}$Mn$_{0.3}$O$_{3-\delta}$, where the phases are a mixture of Mn-doped BaCeO$_3$ and mixed Mn oxides, 1 μm thick;
Layer 5: Vanadium/10 at. % Al alloy, 100 μm thick;
Layer 6: same as Layer 4;
Layer 7: same as Layer 3;
Layer 8: none; and
Layer 9: none.

Example 15

Vanadium/Titianium Membranes

Figure 17:
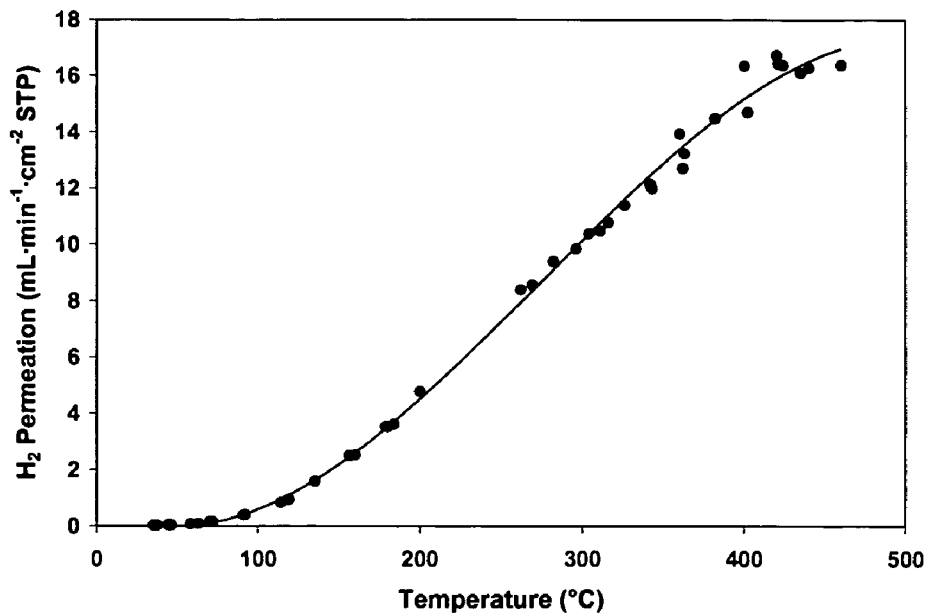
FIG. 17 shows $H_2$ permeation versus temperature for a 0.9-mm thick V/Ti alloy membrane (having 10 at. % Ti) at a differential pressure of 250 psi. A 0.5-μm thick Pd film was deposited on each side of the membrane. The feed gas was 500 mL/min of $40H_2/10He$ (bal $N_2$) and the sweep gas was 450 mL/min $N_2$. The maximum permeability was $1\times10^{-7}$ $mol \cdot m^{-1} \cdot s^{-1} \cdot Pa^{-1/2}$. This data shows that an operational temperature of less than 100° C. under $H_2$ can be used without membrane failure when Ti is added to V.

FIG. 17 shows H$_2$ permeation versus temperature for a 0.9-mm thick V/Ti alloy membrane (having 10 at. % Ti) at a differential pressure of 250 psi. A 0.5-μm thick Pd film was deposited on each side of the membrane. The feed gas was 500 mL/min of 40H$_2$/10He (bal N$_2$) and the sweep gas was 450 mL/min N$_2$. The maximum permeability was $1 \times 10^{-7}$ mol·m$^{-1}$·s$^{-1}$·Pa$^{-1/2}$. This data shows that an operational temperature of less than 100° C. under H$_2$ can be used without membrane failure when Ti is added to V.

Figure 18:
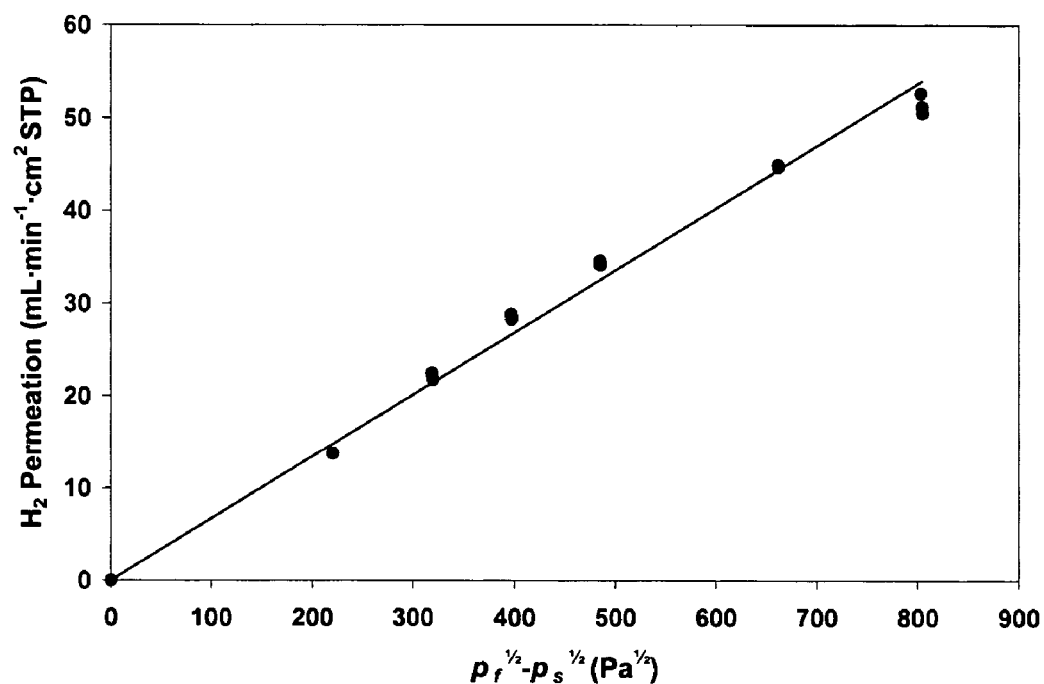
FIG. 18 shows $H_2$ permeation as a function of the $H_2$ partial pressure difference across a V—Ti alloy membrane. This data indicates that increasing the feed and sweep flows facilitates $H_2$ transport.

FIG. 18 shows H$_2$ permeation as a function of the H$_2$ partial pressure difference across a 0.5-mm thick V—Ti alloy (10 at. % Ti) with 0.3 μm of Pd on each side of the membrane. The H$_2$ feed and sweep partial pressures are p$_f$ and p$_s$, respectively. The feed gas was 1.5 L/min of 80 vol. % H$_2$/10 vol. % He/10 vol. % N$_2$. The sweep gas was 1.1 L/min N$_2$. The maximum permeability was $2.7 \times 10^{-7}$ mol·m$^{-1}$·s$^{-1}$·Pa$^{-1/2}$. The temperature was 400° C. This data indicates that increasing the feed and sweep flows facilitates H$_2$ transport.

Figure 19:
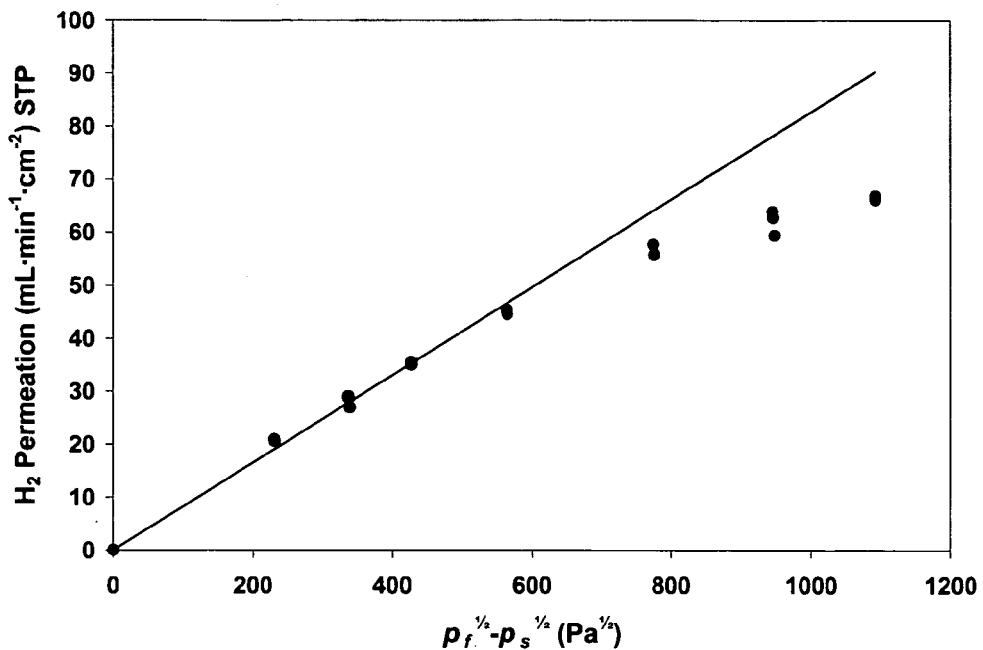
FIG. 19 shows $H_2$ permeability as a function of the $H_2$ partial pressure difference across a V—Ti alloy membrane

FIG. 19 shows H$_2$ permeability as a function of the H$_2$ partial pressure difference across a 0.6-mm thick V—Ti alloy membrane (15 at. % Ti) with 0.3 μm of Pd on each side. The membrane temperature was 438° C. The feed gas was 80 vol. % H$_2$/3 vol. % He (bal. Ar) at 1.5 L/min. The maximum permeability was $3.6 \times 10^{-7}$ mol·m$^{-1}$·s$^{-1}$·Pa$^{-1/2}$. The sweep gas was 1.5 L/min Ar. The line corresponds to the expected trend for Sieverts' Law. This data shows that similar results are obtained with both the V-10Ti and V-15Ti alloys. Also, deviation from Sieverts' law occurs at high partial pressure differentials likely due to inadequate H$_2$ supply rate on the feed side.

Figure 20:
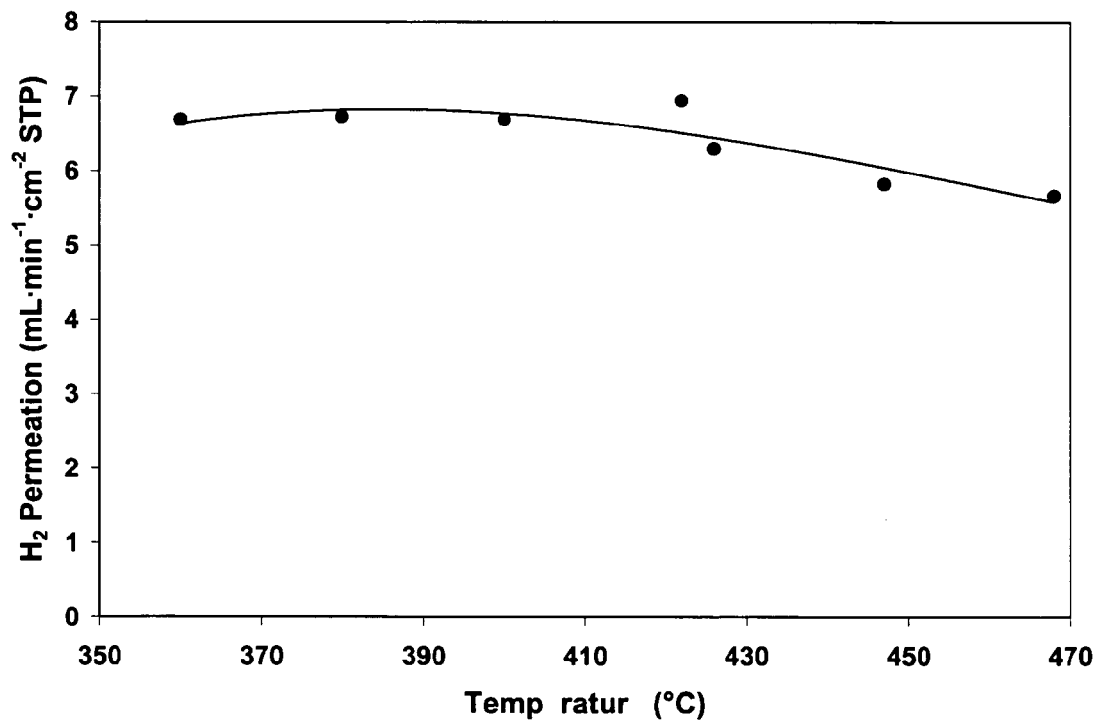
FIG. 20 shows $H_2$ permeation over a narrow temperature range for an V—Ni alloy membrane.

FIG. 20 shows H$_2$ permeation over a narrow temperature range for a 0.6-mm thick V—Ni alloy membrane (15 at. % Ni) with 0.5 μm of Pd on each side. The feed gas was 500 mL/min 40 vol. % H$_2$/10 vol. % He/50 vol. % N$_2$. The sweep gas was 450 mL/min N$_2$. The total pressure difference across the membrane was 250 psi. The maximum permeability was $3 \times 10^{-8}$ mol·m$^{-1}$·s$^{-1}$·Pa$^{-1/2}$. This data shows V—Ni has lower hydrogen flux than many other V-alloys.

Figure 21:
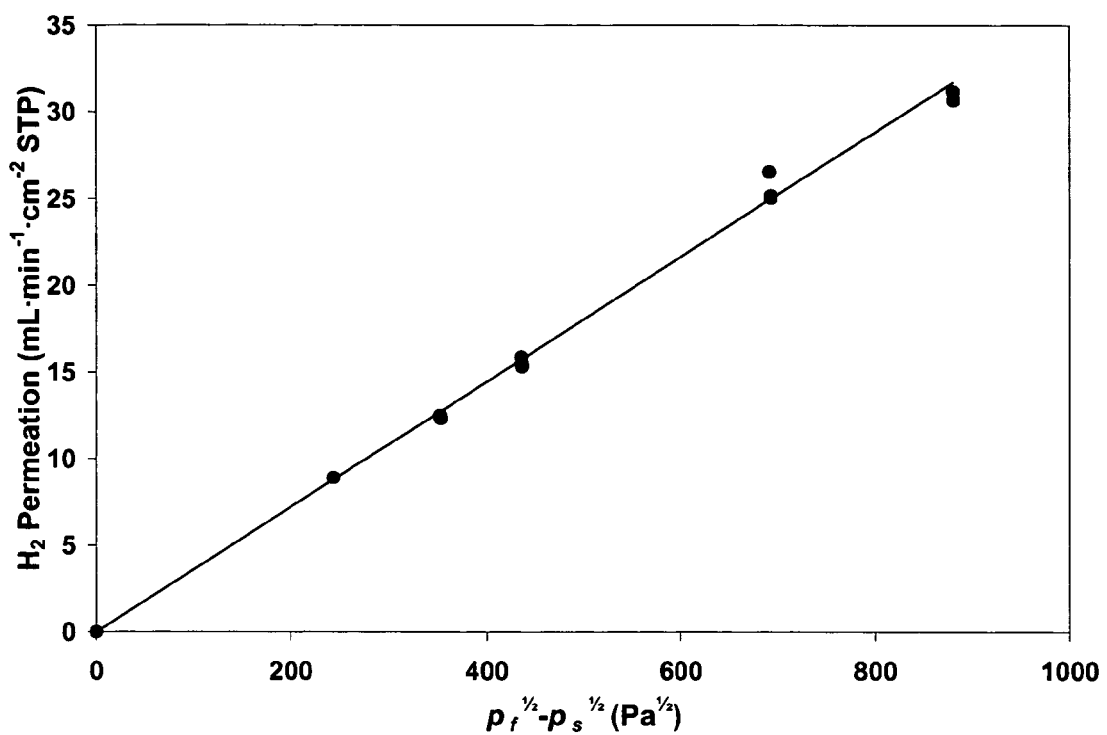
FIG. 21 shows $H_2$ permeability as a function of the $H_2$ partial pressure difference across an alloy membrane.

FIG. 21 shows H$_2$ permeability as a function of the H$_2$ partial pressure difference across a 0.5-mm thick V—Co alloy membrane (with 10 at. % Co) with 0.3 μm of Pd on each side. The membrane temperature was 400° C. The feed gas was 80 vol. % H$_2$/3 vol. % He (bal. N$_2$) at 1.6 L/min. The maximum permeability was $1.2 \times 10^{-7}$ mol·m$^{-1}$·s$^{-1}$·Pa$^{-1/2}$. The sweep gas was 1.2 L/min N$_2$.

Figure 22:
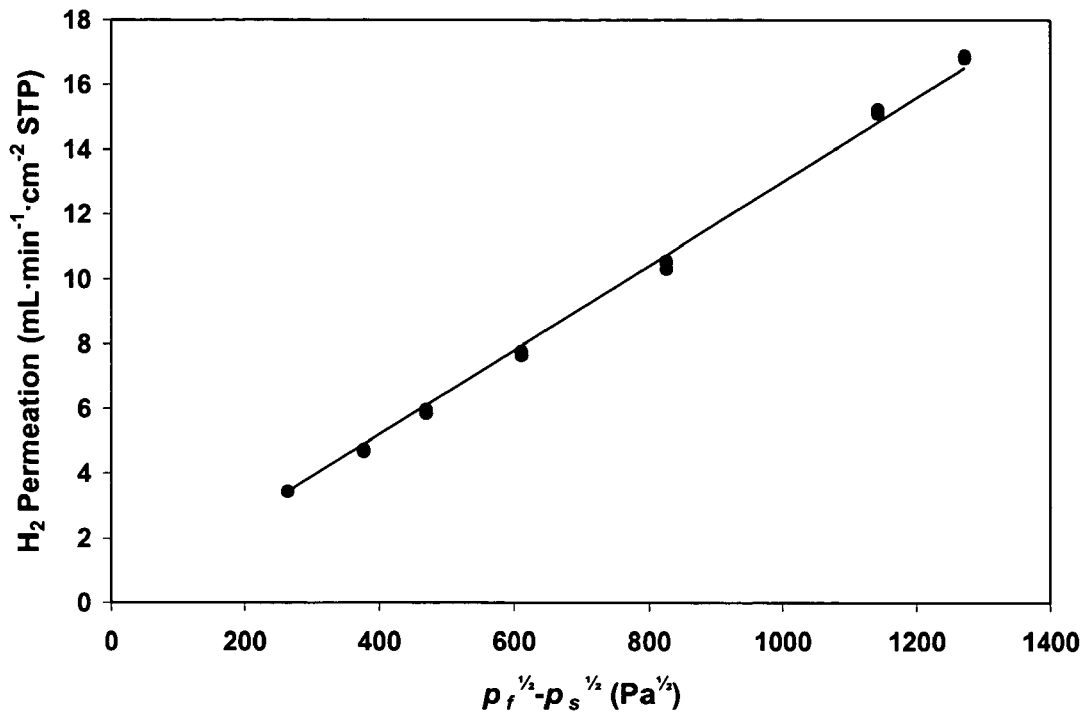
FIG. 22 illustrates $H_2$ permeability as a function of the $H_2$ partial pressure difference across a binary alloy membrane.

FIG. 22 shows H$_2$ permeability as a function of the H$_2$ partial pressure difference across a 0.6-mm thick V—Al alloy membrane (1 5 at. % Al) with 0.3 μm of Pd on each side. The membrane temperature was 440° C. The feed gas was 80 vol. % H$_2$/3 vol. % He (bal. N$_2$) at 1.6 L/min. The maximum permeability was $6 \times 10^{-8}$ mol·m$^{-1}$·s$^{-1}$·Pa$^{-1/2}$. The sweep gas was 1.6 L/min N$_2$.

Figure 23:
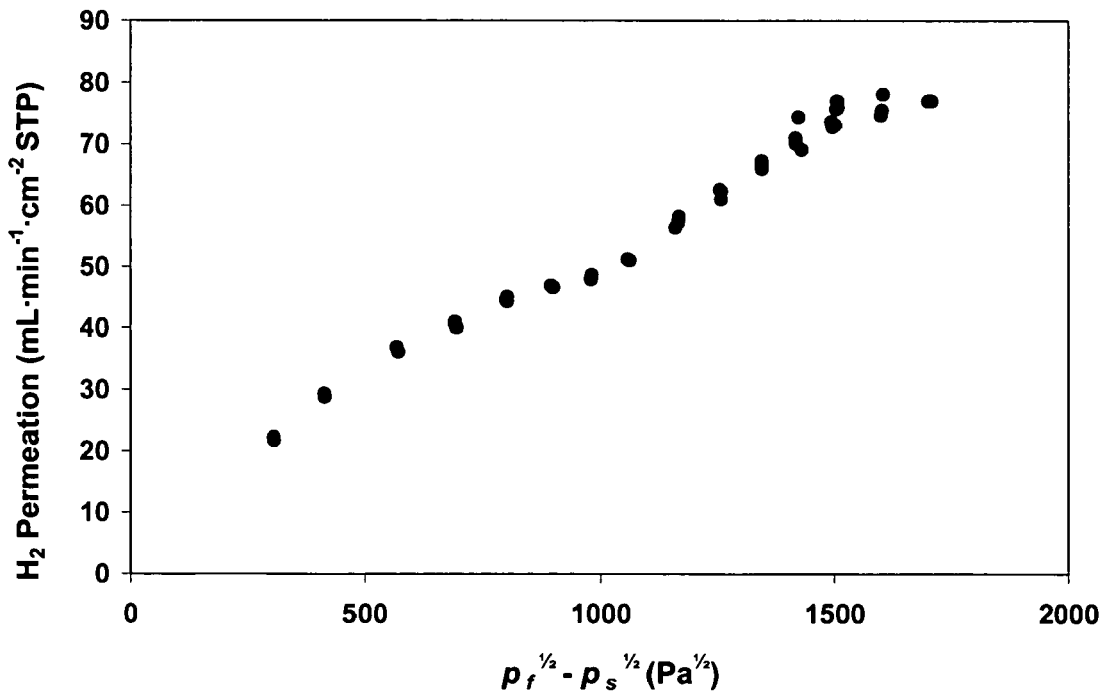
FIG. 23 illustrates $H_2$ permeation as a function of the $H_2$ partial pressure difference across an alloy membrane.

FIG. 23 shows H$_2$ permeation as a function of the H$_2$ partial pressure difference across the membrane. The H$_2$ feed and sweep partial pressures are p$_f$ and p$_s$, respectively. The membrane was a 0.7-mm thick V—Ti alloy (10 at. % of Ti) with 0.3 μm of Pd on each side. The feed gas was varied from 8.3 L/min of 60 vol. % H$_2$/40 vol. % He and 5.3 L/min pure H$_2$. The sweep gas was 5 L/min Ar. The maximum permeability was $2.6 \times 10^{-7}$ mol·m$^{-1}$·s$^{-1}$·Pa$^{-1/2}$. The temperature was 442° C. (This data can be compared to Figures above and further indicates that increasing the feed and sweep flows facilitates H$_2$ transport).

The examples are provided to further illustrate the invention and are in no way intended to limit the invention. Those of ordinary skill in the art will appreciate that materials, methods and apparatus other than those specifically exemplified herein can be employed in the practice of this invention without undue experimentation. Those of ordinary skill in the art will also appreciate that materials, methods and apparatus that are functionally equivalent to the materials, methods and apparatus specifically exemplified are available and can be employed in the practice of this invention. All such art-recognized equivalents are encompassed by this invention.

All references cited herein are incorporated by reference herein in their entirety to provide details of the state of the art. References cited are incorporated at least in part to provide methods for making membranes and membrane layers, methods for depositing metals and alloys, methods for processing ceramics, as well as for reactor designs employing hydrogen separation membranes, particularly for designs of non-galvanic hydrogen separation membrane reactors. References cited are incorporated at least in part to provide methods of application of hydrogen separation membranes. References are incorporated to the extent that they are not inconsistent with the specific disclosures and descriptions herein.

We claim:

1. A non-porous multi-layer membrane that is selectively permeable to hydrogen having a hydrogen source surface and a hydrogen sink surface and which comprises a hydrogen-permeable central layer and at least one catalyst layer that facilitates the dissociation of hydrogen positioned in the membrane between the central layer and the hydrogen source surface, at least one protective layer, and at least one barrier layer.

2. The non-porous membrane of claim 1 wherein the hydrogen-permeable membrane layer is vanadium or an alloy of vanadium.

3. The non-porous membrane of claim 1 wherein the hydrogen-permeable membrane layer comprises: V, Nb, Ta, Zr or a mixture thereof in combination with one or more of Al, Co, Cr, Fe, Mn, Mo, Nb, Ti, Ta, Cu, Ni, Ga, Ge, Sn, Zr, Si, W, La, Be, and Hf as binary, ternary, or quaternary alloys.

4. The non-porous membrane of claim 1 wherein the barrier layer is a non-porous hydrogen-permeable material.

5. The non-porous membrane of claim 4 wherein the barrier layer comprises a hydrogen ion-conducting metal oxide.

6. The non-porous membrane of claim 5 wherein the hydrogen-ion conducting metal oxide is a doped perovskite.

7. The non-porous membrane of claim 4 wherein the barrier layer comprises a hydrogen ion-conducting oxyacid, a hydrogen ion-conducting fluoride or a mixture thereof.

8. The membrane of claim 1 wherein the catalyst layer is selected from the group consisting of palladium, an alloy of palladium, nickel, an alloy of nickel, a cermet comprising palladium, an alloy of palladium, nickel or an alloy of nickel and the 8B and 1B metals and mixtures and alloys thereof.

9. The membrane of claim 8 wherein the catalyst layer is selected from the group consisting of Fe, Co, Ni, Cu, Ru, Rh, Pd, Ir, and Pt.

10. The membrane of claim 1 wherein the hydrogen-permeable central layer comprises an alloy of vanadium and titanium.

11. The membrane of claim 1 wherein the hydrogen-permeable central layer comprises an alloy of vanadium and aluminum.

12. The membrane of claim 1 wherein the hydrogen-permeable central layer comprises an alloy comprising vanadium and one or more of aluminum, titanium, cobalt, molybdenum, and chromium.

13. A membrane reactor comprising one or more membranes of claim 1.

14. A method for separation of hydrogen from a hydrogen-containing gas which comprises the steps of:
contacting a hydrogen feedstream with the hydrogen source surface of one or more membranes of claim 1;
heating the one or more membranes to a temperature such that hydrogen selectively permeates through the membrane to a hydrogen sink.

15. The method of claim 14 wherein the hydrogen is separated from gas mixtures containing $CO_2$, CO, $H_2S$ or mixtures thereof.

16. The method of claim 14 wherein the hydrogen is separated from gasified coal, water-gas-shift mixtures, reformed petroleum products, or reformed methane, butane, ethanol or ammonia.

17. A method for carrying out oxidation-reduction reactions which comprises the steps of:
contacting a hydrogen-containing species with the hydrogen source side of one or more membranes of claim 1;
contacting the hydrogen sink side of the membrane with a species to be reduced, or a sweep gas or vacuum to remove hydrogen; and
heating the membrane to an operational temperature suitable for the oxidation-reduction reaction to proceed such that hydrogen is permeated through the membrane and such that the hydrogen-containing species is oxidized.

18. The method of claim 17 wherein the membrane is heated to an operational temperature ranging from about 250 to about 800° C.

19. The method of claim 17 wherein the oxidation-reduction reaction is a hydrocarbon dehydrogenation reaction, an aromatic coupling reaction, an oxidative dimerization or oligomerization reaction, or a hydrogen sulfide decomposition.

20. The non-porous membrane of claim 1 wherein the hydrogen-permeable central layer comprises an alloy of vanadium and nickel.

21. A non-porous multi-layer membrane that is selectively permeable to hydrogen having a hydrogen source surface and a hydrogen sink surface and which comprises a hydrogen-permeable central layer and at least one catalyst layer that facilitates the dissociation of hydrogen positioned in the membrane between the central layer and the hydrogen source surface and at least one protective layer or at least one barrier layer wherein the hydrogen-permeable layer is a cermet wherein the metal of the cermet is a metal or alloy that is permeable to hydrogen, except that the metal or alloy is not palladium or an alloy of palladium.

22. The non-porous membrane of claim 21 wherein the hydrogen-permeable layer further comprises a metal oxide that does not conduct hydrogen ions and does not conduct electrons.

23. The non-porous membrane of claim 21 wherein the metal of the cermet is a metal or alloy selected from the group consisting of V, Nb, Ta, Zr or a mixture thereof in combination with one or more of Al, Co, Cr, Fe, Mn, Mo, Nb, Ti, Ta, Cu, Ni, Ga, Ge, Sn, Zr, Si, W, La, Be, and Hf as binary, ternary, or quaternary alloys.

24. The non-porous membrane of claim 21 wherein the metal of the cermet is vanadium or an alloy of vanadium.

25. The non-porous membrane of claim 21 wherein the metal of the cermet is an alloy of vanadium and nickel.

26. The non-porous membrane of claim 21 wherein the barrier layer comprises a hydrogen ion-conducting metal oxide.

27. A membrane reactor comprising one or more membranes of claim 21.

28. A method for separation of hydrogen from a hydrogen-containing gas which comprises the steps of:
contacting a hydrogen feedstream with the hydrogen source surface of one or more membranes of claim 21;
heating the one or more membranes to a temperature such that hydrogen selectively permeates through the membrane to a hydrogen sink.

29. The method of claim 28 wherein the hydrogen is separated from gas mixtures containing $CO_2$, CO, $H_2S$ or mixtures thereof.

30. The method of claim 28 wherein the hydrogen is separated from gasified coal, water-gas-shift mixtures, reformed petroleum products, or reformed methane, butane, ethanol or ammonia.

31. A non-porous multi-layer membrane that is selectively permeable to hydrogen having a hydrogen source surface and a hydrogen sink surface and which comprises a hydrogen-permeable central layer and at least one catalyst layer that facilitates the dissociation of hydrogen positioned in the membrane between the central layer and the hydrogen source surface and at least one protective layer or at least one barrier layer wherein the hydrogen-permeable membrane layer is a multiphase material comprising at least one hydrogen ion-conducting phase and at least one electron-conducting phase.

32. The non-porous membrane of claim 31 wherein the hydrogen-permeable membrane layer is a multi-phase hydrogen-permeable material comprising at least one hydrogen-ion conducting metal oxide and at least one electron-conducting metal oxide.

33. The non-porous membrane of claim 31 wherein the electron-conducting phase is a metal phase that is not permeable to hydrogen.

34. The non-porous membrane of claim 31 wherein the hydrogen-permeable membrane layer is a multi-phase hydrogen-permeable material comprising at least one hydrogen-ion conducting oxyacid salt phase and at least one electron-conducting phase.

35. The non-porous membrane of claim 31 wherein the hydrogen-permeable membrane layer is a multi-phase hydrogen-permeable material comprising at least one hydrogen-ion conducting fluoride phase and at least one electron-conducting phase.

36. A non-porous multi-layer membrane that is selectively permeable to hydrogen having a hydrogen source surface and a hydrogen sink surface and which comprises a hydrogen-permeable central layer and at least one catalyst layer that facilitates the dissociation of hydrogen positioned in the membrane between the central layer and the hydrogen source surface and at least one protective layer and optionally at least one barrier layer wherein the at least one protective layer is a porous metal oxide.

37. The non-porous membrane of claim 36 wherein the at least one protective layer further contains one or more metals that dissociate hydrogen sulfide.

38. The non-porous membrane of claim 36 wherein the at least one protective layer which is a porous metal oxide comprises a high surface area metal oxide and wherein the membrane further comprises at least one additional protective layer which comprises a metal oxide wherein the metal forms stable sulfides.

39. The non-porous membrane of claim 36 wherein the at least one protective layer comprises a high surface area metal oxide wherein a metal of the metal oxide forms stable sulfides.

40. The non-porous membrane of claim 36 wherein the hydrogen-permeable layer is a metal or alloy selected from the group consisting of V, Nb, Ta, Zr or a mixture thereof in combination with one or more of Al, Co, Cr, Fe, Mn, Mo, Nb, Ti, Ta, Cu, Ni, Ga, Ge, Sn, Zr, Si, W, La, Be, and Hf as binary, ternary, or quaternary alloys.

41. The non-porous membrane of claim 36 wherein the hydrogen-permeable layer is a metal or alloy of vanadium.

42. The non-porous membrane of claim 41 wherein the hydrogen-permeable layer is an alloy of vanadium and nickel.

43. A membrane reactor comprising one or more membranes of claim 36.

44. A method for separation of hydrogen from a hydrogen-containing gas which comprises the steps of:
contacting a hydrogen feedstream with the hydrogen source surface of one or more membranes of claim 36;
heating the one or more membranes to a temperature such that hydrogen selectively permeates through the membrane to a hydrogen sink.

45. A non-porous multi-layer membrane that is selectively permeable to hydrogen having a hydrogen source surface and a hydrogen sink surface and which comprises a hydrogen-permeable central layer and at least one catalyst layer that facilitates the dissociation of hydrogen positioned in the membrane between the central layer and the hydrogen source surface and at least one protective layer or at least one barrier layer wherein the at least one catalyst layer is porous, non-continuous or both.

* * * * *